(12) United States Patent
Seok

(10) Patent No.: US 10,178,705 B2
(45) Date of Patent: Jan. 8, 2019

(54) METHOD AND APPARATUS FOR DYNAMIC CHANNEL SENSING FOR DIRECT LINK IN A HIGH EFFICIENCY WIRELESS LAN

(71) Applicant: NEWRACOM, Inc., Irvine, CA (US)

(72) Inventor: Yongho Seok, Irvine, CA (US)

(*) Notice: Subject to any disclaimer, the term of this patent is extended or adjusted under 35 U.S.C. 154(b) by 323 days.

(21) Appl. No.: 15/051,398

(22) Filed: Feb. 23, 2016

(65) Prior Publication Data

US 2016/0249397 A1 Aug. 25, 2016

Related U.S. Application Data

(60) Provisional application No. 62/119,741, filed on Feb. 23, 2015.

(51) Int. Cl.
*H04W 76/14* (2018.01)
*H04W 74/08* (2009.01)
*H04W 48/16* (2009.01)

(52) U.S. Cl.
CPC ....... *H04W 76/14* (2018.02); *H04W 74/0808* (2013.01); *H04W 48/16* (2013.01)

(58) Field of Classification Search
CPC ... H04W 36/30; H04W 48/16; H04W 52/241; H04W 74/0808; H04W 74/0816; H04W 76/10; H04W 76/11; H04W 76/14; H04W 76/15
See application file for complete search history.

(56) References Cited

U.S. PATENT DOCUMENTS 9,854,607 B1* 12/2017 Chu ..................... H04W 52/241
2015/0264617 A1* 9/2015 Choudhury ........... H04W 36/30
370/332

OTHER PUBLICATIONS

IEEE P802.11ah/D5.0: "Part 11: Wireless LAN Medium Access Control (MAC) and Physical Layer (PHY) Specifications, Amendment 2: Sub 1 GHz License Exempt Operation," IEEE Draft Standard for Information technology—Telecommunications and information exchange between systems, Local and metropolitan area networks—Specific requirements, Mar. 2015, 632 pages.
IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.

(Continued)

*Primary Examiner* — Khoa Huynh
(74) *Attorney, Agent, or Firm* — NDWE, LLP

(57) ABSTRACT

Methods and apparatus for dynamic channel sensing for direct link in a High Efficiency WLAN (HEW) are provided. The methods include a method for dynamic channel sensing for a direct link by a first station (STA) in a wireless local area network. The method may include determining a first COLOR parameter of an access point to which the first STA is associated, exchanging with a second STA a COLOR parameter related to the direct link, the second STA being a peer STA of the first STA in the direct link, and determining a channel state based on a value of a COLOR field included in a received physical layer protocol data unit (PPDU) having a valid SIGNAL (SIG) field, the first COLOR parameter, and the COLOR parameter related to the direct link.

20 Claims, 25 Drawing Sheets

(56) References Cited

OTHER PUBLICATIONS

IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

* cited by examiner

HE PPDU FORMAT

FIG. 11

| L-STF | L-LTF | L-SIG | HE-SIG-A | HE-STF | HE-LTF | HE-LTF | HE-LTF | HE-LTF | HE-SIG-B | PSDU(AP TO STA6) |
|---|---|---|---|---|---|---|---|---|---|---|
| | | | | HE-STF | HE-LTF | HE-LTF | HE-LTF | HE-LTF | HE-SIG-B | PSDU(AP TO STA5) |
| | | | | HE-STF | HE-LTF | HE-LTF | HE-LTF | HE-LTF | HE-SIG-B | PSDU(AP TO STA3, STA4) |
| | | | | HE-STF | HE-LTF | HE-LTF | HE-LTF | HE-LTF | HE-SIG-B | PSDU(AP TO STA1, STA2) |

FIG. 12

| L-STF | L-LTF | L-SIG | HE-SIG-A | HE-STF | HE-LTF | HE-SIG-B | HE-LTF | HE-LTF | HE-LTF | HE-SIG-C | PSDU(AP TO STA6) |
|---|---|---|---|---|---|---|---|---|---|---|---|
| | | | | HE-STF | HE-LTF | HE-SIG-B | HE-LTF | HE-LTF | HE-LTF | HE-SIG-C | PSDU(AP TO STA5) |
| | | | | HE-STF | HE-LTF | HE-SIG-B | HE-LTF | HE-LTF | HE-LTF | HE-SIG-C | PSDU(AP TO STA3, STA4) |
| | | | | HE-STF | HE-LTF | HE-SIG-B | HE-LTF | HE-LTF | HE-LTF | HE-SIG-C | PSDU(AP TO STA1, STA2) |

FIG. 15

METHOD AND APPARATUS FOR DYNAMIC CHANNEL SENSING FOR DIRECT LINK IN A HIGH EFFICIENCY WIRELESS LAN

CROSS-REFERENCE TO RELATED APPLICATIONS

This application claims the benefits of U.S. Provisional Application No. 62/119,741, filed on Feb. 23, 2015, which is hereby incorporated by reference as if fully set forth herein.

BACKGROUND

Technical Field

The embodiments relate to Wireless Local Area Networks (WLANs), and more particularly, to a method and apparatus for dynamic channel sensing for direct link in a High Efficiency WLAN (HEW).

Related Art

Along with the recent development of information and telecommunication technology, various wireless communication techniques have been developed. Among them, the WLAN enables a user to wirelessly access the Internet based on radio frequency technology in a home, an office, or a specific service area using a portable terminal such as a Personal Digital Assistant (PDA), a laptop computer, a Portable Multimedia Player (PMP), a smartphone, etc.

To overcome limitations in communication speed that the WLAN faces, the recent technical standards have introduced a system that increases the speed, reliability, and coverage of a wireless network. For example, the Institute of Electrical and Electronics Engineers (IEEE) 802.11n standard has introduced Multiple Input Multiple Output (MIMO) that is implemented using multiple antennas at both a transmitter and a receiver in order to support High Throughput (HT) at a data processing rate of up to 540 Mbps, minimize transmission errors, and optimize data rates.

In recent times, to support increased numbers of devices supporting WLAN, such as smartphones, more Access Points (APs) have been deployed. Despite increase in use of WLAN devices supporting the Institute of Electrical and Electronics Engineers (IEEE) 802.11ac standard, that provide high performance relative to WLAN devices supporting the legacy IEEE 802.11g/n standard, a WLAN system supporting higher performance is required due to WLAN users' increased use of high volume content such as a ultra high definition video. Although a conventional WLAN system has aimed at achieving an increase of bandwidth and improvement of a peak transmission rate, actual users thereof could not feel drastic increase of such performance.

In a task group called IEEE 802.11ax, High Efficiency WLAN (HEW) standardization is under discussion. The HEW aims at improving performance felt by users demanding high-capacity, high-rate services while supporting simultaneous access of numerous stations in an environment in which a plurality of APs is densely deployed and coverage areas of APs overlap.

However, there is no specified method for dynamic channel sensing for direct link in a HEW.

SUMMARY

The embodiments provide a method and apparatus for dynamic channel sensing for direct link in a HEW.

The embodiments contemplated are not limited to the foregoing descriptions, and additional embodiments will become apparent to those having ordinary skill in the pertinent art to the invention based upon the following descriptions.

In an aspect of the embodiments, a method for dynamic channel sensing for a direct link by a first station (STA) in a wireless local area network may be provided. The method may include determining a first COLOR parameter of an access point (AP) to which the first STA is associated; exchanging with a second STA a COLOR parameter related to the direct link, the second STA being a peer STA of the first STA in the direct link; and determining a channel state based on a first clear channel assessment (CCA) threshold higher than a second CCA threshold, when a value of a COLOR field included in a received physical layer protocol data unit (PPDU) having a valid SIGNAL (SIG) field does not match any of the first COLOR parameter and the COLOR parameter related to the direct link.

In another embodiment, a first STA apparatus for performing dynamic channel sensing for a direct link in a wireless local area network may be provided. The first STA apparatus may include a baseband processor, a transceiver, a memory, etc. The baseband processor may be configured to determine a first COLOR parameter of an AP to which the first STA is associated; exchange, using the transceiver, with a second STA a COLOR parameter related to the direct link, the second STA being a peer STA of the first STA in the direct link; and determine a channel state based on a first CCA threshold higher than a second CCA threshold, when a value of a COLOR field included in a received PPDU having a valid SIG field does not match any of the first COLOR parameter and the COLOR parameter related to the direct link.

In another embodiment, a non-transitory computer-readable medium having instructions executable for a first STA to perform dynamic channel sensing for a direct link in a wireless local area network may be provided. The executable instructions may cause the first STA to determine a first COLOR parameter of an AP to which the first STA is associated; exchange with a second STA a COLOR parameter related to the direct link, the second STA being a peer STA of the first STA in the direct link; and determine a channel state based on a first CCA threshold higher than a second CCA threshold, when a value of a COLOR field included in a received PPDU having a valid SIG field does not match any of the first COLOR parameter and the COLOR parameter related to the direct link.

It is to be understood that the foregoing summarized features are exemplary aspects of the following detailed description of the embodiments and are not intended to limit the scope of the invention.

According to the embodiments, a method and apparatus for dynamic channel sensing for direct link in a HEW can be provided.

The advantages of the embodiments are not limited to the foregoing descriptions, and additional advantages will become apparent to those having ordinary skill in the pertinent art to the invention based upon the following descriptions.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 11 depicts the starting and ending points of a High Efficiency Long Training Field (HE-LTF) field in a HE PPDU frame format according to one embodiment.

FIG. 12 depicts a High Efficiency SIGnal B (HE-SIG-B) field and a High Efficiency SIGnal C (HE-SIG-C) field in the HE PPDU frame format according to one embodiment.

FIG. 15 depicts another exemplary HE PPDU frame format according to one embodiment.

DETAILED DESCRIPTION

Figure 1:
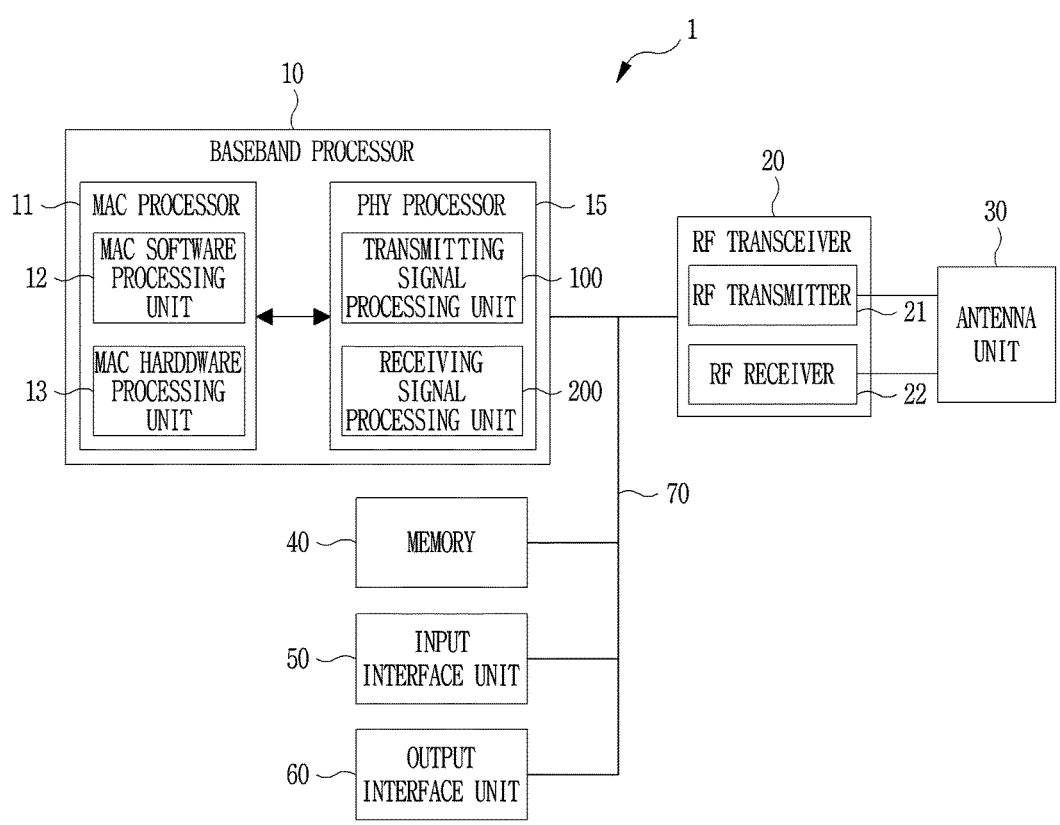
FIG. 1 is a block diagram of a Wireless Local Area Network (WLAN) device.

In the following detailed description, certain embodiments of the invention have been shown and described, by way of illustration. As those skilled in the art would realize, the described embodiments may be modified in various different ways, without departing from the spirit or scope of the invention. Accordingly, the drawings and description are to be regarded as illustrative in nature and not restrictive. Like reference numerals designate like elements throughout the present disclosure.

In a Wireless Local Area network (WLAN), a Basic Service Set (BSS) includes a plurality of WLAN devices. A WLAN device may include a Medium Access Control (MAC) layer and a PHYsical (PHY) layer according to Institute of Electrical and Electronics Engineers (IEEE) 802.11 series standards. In the plurality of WLAN devices, at least one the WLAN device may be an Access Point (AP) and the other WLAN devices may be non-AP Stations (non-AP STAs). Alternatively, all of the plurality of WLAN devices may be non-AP STAs in an ad-hoc networking environment. In general, AP STA and non-AP STA may be each referred to as an STA or may be collectively referred to as STAs. However, for ease of description herein, only the non-AP STAs may be referred to herein as STAs.

FIG. 1 is a block diagram of a WLAN device.

Referring to FIG. 1, a WLAN device 1 includes a baseband processor 10, a Radio Frequency (RF) transceiver 20, an antenna unit 30, a memory 40, which may be or may include a non-transitory computer-readable medium, an input interface unit 50, an output interface unit 60, and a bus 70.

The baseband processor 10 may be simply referred to as a processor, and may perform baseband signal processing described in the embodiments, and includes a MAC processor (or MAC entity) 11 and a PHY processor (or PHY entity) 15.

In an embodiment, the MAC processor 11 may include a MAC software processing unit 12 and a MAC hardware processing unit 13. The memory 40 may store software or machine-executable instructions (hereinafter referred to as 'MAC software') including at least some functions of the MAC layer. The MAC software processing unit 12 may execute the MAC software to implement some functions of the MAC layer, and the MAC hardware processing unit 13 may implement the remaining functions of the MAC layer as hardware (hereinafter referred to as 'MAC hardware'). However, embodiments of the MAC processor 11 are not limited to this distribution of functionality.

The PHY processor 15 includes a transmitting (TX) signal processing unit 100 and a receiving (RX) signal processing unit 200.

The baseband processor 10, the RF transceiver 20, the memory 40, the input interface unit 50, and the output interface unit 60 may communicate with one another via the bus 70.

The RF transceiver 20 includes an RF transmitter 21 and an RF receiver 22.

The memory 40 may further store an Operating System (OS) and applications. The input interface unit 50 receives information from a user, and the output interface unit 60 outputs information to the user.

The antenna unit 30 includes one or more antennas. When Multiple Input Multiple Output (MIMO) or Multi-User MIMO (MU-MIMO) is used, the antenna unit 30 may include a plurality of antennas.

Figure 2:
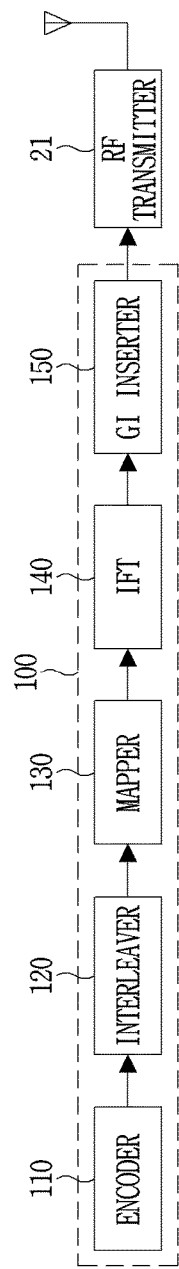
FIG. 2 is a schematic block diagram of an exemplary transmitting signal processing unit in a WLAN.

FIG. 2 is a schematic block diagram of an exemplary transmitting signal processor in a WLAN.

Referring to FIG. 2, the transmitting signal processing unit 100 may include an encoder 110, an interleaver 120, a mapper 130, an Inverse Fourier Transformer (IFT) 140, and a Guard Interval (GI) inserter 150.

The encoder 110 encodes input data. For example, the encoder 100 may be a Forward Error Correction (FEC) encoder. The FEC encoder may include a Binary Convolutional Code (BCC) encoder followed by a puncturing device, or the FEC encoder may include a Low-Density Parity-Check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder 110 to change the order of bits. Interleaving may be applied when BCC encoding is used in the encoder 110. The mapper 130 maps the sequence of bits output from the interleaver 120 to constellation points. If LDPC encoding is used in the encoder 110, the mapper 130 may further perform LDPC tone mapping in addition to constellation mapping.

When MIMO or MU-MIMO is used, the transmitting signal processing unit 100 may use a plurality of interleavers 120 and a plurality of mappers 130 corresponding to the number of spatial streams, $N_{SS}$. In this case, the transmitting signal processing unit 100 may further include a stream parser for dividing outputs of the BCC encoders or output of the LDPC encoder into blocks that are sent to different interleavers 120 or mappers 130. The transmitting signal processing unit 100 may further include a Space-Time Block Code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of constellation points output from the mapper 130 or the spatial mapper to a time-domain block (i.e., a symbol) by using Inverse Discrete Fourier Transform (IDFT) or Inverse Fast Fourier Transform (IFFT). If the STBC encoder and the spatial mapper are used, the IFT 140 may be provided for each transmit chain.

When MIMO or MU-MIMO is used, the transmitting signal processing unit 100 may insert Cyclic Shift Diversities (CSDs) to prevent unintentional beamforming. The CSD insertion may occur before or after IFT. The CSD may be specified per transmit chain or may be specified per space-time stream. Alternatively, the CSD may be applied as a part of the spatial mapper.

When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 3:
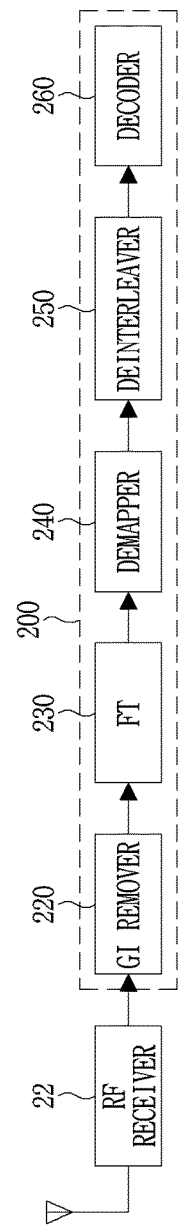
FIG. 3 is a schematic block diagram of an exemplary receiving signal processing unit in a WLAN.

FIG. 3 is a schematic block diagram of an exemplary receiving signal processor in a WLAN.

Referring to FIG. 3, the receiving signal processing unit 200 includes a GI remover 220, a Fourier Transformer (FT) 230, a demapper 240, a deinterleaver 250, and a decoder 260.

An RF receiver 22 receives an RF signal via the antenna unit 30 and converts the RF signal into one or more symbols. The GI remover 220 removes the GI from the symbol. When MIMO or MU-MIMO is used, the RF receiver 22 and the GI remover 220 may be provided for each receive chain.

The FT 230 converts the symbol (i.e., the time-domain block) into a block of constellation points by using a Discrete Fourier Transform (DFT) or a Fast Fourier Transform (FFT). The FT 230 may be provided for each receive chain.

When MIMO or MU-MIMO is used, the receiving signal processing unit 200 may use/include a spatial demapper for converting Fourier Transformed receiver chains to constellation points of the space-time streams, and an STBC decoder for despreading the constellation points from the space-time streams into the spatial streams.

The demapper 240 demaps the constellation points output from the FT 230 or the STBC decoder to bit streams. If LDPC encoding is applied to the received signal, the demapper 240 may further perform LDPC tone demapping before constellation demapping. The deinterleaver 250 deinterleaves the bits of each stream output from the demapper 240. Deinterleaving may be applied when a BCC encoding scheme is applied to the received signal.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

In a WLAN system, Carrier Sense Multiple Access with Collision Avoidance (CSMA/CA) is a basic MAC access mechanism. The CSMA/CA mechanism is referred to as Distributed Coordination Function (DCF) of IEEE 802.11 MAC, or colloquially as a 'listen before talk' access mechanism. According to the CSMA/CA mechanism, an AP and/or an STA may sense a medium or a channel for a predetermined time before starting transmission, that is, the AP and/or the STA may perform Clear Channel Assessment (CCA). If the AP or the STA determines that the medium or channel is idle, it may start to transmit a frame on the medium or channel. On the other hand, if the AP and/or the STA determines that the medium or channel is occupied or busy, it may set a delay period (e.g., a random backoff period), wait for the delay period without starting transmission, and then attempt to transmit a frame. By applying a random backoff period, a plurality of STAs are expected to attempt frame transmission after waiting for different time periods, resulting in less collisions.

Figure 4:
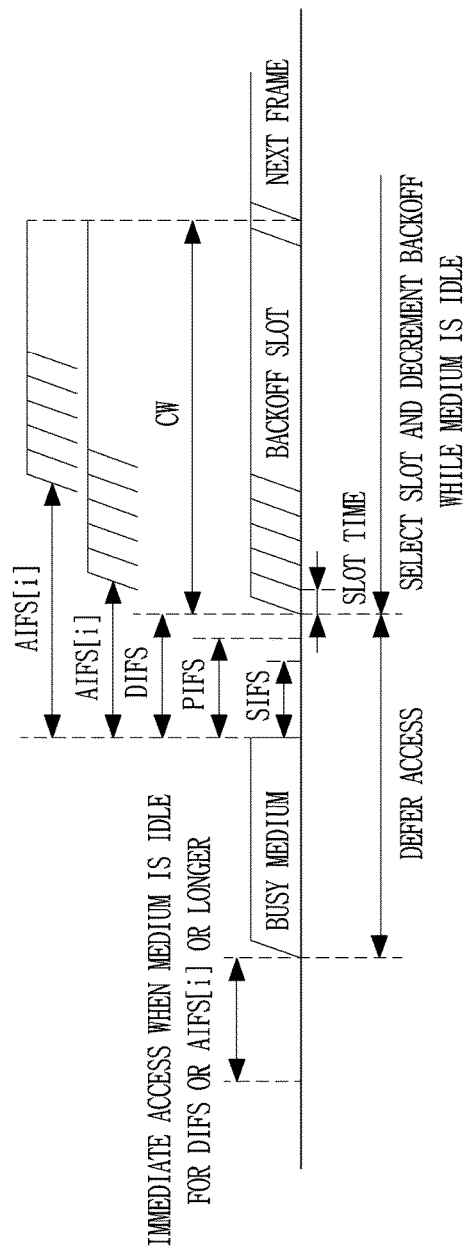
FIG. 4 depicts a relationship between InterFrame Spaces (IFSs).

FIG. 4 depicts a relationship between InterFrame Spaces (IFSs).

WLAN devices may exchange data frames, control frames, and management frames with each other.

A data frame is used for transmission of data forwarded to a higher layer. The WLAN device transmits the data frame after performing backoff if a Distributed Coordination Function IFS (DIFS) has elapsed from a time when the medium has been idle. A management frame is used for exchanging management information which is not forwarded to the higher layer. The WLAN device transmits the management frame after performing backoff if an IFS such as the DIFS or a Point Coordination Function IFS (PIFS) has elapsed. Subtype frames of the management frame include a beacon frame, an association request/response frame, a probe request/response frame, and an authentication request/response frame. A control frame is used for controlling access to the medium. Subtype frames of the control frame include a Request-To-Send (RTS) frame, a Clear-To-Send (CTS) frame, and an ACKnowledgement (ACK) frame. In the case that the control frame is not a response frame to a previous frame, the WLAN device transmits the control frame after performing backoff if the DIFS has elapsed. In case that the control frame is a response frame to a previous frame, the WLAN device transmits the control frame without performing backoff if a Short IFS (SIFS) has elapsed. The type and subtype of a frame may be identified by a type field and a subtype field in a Frame Control (FC) field.

On the other hand, a Quality of Service (QoS) STA transmits a frame after performing backoff if an Arbitration IFS (AIFS) for an associated Access Category (AC), i.e., AIFS[i] (i is determined based on AC) has elapsed. In this case, the AIFC[i] may be used for a data frame, a management frame, or a control frame that is not a response frame.

In the example illustrated in FIG. 4, upon generation of a frame to be transmitted, an STA may transmit the frame immediately, if it determines that the medium is idle for the DIFS or AIFS[i] or longer. The medium is busy for a time period during which the STA transmits the frame. During the time period, upon generation of a frame to be transmitted, another STA may defer access by confirming that the medium is busy. If the medium is idle, the STA that intends to transmit the frame may perform a backoff operation after a predetermined IFS in order to minimize collision with any other STA. Specifically, the STA that intends to transmit the frame selects a random backoff count, waits for a slot time corresponding to the selected random backoff count, and then attempts transmission. The random backoff count is determined based on a Contention Window (CW) parameter and the medium is monitored continuously during countdown of backoff slots (i.e. decrement a backoff count-down) according to the determined backoff count. If the STA monitors the medium as busy, the STA discontinues the count-down and waits, and then, if the medium gets idle, the STA resumes the count-down. If the backoff slot count reaches 0, the STA may transmit the next frame.

Figure 5:
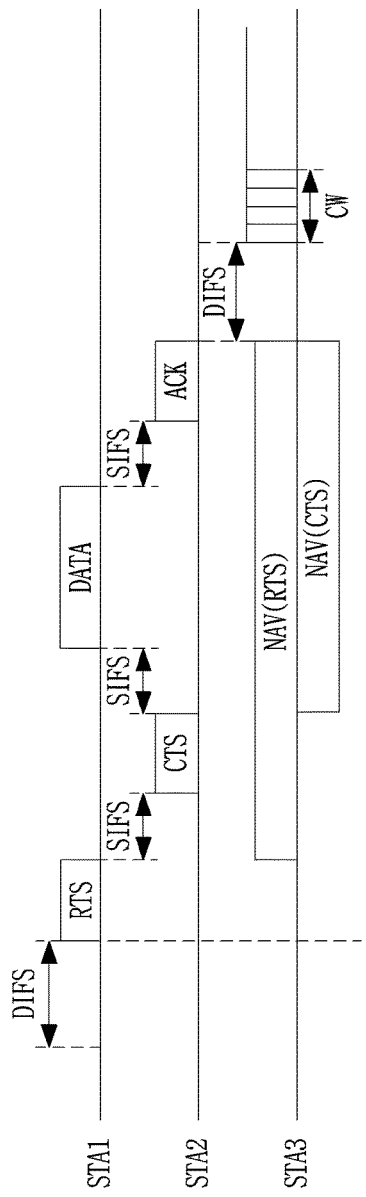
FIG. 5 is a conceptual diagram illustrating a procedure for transmitting a frame in Carrier Sense Multiple Access with Collision Avoidance (CSMA/CA) for avoiding collisions between frames in a channel.

FIG. 5 is a conceptual diagram illustrating a CSMA/CA-based frame transmission procedure for avoiding collisions between frames in a channel.

Referring FIG. 5, a first STA (STA1) is a transmit WLAN device for transmitting data, a second STA (STA2) is a receive WLAN device for receiving the data from STA1, and a third STA (STA3) is a WLAN device which may be located in an area where a frame transmitted from STA1 and/or a frame transmitted from STA2 can be received by STA3.

STA1 may determine whether the channel is busy by carrier sensing. The STA1 may determine the channel occupation based on an energy level on the channel or correlation of signals in the channel, or may determine the channel occupation by using a Network Allocation Vector (NAV) timer.

After determining that the channel is not being used by other devices during DIFS (that is, the channel is idle), STA1 may transmit an RTS frame to STA2 after performing backoff. Upon receiving the RTS frame, STA2 may transmit a CTS frame as a response to the CTS frame after SIFS.

When STA3 receives the RTS frame, STA3 may set the NAV timer for a transmission duration of subsequently transmitted frame by using duration information included in the RTS frame. For example, the NAV timer may be set for a duration of SIFS+CTS frame duration+SIFS+data frame duration+SIFS+ACK frame duration. When STA3 receives the CTS frame, it may set the NAV timer for a transmission duration of subsequently transmitted frames by using duration information included in the CTS frame. For example, the NAV timer may be set for a duration of SIFS+a data frame duration+SIFS+an ACK frame duration. Upon receiving a new frame before the NAV timer expires, STA3 may update the NAV timer by using duration information included in the new frame. STA3 does not attempt to access the channel until the NAV timer expires.

When STA1 receives the CTS frame from STA2, it may transmit a data frame to STA2 after SIFS elapsed from the CTS frame has been completely received. Upon successfully receiving the data frame, STA2 may transmit an ACK frame as a response to the data frame after SIFS elapsed.

When the NAV timer expires, STA3 may determine whether the channel is busy through the use of carrier sensing. Upon determining that the channel is not in use by other devices during DIFS and after the NAV timer has expired, STA3 may attempt channel access after a contention window after a random backoff has elapsed.

Figure 6:
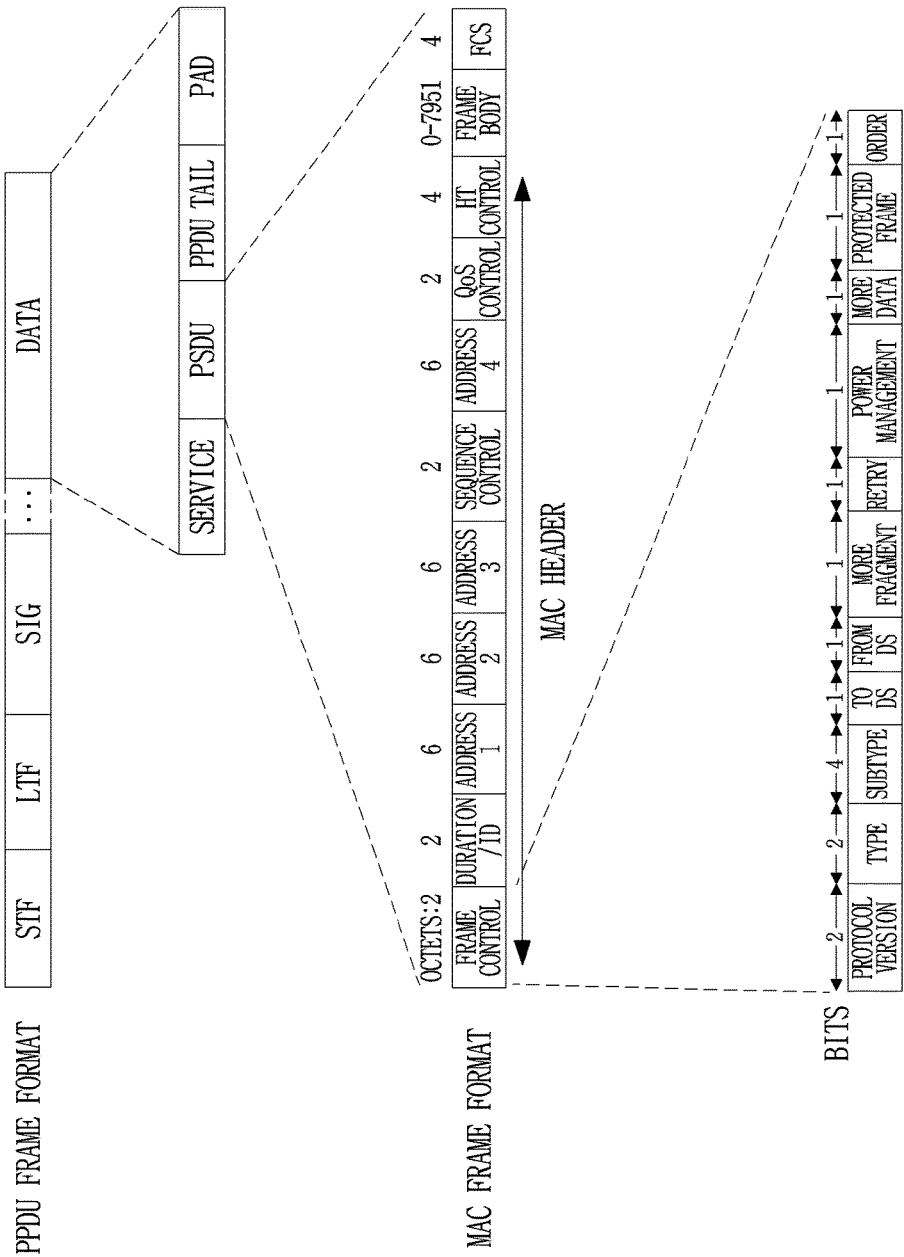
FIG. 6 depicts an exemplary frame structure in a WLAN system.

FIG. 6 depicts an exemplary frame structure in a WLAN system.

PHY layer may prepare for transmission of a MAC PDU (MPDU) in response to an instruction (or a primitive, which is a set of instructions or a set of parameters) by the MAC layer. For example, upon receipt of an instruction requesting transmission start from the MAC layer, the PHY layer may switch to a transmission mode, construct a frame with information (e.g., data) received from the MAC layer, and transmit the frame.

Upon detection of a valid preamble in a received frame, the PHY layer monitors a header of the preamble and transmits an instruction indicating reception start of the PHY layer to the MAC layer.

Information is transmitted and received in frames in the WLAN system. For this purpose, a Physical layer Protocol Data Unit (PPDU) frame format is defined.

A PPDU frame may include a Short Training Field (STF) field, a Long Training Field (LTF) field, a SIGNAL (SIG) field, and a Data field. The most basic (e.g., a non-High Throughput (non-HT)) PPDU frame may include only a Legacy-STF (L-STF) field, a Legacy-LTF (L-LTF) field, a SIG field, and a Data field. Additional (or other types of) STF, LTF, and SIG fields may be included between the SIG field and the Data field according to the type of PPDU frame format (e.g., an HT-mixed format PPDU, an HT-greenfield format PPDU, a Very High Throughput (VHT) PPDU, etc.).

The STF is used for signal detection, Automatic Gain Control (AGC), diversity selection, fine time synchronization, etc. The LTF field is used for channel estimation, frequency error estimation, etc. The STF and the LTF fields may be referred to as signals for OFDM PHY layer synchronization and channel estimation.

The SIG field may include a RATE field and a LENGTH field. The RATE field may include information about a modulation scheme and coding rate of data. The LENGTH field may include information about the length of the data. The SIG field may further include parity bits, SIG TAIL bits, etc.

The Data field may include a SERVICE field, a Physical layer Service Data Unit (PSDU), and PPDU TAIL bits. When needed, the Data field may further include padding bits. Some of the bits of the SERVICE field may be used for synchronization at a descrambler of a receiver. The PSDU corresponds to a MAC PDU defined at the MAC layer and may include data generated/used in a higher layer. The PPDU TAIL bits may be used to return an encoder to a zero state. The padding bits may be used to match the length of the Data filed in predetermined units.

A MAC PDU is defined according to various MAC frame formats. A basic MAC frame includes a MAC header, a frame body, and a Frame Check Sequence (FCS). The MAC frame includes a MAC PDU and may be transmitted and received in the PSDU of the data part in the PPDU frame format.

The MAC header includes a Frame Control field, a Duration/Identifier (ID) field, an Address field, etc. The Frame Control field may include control information required for frame transmission/reception. The Duration/ID field may be set to a time for transmitting the frame. For details of Sequence Control, QoS Control, and HT Control subfields of the MAC header, refer to the IEEE 802.11-2012 technical specification, which is hereby incorporated by reference.

The Frame Control field of the MAC header may include Protocol Version, Type, Subtype, To Distribution System (DS), From DS, More Fragment, Retry, Power Management, More Data, Protected Frame, and Order subfields. For the contents of each subfield in the Frame Control field, refer to the IEEE 802.11-2012 technical specification.

A Null-Data Packet (NDP) frame format is a frame format that does not include a data packet. In other words, the NDP frame format includes a Physical Layer Convergence Protocol (PLCP) header part (i.e., the STF, LTF, and SIG fields) of the general PPDU frame format, without the remaining part (i.e., the Data field) of the general PPDU frame format. The NDP frame format may be referred to as a short frame format.

The IEEE 802.11ax task group is discussing a WLAN system, called a High Efficiency WLAN (HEW) system, that operates in 2.4 GHz or 5 GHz and supports a channel bandwidth (or channel width) of 20 MHz, 40 MHz, 80 MHz, or 160 MHz. The embodiments define a new PPDU frame format for the IEEE 802.11ax HEW system. The new PPDU frame format may support MU-MIMO or OFDMA. A PPDU of the new format may be referred to as a 'HEW PPDU' or 'RE PPDU' (similarly, HEW xyz may be referred to as 'RE xyz' or 'HE-xyz' in the following descriptions).

In one embodiment, the term 'MU-MIMO or OFDMA mode' includes MU-MIMO without using OFDMA, or OFDMA mode without using MU-MIMO in an orthogonal frequency resource, or OFDMA mode using MU-MIMO in an orthogonal frequency resource.

Figure 7:
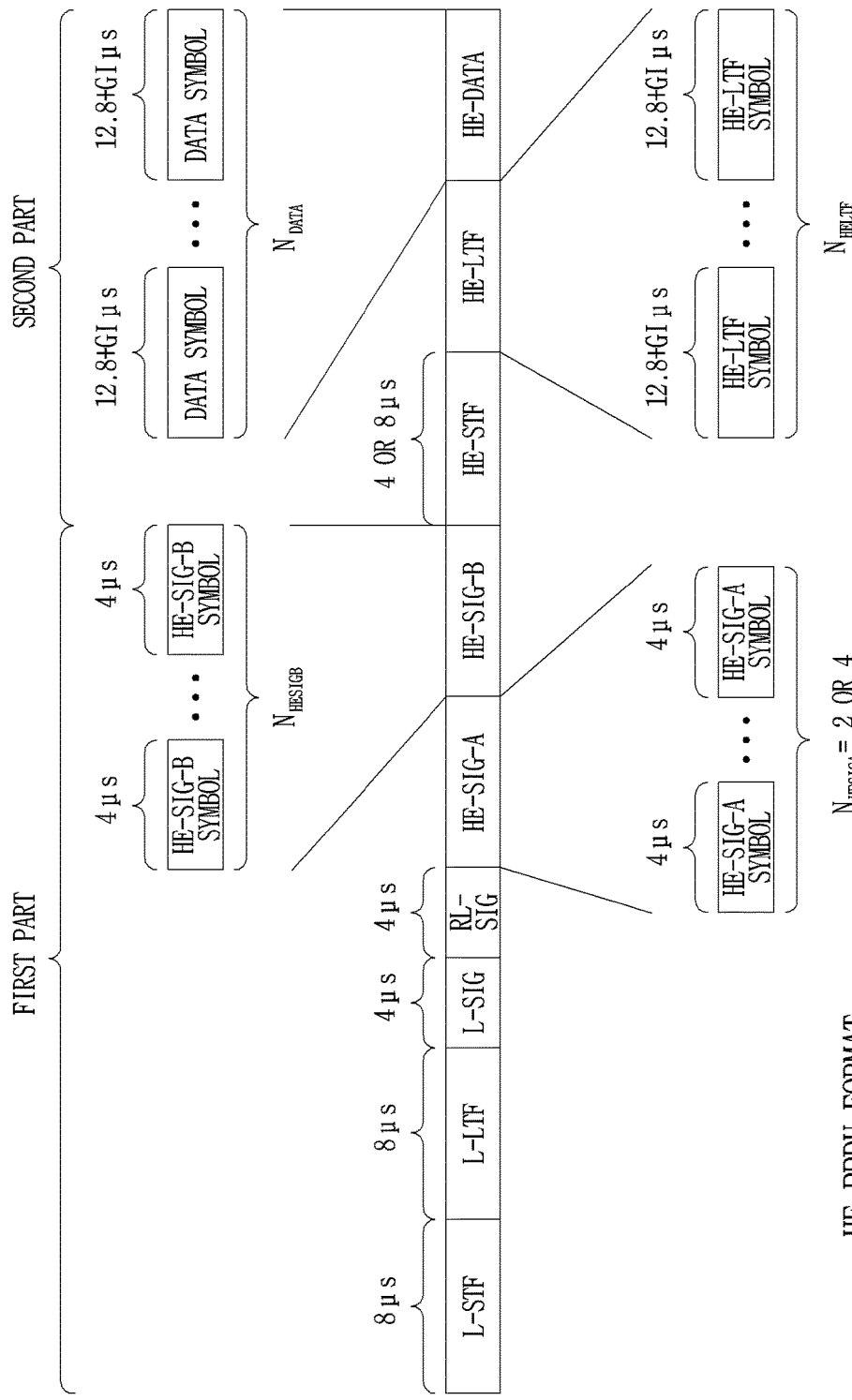
FIG. 7 depicts an exemplary HE PPDU frame format.

FIG. 7 depicts an exemplary HE PPDU frame format.

A transmitting STA may generate a PPDU frame according to the HE PPDU frame format as illustrated in FIG. 7 and transmit the PPDU frame to a receiving STA. The receiving STA may receive, detect, and process the PPDU.

The HE PPDU frame format may broadly include two parts: the first part including an L-STF field, an L-LTF field, an L-SIG field, a Repeated L-SIG (RL-SIG) field, a HE-SIG-A field, and a HE-SIG-B field and the second part including a HE-STF field, a HE-LTF field, and a HE-DATA field. 64-FFT based on a channel bandwidth of 20 MHz may be applied to the first part and a basic subcarrier spacing of 312.5 kHz and a basic DFT period of 3.2 µs may be included in the first part. 256-FFT based on a channel bandwidth of 20 MHz may be applied to the second part and a basic subcarrier spacing of 75.125 kHz and a basic DFT period of 12.8 µs may be included in the second part.

The HE-SIG-A field may include $N_{HESIGA}$ symbols, the HE-SIG-B field may include $N_{HESIGB}$ symbols, the HE-LTF field may include $N_{HELTF}$ symbols, and the HE-DATA field may include $N_{DATA}$ symbols.

A detailed description of the fields included in the HE PPDU frame format is given in Table I.

TABLE I

| Element | definition | duration | DFT period | GI | Subcarrier spacing | Description |
|---|---|---|---|---|---|---|
| Legacy(L)-STF | Non-high throughput(HT) Short Training field | 8 µs | — | — | equivalent to 1,250 kHz | L-STF of a non-trigger-based PPDU has a periodicity of 0.8 µs with 10 periods. |
| L-LTF | Non-HT Long Training field | 8 µs | 3.2 µs | 1.6 µs | 312.5 kHz | |
| L-SIG | Non-HT SIGNAL field | 4 µs | 3.2 µs | 0.8 µs | 312.5 kHz | |
| RL-SIG | Repeated Non-HT SIGNAL field | 4 µs | 3.2 µs | 0.8 µs | 312.5 kHz | |
| HE-SIG-A | HE SIGNAL A field | $N_{HESIGA}$ * 4 µs | 3.2 µs | 0.8 µs | 312.5 kHz | HE-SIG-A is duplicated on each 20 MHz segment after the legacy preamble to indicate common control information. $N_{HESIGA}$ means the number of OFDM symbols of the HE-SIG-A field and is equal to 2 or 4. |
| HE-SIG-B | HE SIGNAL B field | $N_{HESIGB}$ * 4 µs | 3.2 µs | 0.8 µs | 312.5 kHz | $N_{HESIGB}$ means the number of OFDM symbols of the HE-SIG-B field and is variable. DL MU packet contains HE-SIG-B. SU packets and UL Trigger based packets do not contain HE-SIG-B. |
| HE-STF | HE Short Training field | 4 or 8 µs | — | — | non trigger-based PPDU: (equivalent to) 1,250 kHz; trigger-based PPDU: (equivalent to) 625 kHz | HE-STF of a non-trigger-based PPDU has a periodicity of 0.8 µs with 5 periods. A non-trigger-based PPDU is not sent in response to a trigger frame. The HE-STF of a trigger-based PPDU has a periodicity of 1.6 µs with 5 periods. A trigger-based PPDU is an UL PPDU sent in response to a trigger frame. |

TABLE I-continued

| Element | definition | duration | DFT period | GI | Subcarrier spacing | Description |
|---------|------------|----------|------------|-----|--------------------|-------------|
| HE-LTF | HE Long Training field | $N_{HELTF}$ * (DTF period + GI) µs | 2xLTF: 6.4 µs 4xLTF: 12.8 µs | supports 0.8, 1.6, 3.2 µs | 2xLTF: (equivalent to) 156.25 kHz; 4xLTF: 78.125 kHz | HE PPDU shall support 2xLTF mode and 4xLTF mode. In the 2xLTF mode, HE-LTF symbol excluding GI is equivalent to modulating every other tone in an OFDM symbol of 12.8 µs excluding GI, and then removing the second half of the OFDM symbol in time domain. $N_{HELTF}$ means the number of HE-LTF symbols is equal to 1, 2, 4 6, 8. |
| HE-DATA | HE DATA field | $N_{DATA}$ * (DTF period + GI) µs | 12.8 µs | supports 0.8, 1.6, 3.2 µs | 78.125 kHz | $N_{DATA}$ means the number of HE data symbols. |

L-STF is a non-HT Short Training field and may have a duration of 8 µs and a subcarrier spacing equivalent to 1250 kHz. L-STF of a PPDU which is not based on a trigger may have a periodicity of 0.8 µs with 10 periods. Herein, the trigger corresponds to scheduling information for UL transmission.

L-LTF is a non-HT Long Training field and may have a duration of 8 µs, a DFT period of 3.2 µs, a Guard Interval (GI) of 1.6 µs, and a subcarrier spacing of 312.5 kHz.

L-SIG is a non-HT SIGNAL field and may have a duration of 4 µs, a DFT period of 3.2 µs, a GI of 0.8 µs, and a subcarrier spacing of 312.5 kHz.

RL-SIG is a Repeated Non-HT SIGNAL field and may have a duration of 4 µs, a DFT period of 3.2 µs, a GI of 0.8 µs, and a subcarrier spacing of 312.5 kHz.

L-STF, L-LTF, L-SIG, and RL-SIG may be called legacy preambles.

HE-SIG-A is a HE SIGNAL A field and may have a duration of $N_{HESIGA}$*4 µs, a DFT period of 3.2 µs, a GI of 0.8 µs, and a subcarrier spacing of 312.5 kHz. HE-SIG-A may be duplicated on each 20 MHz segment after the legacy preambles to indicate common control information. $N_{HESIGA}$ represents the number of OFDM symbols of the HE-SIG-A field and may have a value of 2 or 4.

HE-SIG-B is a HE SIGNAL B field and may have a duration of $N_{HESIGB}$*4 µs, a DFT period of 3.2 µs, a GI of 0.8 µs, and a subcarrier spacing of 312.5 kHz. $N_{HESIGB}$ represents the number of OFDM symbols of the HE-SIG-B field and may have a variable value. In addition, although a DL Multi-User (MU) packet may include the HE-SIG-B field, a Single-User (SU) packet and a UL trigger based packet may not include the HE-SIG-B field.

HE-STF is a HE Short Training field and may have a duration of 4 or 8 µs. A non-trigger based PPDU may have a subcarrier spacing equivalent to 1250 kHz and a trigger based PPDU may have a subcarrier spacing equivalent to 625 kHz. HE-STF of the non-triggered PPDU may have a periodicity of 0.8 µs with 4 periods. The non-triggered PPDU is not transmitted in response to a trigger field. HE-STF of the trigger based PPDU may have a periodicity of 1.6 µs with 5 periods. The trigger based PPDU is a UL PPDU transmitted in response to the trigger frame.

HE-LTF is a HE Long Training field and may have a duration of $N_{HELTF}$*(DFT period+GI) µs. $N_{HELTF}$ represents the number of HE-LTF symbols and may have a value of 1, 2, 4, 6, or 8. A HE PPDU may support a 2xLTF mode and a 4xLTF mode. In the 2xLTF mode, a HE-LTF symbol except for a GI is equivalent to a symbol obtained by modulating every other tone in an OFDM symbol of 12.8 µs excluding a GI and then eliminating the first half or the second half of the OFDM symbol in the time domain. In the 4xLTF mode, a HE-LTF symbol excluding a GI are equivalent to a symbol obtained by modulating every fourth tone in an OFDM symbol of 12.8 µs excluding a GI and then eliminating the first three-fourths or the last three-fourths of the OFDM symbol in the time domain. 2xLTF may have a DFT period of 6.4 µs and 4xLTF may have a DFT period of 12.8 µs. A GI of HE-LTF may support 0.8 µs, 1.6 µs, and 3.2 µs. 2xLTF may have a subcarrier spacing equivalent to 156.25 kHz and 4xLTF may have a subcarrier spacing of 78.125 kHz.

HE-DATA is a HE DATA field and may have a duration of, $N_{DATA}$*(DFT periOd+GI) µs. $N_{DATA}$ represents the number of HE-DATA symbols. HE-DATA may have a DFT period of 12.8 µs. A GI of HE-DATA may support 0.8 µs, 1.6 µs, and 3.2 µs. HE-DATA may have a subcarrier spacing of 78.125 kHz.

The above description of the fields included in the HE PPDU frame format may be combined with exemplary HE PPDU frame formats described below. For example, characteristics of fields exemplarily described below may be applied while a transmission order of the fields of the HE PPDU frame format of FIG. 7 is maintained.

Figure 8:
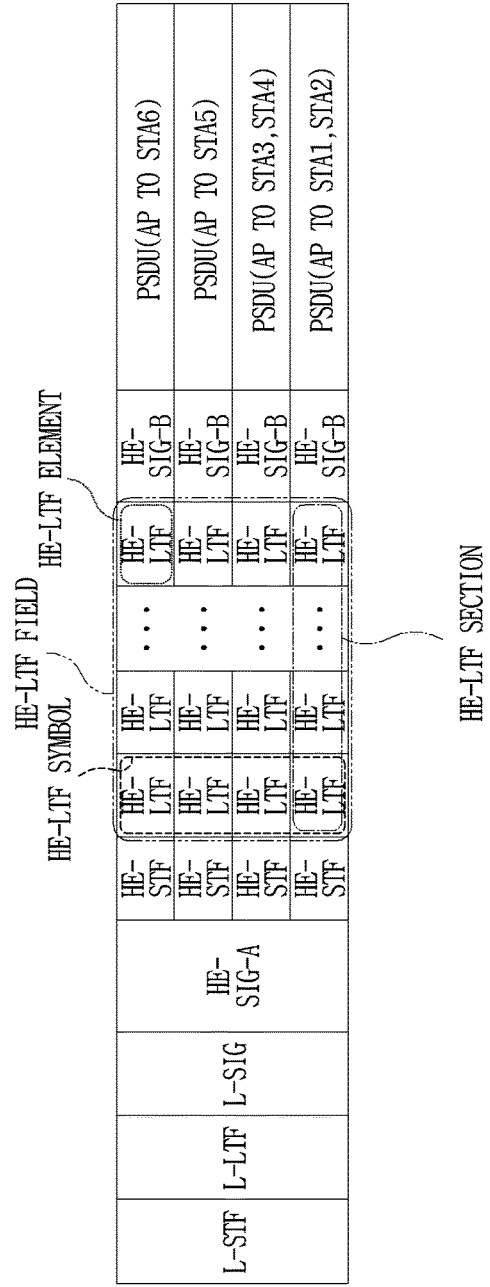
FIG. 8 depicts an exemplary High Efficiency (HE) Physical layer Protocol Data Unit (PPDU) frame format according to one embodiment.

FIG. 8 depicts an exemplary HE PPDU frame format according to one embodiment.

Referring to FIG. 8, the vertical axis represents frequency and the horizontal axis represents time. It is assumed that frequency and time increase in the upward direction and the right direction, respectively.

In the example of FIG. 8, one channel includes four subchannels. An L-STF, an L-LTF, an L-SIG, and a HE-SIG-A may be transmitted per channel (e.g., 20 MHz). A HE-STF and a HE-LTF may be transmitted on each basic subchannel unit (e.g., 5 MHz)), and a HE-SIG-B and a PSDU may be transmitted on each of the subchannels allocated to an STA. A subchannel allocated to an STA may have a size required for PSDU transmission to the STA. The size of the subchannel allocated to the STA may be N (N=1, 2, 3, . . . ) times as large as the size of basic subchannel unit (i.e., a subchannel having a minimum size). In the example of FIG. 8, the size of a subchannel allocated to each STA is equal to the size of the basic subchannel unit. For example, a first subchannel may be allocated for PSDU transmission from an AP to STA1 and STA2, a second subchannel may be allocated for PSDU transmission from the AP to STA3 and STA4, a third subchannel may be allocated for PSDU transmission from the AP to STA5, and a fourth subchannel may be allocated for PSDU transmission from the AP to STA6.

While the term subchannel is used in one embodiment, the term subchannel may also be referred to as Resource Unit (RU) or subband. In particular, terms like OFDMA subchannel, OFDMA RU, OFDMA subband can be used as synonyms for OFDMA. Terms like a bandwidth of a subchannel, a number of tones (or subcarriers) allocated to a subchannel, a number of data tones (or data subcarriers) allocated to a subchannel can be used to express a size of a subchannel. A subchannel refers to a frequency band allocated to an STA and a basic subchannel unit refers to a basic unit used to represent the size of a subchannel. While the size of the basic subchannel unit is 5 MHz in the above example, this is purely exemplary. Thus, the basic subchannel unit may have a size of 2.5 MHz.

In FIG. 8, a plurality of HE-LTF elements are distinguished in the time and frequency domains. One HE-LTF element may correspond to one OFDM symbol in time domain and one subchannel unit (i.e., a subchannel bandwidth allocated to an STA) in frequency domain. The HE-LTF elements are logical units, and the PHY layer does not necessarily operate in units of a HE-LTF element. In the following description, a HE-LTF element may be referred to shortly as a HE-LTF.

A HE-LTF symbol may correspond to a set of HE-LTF elements in one OFDM symbol in time domain and in one channel unit (e.g., 20 MHz) in frequency domain.

A HE-LTF section may correspond to a set of HE-LTF elements in one or more OFDM symbols in time domain and in one subchannel unit (i.e., a subchannel bandwidth allocated to an STA) in frequency domain.

A HE-LTF field may be a set of HE-LTF elements, HE-LTF symbols, or HE-LTF sections for a plurality of STAs.

The L-STF field is used for frequency offset estimation and phase offset estimation, for preamble decoding at a legacy STA (i.e., an STA operating in a system such as IEEE 802.11a/b/g/n/ac). The L-LTF field is used for channel estimation, for the preamble decoding at the legacy STA. The L-SIG field is used for the preamble decoding at the legacy STA and provides a protection function for PPDU transmission of a third-party STA (e.g., a third-party STA is not allowed to transmit during a certain period based on the value of a LENGTH field included in the L-SIG field).

HE-SIG-A (or HEW SIG-A) represents High Efficiency Signal A (or High Efficiency WLAN Signal A), and includes HE PPDU (or HEW PPDU) modulation parameters, etc. for HE preamble (or HEW preamble) decoding at a HE STA (or HEW STA). The set of parameters included in the HEW SIG-A field may include one or more of Very High Throughput (VHT) PPDU modulation parameters transmitted by IEEE 802.11ac stations, as listed in Table II below, to ensure backward compatibility with legacy STAs (e.g., IEEE 802.11ac stations).

TABLE II

| Two parts of VHT-SIG-A | Bit | Field | Number of bits | Description |
|---|---|---|---|---|
| VHT-SIG-A1 | B0-B1 | BW | 2 | Set to 0 for 20 MHz, 1 for 40 MHz, 2 for 80 MHz, and 3 for 160 MHz and 80 + 80 MHz |
| | B2 | Reserved | 1 | Reserved. Set to 1. |
| | B3 | STBC | 1 | For a VHT SU PPDU: Set to 1 if space time block coding is used and set to 0 otherwise. For a VHT MU PPDU: Set to 0. |
| | B4-B9 | Group ID | 6 | Set to the value of the TXVECTOR parameter GROUP_ID. A value of 0 or 63 indicates a VHT SU PPDU; otherwise, indicates a VHT MU PPDU. |
| | B10-B21 | NSTS/Partial AID | 12 | For a VHT MU PPDU: NSTS is divided into 4 user positions of 3 bits each. User position p, where $0 \leq p \leq 3$, uses bits B(10 + 3p) to B(12 + 3p). The number of space-time streams for user u are indicated at user position p = USER_POSITION[u] where u = 0, 1, . . . , NUM_USERS − 1 and the notation A[b] denotes the value of array A at index b. Zero space-time streams are indicated at positions not listed in the USER_POSITION array. Each user position is set as follows: Set to 0 for 0 space-time streams Set to 1 for 1 space-time stream Set to 2 for 2 space-time streams Set to 3 for 3 space-time streams Set to 4 for 4 space-time streams Values 5-7 are reserved For a VHT SU PPDU: B10-B12 Set to 0 for 1 space-time stream Set to 1 for 2 space-time streams Set to 2 for 3 space-time streams Set to 3 for 4 space-time streams Set to 4 for 5 space-time streams Set to 5 for 6 space-time streams Set to 6 for 7 space-time streams Set to 7 for 8 space-time streams B13-B21 Partial AID: Set to the value of the TXVECTOR parameter PARTIAL_AID. Partial AID provides an abbreviated indication of the intended recipient(s) of the PSDU (see 9.17a). |

TABLE II-continued

| Two parts of VHT-SIG-A | Bit | Field | Number of bits | Description |
|---|---|---|---|---|
| | B22 | TXOP_PS_NOT_ALLOWED | 1 | Set to 0 by VHT AP if it allows non-AP VHT STAs in TXOP power save mode to enter Doze state during a TXOP. Set to 1 otherwise. The bit is reserved and set to 1 in VHT PPDUs transmitted by a non-AP VHT STA. |
| | B23 | Reserved | 1 | Set to 1 |
| VHT-SIG-A2 | B0 | Short GI | 1 | Set to 0 if short guard interval is not used in the Data field. Set to 1 if short guard interval is used in the Data field. |
| | B1 | Short GI $N_{SYM}$ Disambiguation | 1 | Set to 1 if short guard interval is used and $N_{SYM}$ mod 10 = 9; otherwise, set to 0. $N_{SYM}$ is defined in 22.4.3. |
| | B2 | SU/MU[0] Coding | 1 | For a VHT SU PPDU, B2 is set to 0 for BCC, 1 for LDPC For a VHT MU PPDU, if the MU[0] NSTS field is nonzero, then B2 indicates the coding used for user u with USER_POSITION[u] = 0; set to 0 for BCC and 1 for LDPC. If the MU[0] NSTS field is 0, then this field is reserved and set to 1. |
| | B3 | LDPC Extra OFDM Symbol | 1 | Set to 1 if the LDPC PPDU encoding process (if an SU PPDU), or at least one LDPC user's PPDU encoding process (if a VHT MU PPDU), results in an extra OFDM symbol (or symbols) as described in 22.3.10.5.4 and 22.3.10.5.5. Set to 0 otherwise. |
| | B4-B7 | SU VHT-MCS/MU[1-3] Coding | 4 | For a VHT SU PPDU: VHT-MCS index For a VHT MU PPDU: If the MU[1] NSTS field is nonzero, then B4 indicates coding for user u with USER_POSITION[u] = 1: set to 0 for BCC, 1 for LDPC. If the MU[1] NSTS field is 0, then B4 is reserved and set to 1. If the MU[2] NSTS field is nonzero, then B5 indicates coding for user u with USER_POSITION[u] = 2: set to 0 for BCC, 1 for LDPC. If the MU[2] NSTS field is 0, then B5 is reserved and set to 1. If the MU[3] NSTS field is nonzero, then B6 indicates coding for user u with USER_POSITION[u] = 3: set to 0 for BCC, 1 for LDPC. If the MU[3] NSTS field is 0, then B6 is reserved and set to 1. B7 is reserved and set to 1 |
| | B8 | Beamformed | 1 | For a VHT SU PPDU: Set to 1 if a Beamforming steering matrix is applied to the waveform in an SU transmission as described in 20.3.11.11.2, set to 0 otherwise. For a VHT MU PPDU: Reserved and set to 1 NOTE-If equal to 1 smoothing is not recommended. |
| | B9 | Reserved | 1 | Reserved and set to 1 |
| | B10-B17 | CRC | 8 | CRC calculated as in 20.3.9.4.4 with c7 in B10. Bits 0-23 of HT-SIG1 and bits 0-9 of HT-SIG2 are replaced by bits 0.23 of VHT-SIG-A1 and bits 0-9 of VHT-SIG-A2, respectively. |
| | B18-B23 | Tail | 6 | Used to terminate the trellis of the convolutional decoder. Set to 0. |

Table II illustrates fields, bit positions, numbers of bits, and descriptions included in each of two parts, VHT-SIG-A1 and VHT-SIG-A2, of the VHT-SIG-A field defined by the IEEE 802.11ac standard. For example, a BW (BandWidth) field occupies two Least Significant Bits (LSBs), B0 and B1 of the VHT-SIG-A1 field and has a size of 2 bits. If the 2 bits are set to 0, 1, 2, or 3, the BW field indicates 20 MHz, 40 MHz, 80 MHz, or 160 and 80+80 MHz. For details of the fields included in the VHT-SIG-A field, refer to the IEEE 802.11ac-2013 technical specification, which is hereby incorporated by reference. In the HE PPDU frame format, the HE-SIG-A field may include one or more of the fields included in the VHT-SIG-A field, and it may provide backward compatibility with IEEE 802.11 ac stations.

Figure 9:
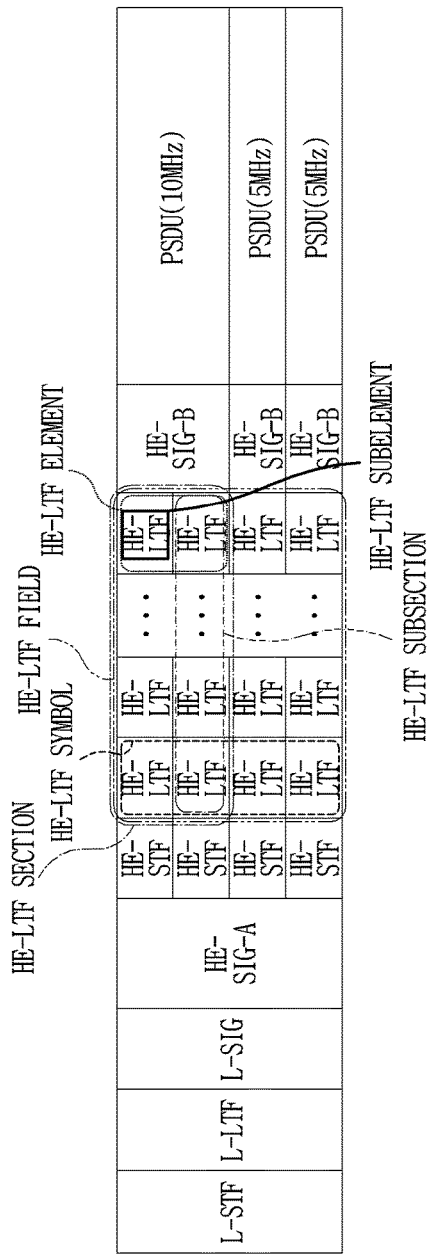
FIG. 9 depicts subchannel allocation in a HE PPDU frame format according to one embodiment.

FIG. 9 depicts subchannel allocation in the HE PPDU frame format according to one embodiment.

In FIG. 9, it is assumed that information indicating subchannels allocated to STAs in HE PPDU indicates that 0 MHz subchannel is allocated to STA1 (i.e., no subchannel is allocated), a 5-MHz subchannel is allocated to each of STA2 and STA3, and a 10-MHz subchannel is allocated to STA4.

In the example of FIG. 9, an L-STF, an L-LTF, an L-SIG, and a HE-SIG-A may be transmitted per channel (e.g., 20 MHz), a HE-STF and a HE-LTF may be transmitted on each basic subchannel unit (e.g., 5 MHz), and a HE-SIG-B and a PSDU may be transmitted on each of the subchannels allocated to STAs. A subchannel allocated to an STA has a size required for PSDU transmission to the STA. The size of the subchannel allocated to the STA may be an N (N=1, 2, 3, . . . ) multiple of the size of the basic subchannel unit (i.e., a minimum-size subchannel unit). In the example of FIG. 9, the size of a subchannel allocated to STA2 is equal to that of the basic subchannel unit, the size of a subchannel allocated to STA3 is equal to that of the basic subchannel unit, and the size of a subchannel allocated to STA4 is twice the size of the basic subchannel unit.

FIG. 9 illustrates a plurality of HE-LTF elements and a plurality of HE-LTF subelements which are distinguished in the time and frequency domains. One HE-LTF element may correspond to one OFDM symbol in the time domain and one subchannel unit (i.e., the bandwidth of a subchannel allocated to an STA) in the frequency domain. One HE-LTF subelement may correspond to one OFDM symbol in the time domain and one basic subchannel unit (e.g. 5 MHz) in the frequency domain. In the example of FIG. 9, one HE-LTF element includes one HE-LTF subelement in the 5-MHz subchannel allocated to STA2 or STA3. On the other hand, one HE-LTF element includes two HE-LTF subelements in the third subchannel (i.e., 10-MHz subchannel, allocated to STA4). A HE-LTF element and a HE-LTF subelement are logical units and the PHY layer does not always operate in units of a HE-LTF element or HE-LTF subelement.

A HE-LTF symbol may correspond to a set of HE-LTF elements in one OFDM symbol in the time domain and one channel unit (e.g. 20 MHz) in the frequency domain. That is, one HE-LTF symbol may be divided into HE-LTF elements by a subchannel width allocated to an STA and into HE-LTF subelements by the width of the basic subchannel unit in the frequency domain.

A HE-LTF section may correspond to a set of HE-LTF elements in one or more OFDM symbols in the time domain and one subchannel unit (i.e. the bandwidth of a subchannel allocated to an STA) in the frequency domain. A HE-LTF subsection may correspond to a set of HE-LTF elements in one or more OFDM symbols in the time domain and one basic subchannel unit (e.g., 5 MHz) in the frequency domain. In the example of FIG. 9, one HE-LTF section includes one HE-LTF subsection in the 5-MHz subchannel allocated to STA2 or STA3. On the other hand, one HE-LTF section includes two HE-LTF subsections in the third subchannel (i.e., 10-MHz subchannel, allocated to STA4).

A HE-LTF field may correspond to a set of HE-LTF elements (or subelements), HE-LTF symbols, or HE-LTF sections (or subsections) for a plurality of STAs.

For the afore-described HE PPDU transmission, subchannels allocated to a plurality of HE STAs may be contiguous in the frequency domain. In other words, for HE PPDU transmission, the subchannels allocated to the HE STAs may be sequential and any intermediate one of the subchannels of one channel (e.g., 20 MHz) may not be allowed to be unallocated or empty. Referring to FIG. 8, if one channel includes four subchannels, it may not be allowed to keep the third subchannel unallocated and empty, while the first, second, and fourth subchannels are allocated to STAs. However, the embodiments do not exclude non-allocation of an intermediate subchannel of one channel to an STA.

Figure 10:
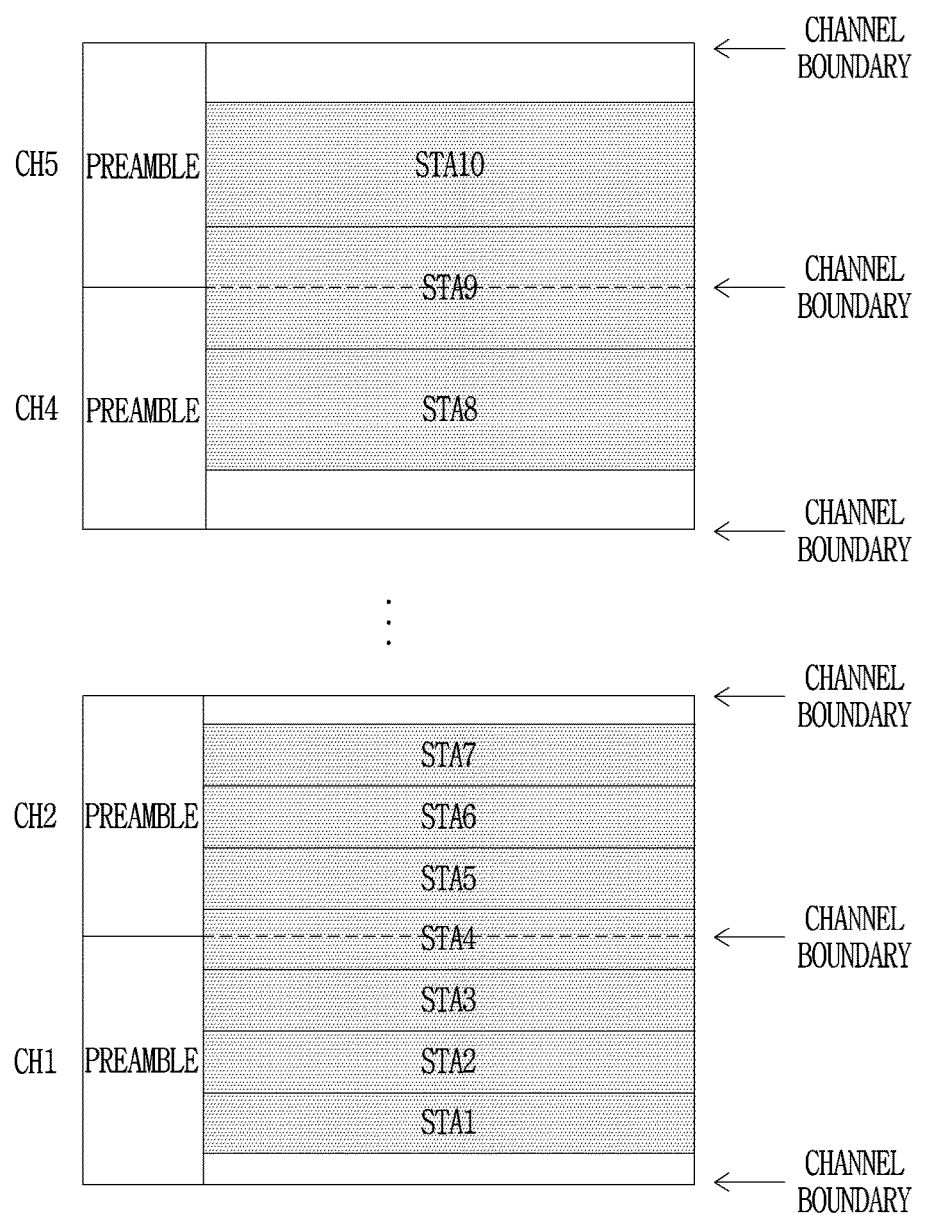
FIG. 10 depicts a subchannel allocation method according to one embodiment.

FIG. 10 depicts a subchannel allocation method according to one embodiment.

In the example of FIG. 10, a plurality of contiguous channels (e.g., 20-MHz-bandwidth channels) and boundaries of the plurality of contiguous channels are shown. In FIG. 10, a preamble may correspond to an L-STF, an L-LTF, an L-SIG, and a HE-SIG-A as illustrated in the examples of FIGS. 8 and 9.

A subchannel for each HE STA may be allocated within one channel, and may not be allocated with partially overlapping between a plurality of channels. That is, if there are two contiguous 20-MHz channels CH1 and CH2, subchannels for STAs paired for MU-MIMO-mode or OFDMA-mode transmission may be allocated either within CH1 or within CH2, and it may be prohibited that one part of a subchannel exists in CH1 and another part of the subchannel exists in CH2. This means that one subchannel may not be allocated with crossing a channel boundary. From the perspective of RUs supporting the MU-MIMO or OFDMA mode, a bandwidth of 20 MHz may be divided into one or more RUs, and a bandwidth of 40 MHz may be divided into one or more RUs in each of two contiguous 20-MHz bandwidths, and no RU is allocated with crossing the boundary between two contiguous 20-MHz bandwidths.

As described above, it is not allowed that one subchannel belongs to two or more 20-MHz channels. Particularly, a 2.4-GHz OFDMA mode may support a 20-MHz OFDMA mode and a 40-MHz OFDMA mode. In the 2.4-GHz OFDMA mode, it may not be allowed that one subchannel belongs to two or more 20-MHz channels.

FIG. 10 is based on the assumption that subchannels each having the size of a basic subchannel unit (e.g., 5 MHz) in CH1 and CH2 are allocated to STA1 to STA7, and subchannels, each having double the size (e.g., 10 MHz) of the basic subchannel unit in CH4 and CH5, are allocated to STA8, STA9, and STA10.

As illustrated in the lower part of FIG. 10, although a subchannel allocated to STA1, STA2, STA3, STA5, STA6, or STA7 is fully overlapped only with one channel (i.e., without crossing the channel boundary, or belonging only to one channel), a subchannel allocated to STA4 is partially overlapped with the two channels (i.e., crossing the channel boundary, or belonging to two channels). In the foregoing example, the subchannel allocation to STA4 is not allowed.

As illustrated in the upper part of FIG. 10, although a subchannel allocated to STA8 or STA10 is fully overlapped only with one channel (i.e., without crossing the channel boundary, or belonging only to one channel), a subchannel allocated to STA9 is partially overlapped with two channels (i.e., crossing the channel boundary, or belonging to two channels). In the foregoing example, the subchannel allocation to STA9 is not allowed.

On the other hand, in some embodiments, it may be allowed to allocate a subchannel partially overlapped between a plurality of channels (i.e., crossing the channel boundary, or belonging to two or more channels). For example, in SU-MIMO mode transmission, a plurality of contiguous channels may be allocated to an STA and any of one or more subchannels allocated to the STA may cross the boundary between two contiguous channels.

While the following description is given with an assumption that one subchannel has a channel bandwidth of 5 MHz in one channel having a channel bandwidth of 20 MHz, this is provided to simplify the description of the principle of the embodiments and thus should not be construed as limiting the embodiments of the invention. For example, the bandwidths of a channel and a subchannel may be defined or allocated as values other than the above examples. In addition, a plurality of subchannels in one channel may have the same or different channel widths.

FIG. 11 depicts the starting and ending points of a HE-LTF field in the HE PPDU frame format according to one embodiment.

To support the MU-MIMO mode and the OFDMA mode, the HE PPDU frame format according to the one embodiment may include, in the HE-SIG-A field, information about the number of spatial streams to be transmitted to a HE STA allocated to each sub channel.

If MU-MIMO-mode or OFDMA-mode transmission is performed to a plurality of HE STAs on one subchannel, the number of spatial streams to be transmitted to each of the HE STAs may be provided in the HE-SIG-A or HE-SIG-B field, which will be described later in additional detail.

FIG. 11 is based on the assumption that a first 5-MHz subchannel is allocated to STA1 and STA2 and two spatial streams are transmitted to each STA in a DL MU-MIMO or OFDMA mode (i.e., a total of four spatial streams are transmitted on one subchannel). For this purpose, a HE-STF, a HE-LTF, a HE-LTF, a HE-LTF, a HE-LTF, and a HE-SIG-B follow the HE-SIG-A field on the subchannel. The HE-STF is used for frequency offset estimation and phase offset estimation for the 5-MHz subchannel. The HE-LTFs are used for channel estimation for the 5-MHz subchannel. Since the subchannel carries four spatial streams, as many HE-LTFs (i.e., HE-LTF symbols or HE-LTF elements in a HE-LTF section) as the number of the spatial streams, that is, four HE-LTFs are transmitted to support MU-MIMO transmission.

According to an example, the relationship between a total number of spatial streams transmitted on one subchannel and a number of HE-LTFs is listed in Table III.

TABLE III

| Total number of spatial streams transmitted on one subchannel | Number of HE-LTFs |
| --- | --- |
| 1 | 1 |
| 2 | 2 |
| 3 | 4 |
| 4 | 4 |
| 5 | 6 |
| 6 | 6 |
| 7 | 8 |
| 8 | 8 |

Referring to Table III as an example, if one spatial stream is transmitted on one subchannel, at least one HE-LTF needs to be transmitted on the subchannel. If an even number of spatial streams are transmitted on one subchannel, at least as many HE-LTFs as the number of the spatial streams need to be transmitted. If an odd number of spatial streams greater than one are transmitted on one subchannel, at least as many HE-LTFs as a number that is 1 larger than the number of the spatial streams need to be transmitted.

Referring to FIG. 11 again, it is assumed that the second 5-MHz subchannel is allocated to STA3 and STA4 and one spatial stream per STA is transmitted in the DL MU-MIMO or OFDMA mode (i.e., a total of two spatial streams are transmitted on one subchannel). In this case, two HE-LTFs need to be transmitted on the second subchannel, however, in the example of FIG. 11, a HE-STF, a HE-LTF, a HE-LTF, a HE-LTF, a HE-LTF, and a HE-SIG-B follow the HE-SIG-A field on the subchannel (i.e., four HE-LTFs are transmitted). This is for the purpose of setting the same starting time of PSDU transmission for subchannels allocated to other STAs paired with STA3 and STA4 for MU-MIMO transmission. If only two HE-LTFs are transmitted on the second subchannel, PSDUs are transmitted at different time points on the first and second subchannels. PSDU transmission on each subchannel at a different time point results in discrepancy between OFDM symbol timings of subchannels, thereby disrupting orthogonality (i.e., orthogonality is not maintained). To overcome this problem, an additional constraint needs to be imposed for HE-LTF transmission.

Basically, transmission of as many HE-LTFs as required is sufficient in an SU-MIMO or non-OFDMA mode. However, timing synchronization (or alignment) with fields transmitted on subchannels for other paired STAs is required in the MU-MIMO or OFDMA mode. Accordingly, the number of HE-LTFs may be determined for all other subchannels based on a subchannel having the maximum number of streams in MU-MIMO-mode or OFDMA-mode transmission.

Specifically, the numbers of HE-LTFs may be determined for all subchannels according to the maximum of the number of HE-LTFs (HE-LTF symbols or HE-LTF elements in a HE-LTF section) required according to the total number of spatial streams transmitted on each subchannel, for a set of HE STAs allocated to each subchannel. A "set of HE STAs allocated to each subchannel" is one HE STA in the SU-MIMO mode, and a set of HE STAs paired across a plurality of subchannels in the MU-MIMO mode. The 'number of spatial streams transmitted on each subchannel' is the number of spatial streams transmitted to one HE STA in the SU-MIMO mode, and the number of spatial streams transmitted to a plurality of HE STAs paired on the subchannel in the MU-MIMO mode.

That is, it may be said that a HE-LTF field starts at the same time point and ends at the same time point in a HE PPDU for all users (i.e. HE STAs) in MU-MIMO-mode or OFDMA-mode transmission. Or it may be said that the lengths of HE-LTF sections are equal on a plurality of subchannels for all users (i.e. HE STAs) in MU-MIMO-mode or OFDMA-mode transmission. Or it may be said that the number of HE-LTF elements included in each HE-LTF section is equal on a plurality of subchannels for all users (i.e. HE STAs) in MU-MIMO-mode or OFDMA-mode transmission. Accordingly, PSDU transmission timings may be synchronized among a plurality of subchannels for all HE STAs in MU-MIMO-mode or OFDMA-mode transmission.

As described above, the number of HE-LTF symbols (refer to FIG. 8) may be 1, 2, 4, 6, or 8 in HE PPDU transmission in the MU-MIMO or OFDMA mode, determined according to the maximum of the numbers of spatial streams on each of a plurality of subchannels. A different number of spatial streams may be allocated to each of a plurality of subchannels, and the number of spatial streams allocated to one subchannel is the number of total spatial streams for all users allocated to the subchannel. That is, the number of HE-LTF symbols may be determined according to the number of spatial streams allocated to a subchannel having a maximum number of spatial streams by comparing the number of total spatial streams for all users allocated to one of a plurality of subchannels with the number of total spatial streams for all users allocated to another subchannel.

Specifically, in HE PPDU transmission in the OFDMA mode, the number of HE-LTF symbols may be 1, 2, 4, 6, or 8, determined based on the number of spatial streams transmitted in a subchannel having a maximum number of spatial streams across a plurality of subchannels. Further, in HE PPDU transmission in the OFDMA mode, the number of HE-LTF symbols may be determined based on whether the number of spatial streams transmitted in a subchannel having a maximum number of spatial streams across a plurality of subchannels is odd or even (refer to Table III). That is, in HE PPDU transmission in the OFDMA mode, when the number (e.g., K) of spatial streams transmitted in a subchannel having a maximum number of spatial streams across a plurality of subchannels is an even number, the number of HE-LTF symbols may be equal to K. In HE PPDU transmission in the OFDMA mode, when the number, K, of spatial streams transmitted in a subchannel having a maximum number of spatial streams across a plurality of subchannels is an odd number greater than one, the number of HE-LTF symbols may be equal to K+1.

When only one STA is allocated to one subchannel in OFDMA mode (i.e., OFDMA mode without using MU- MIMO), a subchannel having a maximum number of spatial streams across a plurality of subchannels may be determined by the number of spatial streams for an STA allocated to each subchannel. When more than one STA is allocated to one subchannel in OFDMA mode (i.e., OFDMA mode using MU-MIMO), a subchannel having a maximum number of spatial streams across a plurality of subchannels may be determined by the number of STAs allocated to each subchannel and the number of spatial streams for each STA allocated to each subchannel (e.g., if STA1 and STA2 are allocated to one subchannel, sum of the number of spatial streams for STA1 and the number of spatial streams for STA2).

When transmitting a HE PPDU frame in the MU-MIMO or OFDMA mode, a transmitter may generate P (where P is an integer equal to or larger than 1) HE-LTF symbols (refer to FIG. 8) and transmit a HE PPDU frame including at least the P HE-LTF symbols and a Data field to a receiver. The HE PPDU frame may be divided into Q subchannels in the frequency domain (Q is an integer equal to or larger than 2). Each of the P HE-LTF symbols may be divided into Q HE-LTF elements corresponding to the Q subchannels in the frequency domain. That is, the HE PPDU may include P HE-LTF elements on one subchannel (herein, the P HE-LTF elements may belong to one HE-LTF section on the subchannel).

As described above, the number of HE-LTF elements (i.e., P) in one of the Q subchannels may be equal to the number of HE-LTF elements (i.e., P) of another subchannel. Also, the number of HE-LTF elements (i.e., P) included in a HE-LTF section in one of the Q subchannels may be equal to the number of HE-LTF elements (i.e., P) included in a HE-LTF section in another subchannel. The HE-LTF section of one of the Q subchannels may start and end at the same time points as the HE-LTF section of another subchannel. Also, the HE-LTF sections may start and end at the same time points across the Q subchannels (i.e., across all users or STAs).

Referring to FIG. 11 again, the third 5-MHz subchannel is allocated to STA5 and one spatial stream is transmitted on the subchannel in SU-MIMO (considering all subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

The fourth 5-MHz subchannel is allocated to STA6 and one spatial stream is transmitted on the subchannel in SU-MIMO (considering all other subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

In the example of FIG. 11, the remaining two HE-LTFs except two HE-LTFs required for channel estimation of STA3 and STA4 on the second subchannel, the remaining three HE-LTFs except one HE-LTF required for channel estimation of STA5 on the third subchannel, and the remaining three HE-LTFs except one HE-LTF required for channel estimation of STA6 on the fourth subchannel may be said to be placeholders that are not actually used for channel estimation at the STAs.

FIG. 12 depicts a HE-SIG-B field and a HE-SIG-C field in the HE PPDU frame format according to one embodiment.

To effectively support MU-MIMO-mode or OFDMA-mode transmission in the HE PPDU frame format according to one embodiment, independent signaling information may be transmitted on each subchannel. Specifically, a different number of spatial streams may be transmitted to each of a plurality of HE STAs that receive an MU-MIMO-mode or OFDMA-mode transmission simultaneously. Therefore, information about the number of spatial streams to be transmitted should be indicated to each HE STA.

Information about the number of spatial streams on one channel may be included in, for example, a HE-SIG-A field. A HE-SIG-B field may include spatial stream allocation information about one subchannel. Also, a HE-SIG-C field may be transmitted after transmission of HE-LTFs, including Modulation and Coding Scheme (MCS) information about a PSDU and information about the length of the PSDU, etc.

Figure 13:
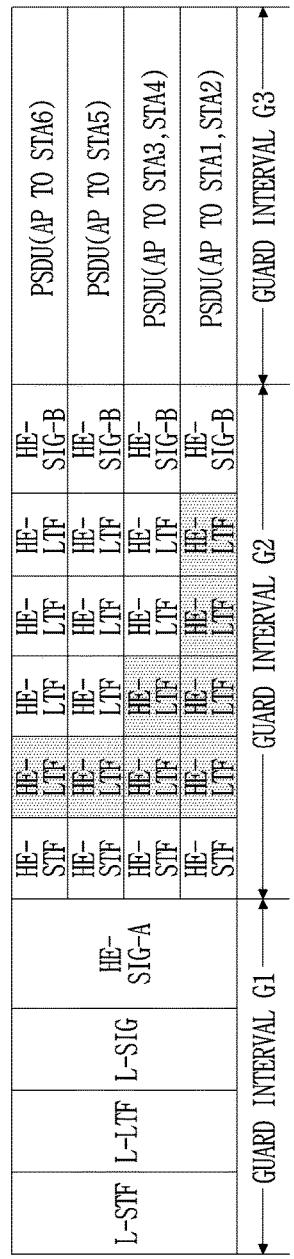
FIG. 13 depicts another example of a HE PPDU frame format according to one embodiment.

FIG. 13 depicts OFDM symbol durations and GI lengths in the HE PPDU frame format according to one embodiment.

In the HE PPDU frame format according to one embodiment, L-STF, L-LTF, L-SIG, and HE-SIG-A fields may be configured with 4.0-μs OFDM symbols based on 64-FFT. One OFDM symbol has a GI of 0.8 μs. In one embodiment, a GI value applied to the L-STF, L-LTF, L-SIG, and HE-SIG-A fields is defined as G1. The L-STF, L-LTF, L-SIG, and HE-SIG-A fields may include 3.2-μs OFDM symbols based on 64-FFT, excluding the GIs. The term 64 FFT-based symbol is used mainly based on a channel bandwidth of 20 MHz. If the term 64 FFT-based symbol is used irrespective of a channel bandwidth, a 64 FFT-based symbol may mean a symbol having a symbol duration of 3.2 μs and a subcarrier spacing of 312.5 kHz.

The following HE-STF, HE-LTF, HE-SIG-B, and PSDU fields may include 16-μs OFDM symbols based on 256-FFT. The OFDM symbol duration may be changed according to a GI value. Two types of GI values may be defined for one OFDM symbol during different time periods. A GI value applied to the OFDM symbols of the HE-STF, HE-LTF, and HE-SIG-B fields is defined as G2 and a GI value applied to the OFDM symbols of the PSDU is defined as G3. Excluding the GIs, the HE-STF, HE-LTF, HE-SIG-B, and PSDU fields may be configured with 12.8-μs OFDM symbols based on 256-FFT. The term 256 FFT-based symbol is used mainly based on a channel bandwidth of 20 MHz. If the term 256 FFT-based symbol is used irrespective of a channel bandwidth, a 256 FFT-based symbol may mean a symbol having a symbol duration of 12.8 μs and a subcarrier spacing of 78.125 kHz.

The values of G2 and G3 may be equal or different. If G2 and G3 are equal, G2 and G3 may be defined as one parameter without distinguishing between G2 and G3. In one embodiment, unlike G1, G2 and G3 may vary according to a transmitted PPDU transmission vector, rather than being fixed values (i.e., predetermined values). This is because the lengths of the HE-STF, HE-LTF, and HE-SIG-B fields to which G2 is applied may vary according to a PPDU transmission vector and the length of the PSDU to which G3 is applied may also vary according to the PPDU transmission vector.

For example, G1 may have a fixed value (i.e., a predetermined value) of 0.8 µs, G2 may be a value selected from 3.2 µs, 1.6 µs, 0.8 µs, and 0.4 µs, and G3 may be a value selected from among 3.2 µs, 1.6 µs, 0.8 µs, and 0.4 µs. Also, G1 may have a fixed value (i.e., a predetermined value) of 0.8 µs, and G2 or G3 may be a value selected or determined from among 3.2 µs, 1.6 µs, 0.8 µs, and 0.4 µs. In one embodiment, G1 does not require separate signaling because G1 is a fixed value, and signaling information indicating G2 and G3 may be provided to a HE STA in the HE-SIG-A field.

In one embodiment, G2 and G3 are applied commonly across all OFDM symbols transmitted during a corresponding time period and across all subchannels. Accordingly, PSDU transmission timings and OFDM symbol timings may be synchronized. For example, it may not be allowed to apply a 3.2-µs G2 value to a subchannel and a 1.6-µs or 0.8-µs G2 value to another subchannel during a specific time period. Rather, the same 3.2-µs G2 value may be applied to the subchannels during the same time period. In a similar example, it may not be allowed to apply a 1.6-µs G3 value to a subchannel and a 3.2-µs or 0.8-µs G3 value to another subchannel during a specific time period. Rather, the same 1.6-µs G3 value may be applied to the subchannels during the same time period.

In the case where a HE PPDU frame format having HE-LTF sections of different lengths for subchannels is used (i.e., in the case where the number of HE-LTFs is not determined for each subchannel based on the maximum of the number of HE-LTFs required according to the total number of spatial streams transmitted on each subchannel in a set of HE STAs allocated to each of subchannels, as described in the example of FIG. 11), if the values of G2 and G3 are different, PSDUs are transmitted on different subchannels at different time points and OFDM symbol timings are not synchronized. Therefore, values of G2 and G3 may need to be selected or determined as a same value.

In the case where a HE PPDU frame format having HE-LTF sections of the same length for subchannels is used (i.e., in the case where the number of HE-LTFs is determined for each subchannel based on the maximum of the numbers of HE-LTFs required according to the total number of spatial streams transmitted on each subchannel in a set of HE STAs allocated to each of subchannels, as described in the example of FIG. 11), even though the values of G2 and G3 are different, PSDUs are transmitted on the subchannels at the same time point, without causing discrepancy between OFDM symbol timings. Therefore, values of G2 and G3 may be selected or determined as different values. However, even in this case, the embodiments do not exclude that values of G2 and G3 may be selected or determined as a same value.

In the example of FIG. 13, OFDM symbol durations S1, S2, and S3 may be applied respectively to time periods to which the GIs G1, G2, and G3 are applied.

Figure 14:
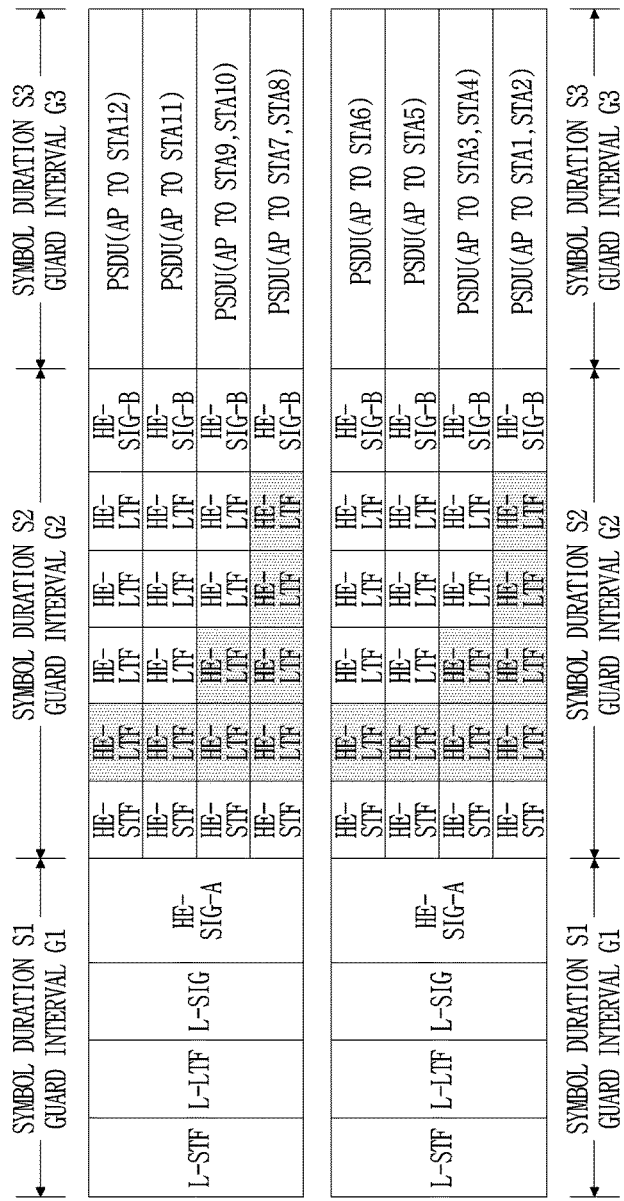
FIG. 14 depicts an exemplary HE PPDU frame format for a wide channel band according to one embodiment.

FIG. 14 depicts an exemplary HE PPDU frame format for a wide channel band according to one embodiment.

Referring to FIG. 14, the HE PPDU frame format for one 20-MHz channel illustrated in the example of FIG. 13 is extended to two 20-MHz channels. Similarly, HE PPDU frame formats for the channel bandwidths of 80 MHz and 160 MHz may be configured by extending the HE PPDU frame format for one 20-MHz channel illustrated in the example of FIG. 13 to four and eight 20-MHz channels, respectively.

There is no modification involved in extending the HE PPDU frame format for one 20-MHz channel. In other words, all subchannels across one or more 20-MHz channels are the same in terms of PSDU transmission time points, OFDM symbol durations, and GIs.

From this viewpoint, the example described with reference to FIG. 11 in which "the lengths of HE-LTF sections across subchannels are equal" may be extended to simultaneous application on a channel basis as well as on a subchannel basis. Therefore, PSDU transmission timings and OFDM symbol timings are synchronized for users paired for MU-MIMO-mode or OFDMA-mode transmission, thus maintaining orthogonality. This channel-based example will be described below.

Basically in SU-MIMO-mode or non-OFDMA-mode transmission, it is sufficient to transmit as many HE-LTFs as required. However, the timings of fields transmitted on subchannels for other paired STAs need to be synchronized (or aligned) across all subchannels over one or more 20-MHz channels in MU-MIMO-mode or OFDMA-mode transmission. Therefore, the numbers of HE-LTFs on all other subchannels over one or more 20-MHz channels may be determined based on a subchannel having a maximum number of streams among all subchannels over one or more 20-MHz channels in MU-MIMO-mode or OFDMA-mode transmission.

Specifically, the number of HE-LTFs to be transmitted on all subchannels may be determined according to the maximum of the number of HE-LTFs required according to the total numbers of spatial streams transmitted on each subchannel over one or more 20-MHz channels, for a set of HE STAs allocated to each of the subchannels. Herein, 'the set of HE STAs allocated to each of the subchannels over one or more 20-MHz channels' is one HE STA in the SU-MIMO mode, whereas it is a set of a plurality of HE STAs paired on all subchannels over one or more 20-MHz channels in the MU-MIMO mode or OFDMA mode. The 'total number of spatial streams transmitted on each of all subchannels over one or more 20-MHz channels' is the number of spatial streams transmitted to one HE STA in the SU-MIMO mode and the number of spatial streams transmitted to a plurality of HE STAs paired on the subchannel in the MU-MIMO mode or OFDMA mode.

That is, it may be said that a HE-LTF field starts at the same time point and ends at the same time point on all subchannels over one or more 20-MHz channels for all users (i.e., HE STAs) in MU-MIMO-mode or OFDMA-mode transmission of a HE PPDU. Or it may be said that the lengths of HE-LTF sections are equal on all subchannels over one or more 20-MHz channels for all HE STAs in MU-MIMO-mode or OFDMA-mode transmission. Or it may be said that the number of HE-LTF elements included in each HE-LTF section is equal in all subchannels over one or more 20-MHz channels for all HE STAs in MU-MIMO-mode or OFDMA-mode transmission. Accordingly, PSDU transmission timings may be synchronized between all subchannels over one or more 20-MHz channels for all HE STAs in MU-MIMO-mode or OFDMA-mode transmission.

In FIG. 14, the OFDM symbol duration and GI of L-STF, L-LTF, L-SIG, and HE-SIG-A fields on the first 20-MHz channel are S1 and G1, respectively. Like the first 20-MHz channel, the second 20-MHz channel has S1 and G1 respectively as the OFDM symbol duration and GI of L-STF, L-LTF, L-SIG, and HE-SIG-A fields.

In FIG. 14, the OFDM symbol duration and GI of a HE-STF field, a plurality of HE-LTFs, and a HE-SIG-B field on the first 20-MHz channel are S2 and G2, respectively. Like the first 20-MHz channel, the OFDM symbol duration and GI of a HE-STF field, a plurality of HE-LTFs, and a HE-SIG-B field on the second 20-MHz channel are also S2 and G2, respectively.

In FIG. 14, the OFDM symbol duration and GI of a PSDU on the first 20-MHz channel are S3 and G3, respectively. Like the first 20-MHz channel, the OFDM symbol duration and GI of a PSDU on the second 20-MHz channel are also S3 and G3, respectively.

This example it is shown that if the OFDM symbol duration and GI of one 20-MHz channel are determined based on 64-FFT, the OFDM symbol duration and GI of the other 20-MHz channel(s) should be determined based on 64-FFT. In other words, if the OFDM symbol duration and GI of one 20-MHz channel are determined based on 64-FFT, the OFDM symbol duration and GI of the other 20-MHz channel(s) should not be determined based on 256-FFT.

In a modified example, although subchannels within one 20-MHz channel may have the same OFDM symbol durations and the same GIs, subchannels within another 20-MHz channel may have different OFDM symbol durations and GIs. For example, while S2, G2, S3, and G3 are applied as OFDM symbol durations and GIs for subchannels within the first 20-MHz channel, different values (e.g., S4, G4, S5, and G5) may be applied as OFDM symbol durations and GIs for subchannels within the second 20-MHz channel. Even in this case, the OFDM symbol duration and GI, S1 and G1, applied to L-STF, L-LTF, and L-SIG fields in a different 20-MHz channel may be the same fixed values in every 20-MHz channel.

Further, this modified example may include application of the example described before with reference to FIG. 11 in which subchannels have the same HE-LTF section length' only to subchannels within one 20-MHz channel, not to the HE-LTF section length of subchannels in another 20-MHz channel.

With reference to the foregoing examples of the embodiments, mainly the features of a HE PPDU frame structure applicable to a DL MU-MIMO-mode or OFDMA-mode transmission that an AP transmits simultaneously to a plurality of STAs has been described. Now, a description will be given of the features of a HE PPDU frame structure applicable to a UL MU-MIMO-mode or OFDMA-mode transmission that a plurality of STAs transmit simultaneously to an AP.

The above-described various examples of structures of the HE PPDU frame format supporting MU-MIMO-mode or OFDMA-mode transmission should not be understood as applicable only to DL without being applicable to UL. Rather, the examples should be understood as also applicable to UL. For example, the above-described exemplary HE PPDU frame formats may also be used for a UL HE PPDU transmission that a plurality of STAs simultaneously transmit to a single AP.

However, in the case of a DL MU-MIMO-mode or OFDMA-mode HE PPDU transmission that an AP simultaneously transmits to a plurality of STAs, the transmission entity, AP has knowledge of the number of spatial streams transmitted to a HE STA allocated to each of a plurality of subchannels. Therefore, the AP may include, in a HE-SIG-A field or a HE-SIG-B field, information about the total number of spatial streams transmitted across a channel, a maximum number of spatial streams (i.e., information being a basis of the number of HE-LTF elements (or the starting point and ending point of a HE-LTF section) on each subchannel), and the number of spatial streams transmitted on each subchannel. In contrast, in the case of a UL MU-MIMO-mode or OFDMA-mode HE PPDU transmission that a plurality of STAs simultaneously transmit to an AP, each STA being a transmission entity may only be aware of the number of spatial streams in a HE PSDU that it will transmit, without knowledge of the number of spatial streams in a HE PSDU transmitted by another STA paired with the STA. Accordingly, the STA may determine neither the total number of spatial streams transmitted across a channel nor a maximum number of spatial streams.

To solve this problem, a common parameter (i.e., a parameter applied commonly to STAs) and an individual parameter (a separate parameter applied to an individual STA) may be configured as follows in relation to a UL HE PPDU transmission.

For simultaneous UL HE PPDU transmissions from a plurality of STAs to an AP, a protocol may be designed in such a manner that the AP sets a common parameter or individual parameters (common/individual parameters) for the STAs for the UL HE PPDU transmissions and each STA operates according to the common/individual parameters. For example, the AP may transmit a trigger frame (or polling frame) for a UL MU-MIMO-mode or OFDMA-mode transmission to a plurality of STAs. The trigger frame may include a common parameter (e.g., the number of spatial streams across a channel or a maximum number of spatial streams) and individual parameters (e.g., the number of spatial streams allocated to each subchannel), for the UL MU-MIMO-mode or OFDMA-mode transmission. As a consequence, a HE PPDU frame format applicable to a UL MU-MIMO or OFDMA mode may be configured without modification to an exemplary HE PPDU frame format applied to a DL MU-MIMO or OFDMA mode. For example, each STA may configure a HE PPDU frame format by including information about the number of spatial streams across a channel in a HE-SIG-A field, determining the number of HE-LTF elements (or the starting point and ending point of a HE-LTE section) on each subchannel according to the maximum number of spatial streams, and including information about the number of spatial streams for the individual STA in a HE-SIG-B field.

Alternatively, if the STAs operate according to the common/individual parameters received in the trigger frame from the AP, each STA does not need to indicate the common/individual parameters to the AP during a HE PPDU transmission. Therefore, this information may not be included in a HE PPDU. For example, each STA may determine the total number of spatial streams, the maximum number of spatial streams, and the number of spatial streams allocated to individual STA, as indicated by the AP, and configure a HE PPDU according to the determined numbers, without including information about the total number of spatial streams or the number of spatial streams allocated to the STA in the HE PPDU.

On the other hand, if the AP does not provide common/individual parameters in a trigger frame, for a UL MIMO-mode or OFDMA-mode HE PPDU transmission, the following operation may be performed.

Common transmission parameters (e.g., channel Bandwidth (BW) information, etc.) for simultaneously transmitted HE PSDUs may be included in HE-SIG-A field, but parameters that may be different for individual STAs (e.g., the number of spatial streams, an MCS, and whether STBC is used or not, for each individual STA) may not be included in HE-SIG-A field. Although the individual parameters may be included in HE-SIG-B field, information about the number of spatial streams and information indicating whether STBC is used or not, need to be transmitted before a HE-LTF field because the number of spatial streams and the information indicating whether STBC is used or not are significant to determination of configuration information about a preamble and a PSDU in a HE PPDU frame format (e.g., the number of HE-LTF elements is determined according to a combination of the number of spatial streams and the information indicating whether STBC is used or not). For this purpose, a HE PPDU frame format as illustrated in FIG. 15 may be used for a UL HE PPDU transmission.

Figure 15:
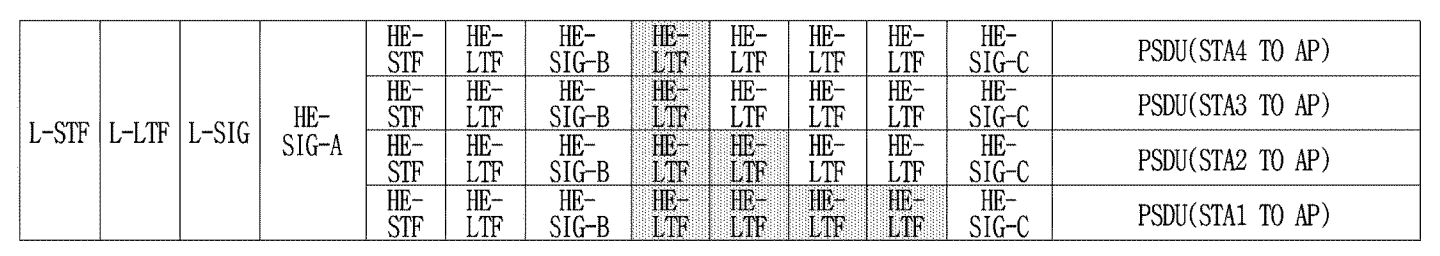

FIG. 15 depicts another exemplary HE PPDU frame format according to one embodiment. The HE PPDU frame format illustrated in FIG. 15 is characterized in that a structure of HE-SIG-A, HE-SIG-B, and HE-SIG-C fields similar to that in FIG. 12 is used for a UL PPDU transmission.

As described before, if a UL MU-MIMO-mode or OFDMA-mode transmission is performed by triggering of an AP (according to common/individual parameters provided by the AP), an individual STA may not need to report an individual parameter to the AP. In this case, one or more of a HE-SIG-B field, a HE-SIG-C field, and a first HE-LTF element (i.e., a HE-LTF between a HE-STF field and a HE-SIG-B field) illustrated in FIG. 15 may not be present. In this case, a description of each field given below may be applicable only in the presence of the field.

In the example of FIG. 15, a HE-SIG-A field is transmitted per channel (i.e., per 20-MHz channel) and may include transmission parameters common to simultaneously transmitted HE PSDUs. Since the same information is transmitted in the fields from the L-STF to HE-SIG-A in UL PPDUs transmitted by HE STAs allocated to subchannels, the AP may receive the same signals from the plurality of STAs successfully.

A HE-SIG-B field is transmitted per subchannel in one channel. The HE-SIG-B field may have an independent parameter value according to the transmission characteristics of a HE PSDU transmitted on each subchannel. The HE-SIG-B field may include spatial stream allocation information and information indicating whether STBC is used or not, for each subchannel. If MU-MIMO is applied to a subchannel (i.e., if a plurality of STAs perform transmission on a subchannel), the HE-SIG-B field may include a common parameter for the plurality of STAs paired on the subchannel.

A HE-SIG-C field is transmitted on the same subchannel as the HE-SIG-B field and may include information about an MCS and a packet length. If MU-MIMO is applied to a subchannel (i.e., if a plurality of STAs perform transmission on a subchannel), the HE-SIG-C field may include respective individual parameters for each of the plurality of STAs paired on the subchannel.

Similar to DL MU-MIMO-mode or OFDMA-mode HE PPDU transmission, if transmission of PSDUs start at different time points on subchannels in UL MU-MIMO-mode or OFDMA-mode HE PPDU transmission, and if OFDM symbols are not aligned accordingly, then the implementation complexity of an AP that receives a plurality of PSDUs is increased. To solve this problem, 'the number of HE-LTFs may be determined for all subchannels according to the maximum of the numbers of HE LTFs required according to the total numbers of spatial streams transmitted on each subchannel for a set of HE STAs allocated to each of subchannels' as described with reference to the example of FIG. 11.

This feature may mean that the HE-LTF field start at the same time point and end at the same time point across all users (i.e., HE STAs) in UL MU-MIMO-mode or OFDMA-mode transmission. Or it may be said that the HE-LTF sections of a plurality of subchannels have the same length across all HE STAs in UL MU-MIMO-mode or OFDMA-mode transmission. Or it may be said that each of the HE-LTF sections of a plurality of subchannels includes the same number of HE-LTF elements across all HE STAs in UL MU-MIMO-mode or OFDMA-mode transmission. Therefore, PSDU transmission timings are synchronized between a plurality of subchannels across all HE STAs in UL MU-MIMO-mode or OFDMA-mode transmission.

In the HE PPDU frame format supporting UL MIMO-mode or OFDMA-mode transmission illustrated in FIG. 15, the L-STF, L-LTF, L-SIG, and HE-SIG-A fields may include 4.0-μs OFDM symbols based on 64-FFT. One OFDM symbol has a GI of 0.8 μs. In the present description, a GI value applied to the L-STF, L-LTF, L-SIG, and HE-SIG-A fields is defined as G1. Excluding the GI, the L-STF, L-LTF, L-SIG, and HE-SIG-A fields may be configured as 3.2-μs OFDM symbols based on 64-FFT.

In the example of FIG. 15, a HE-STF field, a HE-LTF field, a HE-SIG-B field, HE-LTF elements(s) in a HE-LTF section, a HE-SIG-C field and a PSDU may include 16-μs OFDM symbols based on 256-FFT. The OFDM symbol duration may be changed according to a GI value. Two types of GI values may be defined for one OFDM symbol for different time periods. A GI value applied to the OFDM symbols of the HE-STF field, the HE-LTF field, the HE-SIG-B field, the HE-LTF elements(s) in the HE-LTF section, and the HE-SIG-C field is defined as G2 and a GI value applied to the OFDM symbols of the PSDU is defined as G3. Excluding the GIs, the HE-STF field, the HE-LTF field, the HE-SIG-B field, and the PSDU may include 12.8-μs OFDM symbols based on 256-FFT.

The values of G2 and G3 may be equal or different. If G2 and G3 are equal, G2 and G3 may be defined as one parameter without distinguishing G2 from G3. In one embodiment, unlike G1, G2 and G3 may vary according to each transmitted PPDU transmission vector, rather than being fixed values (i.e. predetermined values known to both a transmitter and a receiver). This is because the lengths of the HE-STF, the HE-LTF, the HE-SIG-B, the HE-LTF element(s) in a HE-LTF section, and the HE-SIG-C to which G2 is applied may vary according to a PPDU transmission vector and the length of the PSDU to which G3 is applied may also vary according to the PPDU transmission vector.

In another example, the G1 applied to the L-STF, L-LTF, L-SIG, and HE-SIG-A fields (to which 64-FFT is applied) may be a fixed value (i.e., a predefined value known to both a transmitter and a receiver) and one of G2 and G3 (if G2 and G3 are equal, they may be defined as one parameter) applied to the following fields (i.e., the HE-STF, HE-LTF, HE-SIG-B, HE-SIG-C, and PSDU to which 256-FFT is applied) may be configured or indicated as a variable value (e.g., one of 3.2 μs, 1.6 μs, 0.8 μs, and 0.4 μs).

More specifically, G1 may have a fixed value (i.e. a predefined value known to both a transmitter and a receiver) of 0.8 μs, G2 may be a value selected or indicated from among 3.2 μs, 1.6 μs, 0.8 μs, and 0.4 μs, and G3 may be a value selected or indicated from among 3.2 μs, 1.6 μs, 0.8 μs, and 0.4 μs. Also, G1 may be a fixed value (i.e. a predefined value known to both a transmitter and a receiver) of 0.8 μs, and G2 or G3 may be a value selected or indicated from among 3.2 μs, 1.6 μs, 0.8 μs, and 0.4 μs. G1 does not require signaling because G1 is a fixed value, and signaling information indicating G2 and G3 may be provided to the AP. If a HE STA performs UL transmission according to triggering of the AP (or based on parameters provided by the AP), the HE-STA does not need to indicate the value of G2 or G3 to the AP.

G2 and G3 are applied commonly across all OFDM symbols transmitted during a corresponding time period and across all subchannels. Accordingly, PSDU transmission timings may be synchronized, and OFDM symbol timings may be synchronized. For example, it is not allowed that a 3.2-μs G2 value is applied to a subchannel during a specific time period, while a 1.6-μs or 0.8-μs G2 value is applied to other subchannels during the same time period. Rather, the same 3.2-μs G2 value may be applied to other subchannels during the same time period. In a similar example, it is not allowed that a 1.6-μs G3 value is applied to a subchannel during a specific time period, while a 3.2-μs or 0.8-μs G3 value is applied to other subchannels during the same time period. Rather, the same 1.6-μs G3 value may be applied to other subchannels during the same time period.

In the case where a HE PPDU frame format having HE-LTF sections of different lengths for subchannels is used (i.e., in the case where 'the number of HE-LTFs is not determined for each subchannel based on the maximum of the numbers of HE-LTFs required according to the total numbers of spatial streams transmitted on subchannels in a set of HE STAs allocated to each of the subchannels'), if the values of G2 and G3 are different, a PSDU is transmitted on each subchannel at a different time point and OFDM symbol timings are not synchronized. Therefore, the same values for G2 and G3 may need to be selected or indicated in this case.

In the case where a HE PPDU frame format having HE-LTF sections of the same length for subchannels is used (i.e., in the case where 'the number of HE-LTFs is determined for each subchannel based on the maximum of the numbers of HE-LTFs required according to the total numbers of spatial streams transmitted on subchannels in a set of HE STAs allocated to each of the subchannels'), even though the values of G2 and G3 are different, PSDUs are transmitted on the subchannels at the same time point, without causing discrepancy between OFDM symbol timings. Therefore, selection or indication of different values for G2 and G3 does not cause a problem. However, even in this case, selection or indication of the same values for G2 and G3 is not excluded.

In the example of FIG. 15, OFDM symbol durations S1, S2, and S3 may be applied respectively to time periods to which the GIs G1, G2, and G3 are applied.

As described before, a plurality of STAs may simultaneously transmit PSDUs in a HE PPDU frame format on their allocated subchannels or on their allocated spatial streams to an AP (i.e., referred to as UL MU-MIMO or OFDMA transmission or "UL MU transmission") and may simultaneously receive PSDUs in the HE PPDU frame format on their allocated subchannels on their allocated spatial streams from the AP (i.e., referred to as DL MU-MIMO or OFDMA transmission or "DL MU transmission").

Now, a description will be given below of a Group ID (GID) and a Partial Association Identifier (Partial AID or PAID) that are used in a HE PPDU.

A Partial AID is a non-unique STA ID. The Partial AID may be included in a TXVECTOR parameter of an SU PPDU, PARTIAL_AID, and may have a maximum size of 9 bits.

An STA, which transmits a partial HE SU PPDU including one or more group addressed MPDUs or a HE NDP intended for a plurality of recipients, may set a TXVECTOR parameter, GROUP_ID, to 63 and a TXVECTOR parameter, PARTIAL_AID, to 0.

An STA, which transmits a partial HE SU PPDU including one or more individually addressed MPDUs or a HE NDP intended for a single recipient, may set the TXVECTOR parameters, GROUP_ID and PARTIAL_AID, as illustrated in Table IV below.

TABLE IV

| Condition | GROUP_ID | PARTIAL_AID |
|---|---|---|
| Addressed to AP | 0 | BSSID[39:47] |
| Addressed to Mesh STA | 0 | RA[39:47] |
| Sent by an AP and addressed to a STA associated with that AP or sent by a DLS or TDLS STA in a direct path to a DLS or TDLS peer STA | 63 | $(dec(AID[0:8]) + dec(BSSID[44:47]$ $\oplus BSSID[40:43]) \times 2^5) \bmod 2^9$ where $\oplus$ is a bitwise exclusive OR operation mod X indicates the X-modulo operation dec(A[b:c]) is the cast to decimal operator where b is scaled by $2^0$ and c by $2^{c-b}$ |
| Otherwise (see NOTE) | 63 | 0 |

NOTE
The last row covers the following cases:
A PPDU sent to an IBSS STA
A PPDU sent by an AP to a non associated STA
Any other condition not explicitly listed elsewhere in the table In Table IV, dec(A) represents the decimal value of a binary number A. A[b:c] represents bit b to bit c of the binary number A, if the first bit position of the binary number A is bit0. That is, AID[0:8] represents a bit stream with 9 bits at position 0 to position 8 in a 13-bit AID bit stream. Mod represents a modulo operation, and X mod Y is defined as the remainder of X divided by Y. $\oplus$ represents a bitwise eXclusive OR (XOR) operation. For example, 1 XOR 1=0, 0 XOR 1=1, 1 XOR 0=1, and 0 XOR 0=0.

In Table IV, AID[b:c] represents bit b to bit c of the AID of a receiver, if the first transmitted bit is bit 0. BSSID[b:c] represents bit b to bit c of a BSSID and bit 0 corresponds to an individual/group bit. BSSID[0] is the individual/group bit and BSSID[47] is the last transmitted bit. RA[b:c] represents bit b to bit c of a Receiver Address (RA) field and bit 0 corresponds to an individual/group bit. RA[0] is the individual/group bit and RA[47] is the last transmitted bit.

The STA may include values calculated according to Table IV in PHYCONFIG_VECTOR parameters, PARTIAL_AID_LIST_GID00 and PARTIAL_AID_LIST_GID63.

An STA, which transmits a HE PPDU to a Direct-Link Setup (DLS) or Tunneled Direct-Link Setup (TDLS) peer STA, may acquire the AID of the peer STA from a DLS Setup Request frame, a DLS Setup Response frame, a TDLS Setup Request frame, or a TDLS Setup Response frame.

An AP may not allocate an AID with PARTIAL_AID set to 0 to an STA.

An STA, which transmits a HE MU PPDU, may set the TXVECTOR parameter, GROUP_ID, in the following manner.

A Group ID field (e.g., the Group ID field may be included in a HE-SIG-A or HE-SIG-B field of the HE MU PPDU) may have a value ranging from 1 to 62 and may indicate the HE MU PPDU. Before transmitting the HE MU PPDU, the AP may perform group allocation for an STA supporting DL MU-MIMO using a Group ID Management frame.

Figure 16:
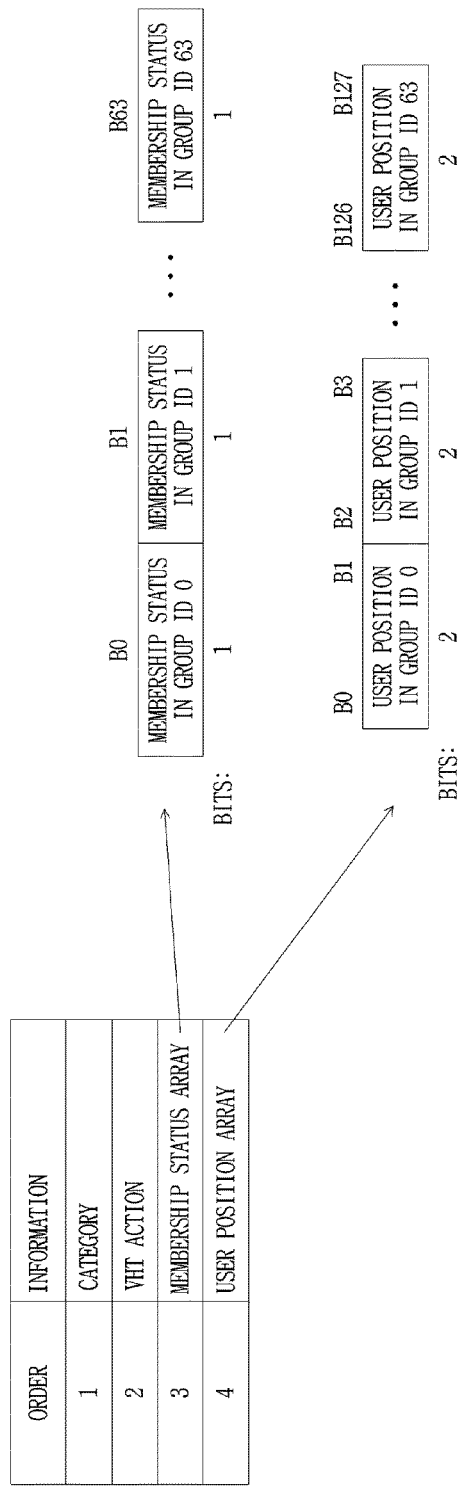
FIG. 16 depicts a format of the Group ID Management frame.

FIG. 16 depicts a format of the Group ID Management frame.

The AP may transmit the Group ID Management frame to allocate or change the user position of an STA with respect to one or more Group IDs. As illustrated in FIG. 16, the Group ID Management frame may include a Category field, a VHT Action field, a Membership Status Array field, and a User Position Array field.

The Category field may be set to a value indicating that the frame corresponds to VHT or HE.

The VHT Action field may be configured as a HE Action field, and the VHT Action field or the HE Action field may be set to a value indicating group ID management.

The Membership Status Array field may have a size of 8 octets. The 8-octet Membership Status Array field may be indexed by a Group ID and include a 1-bit Membership Status subfield for each of 64 Group IDs. If an STA is not a member of a group identified by a Group ID, the 1-bit Membership Status subfield for the Group ID may be set to 0, and if the STA is a member of the group, the 1-bit Membership Status subfield may be set to 1. The Membership Status subfields for Group ID 0 (i.e., transmission to an AP) and Group ID 63 (i.e., DL SU transmission) may be reserved.

The User Position Array field may be 16 octets long. The 16-octet User Position Array field may be indexed by a Group ID, and include a 2-bit User Position subfield for each of the 64 Group IDs. If the User Position subfield is set to 00, 01, 10, and 11, it may indicate user positions 0, 1, 2, and 3, respectively. If the Membership Status subfield for a Group ID is 0 (i.e., the STA is not a member of a group identified by the Group ID), the User Position subfield for the Group ID may be reserved. The User Position subfields for Group ID 0 (i.e., transmission to an AP) and Group ID 63 (i.e., DL SU transmission) may be reserved.

Once group ID management is configured for an STA, a mapping relationship between Group IDs and membership statuses and a mapping relationship between Group IDs and user positions may be configured. For example, a look-up table such as MembershipStatusInGroupID[g] representing a membership status in Group ID g ($1 \leq g \leq 62$) and UserPositionInGroupID[g] representing a user position in Group ID g ($1 \leq g \leq 62$) may be configured.

If the STA receives a HE MU PPDU with a Group ID field (e.g., the Group ID field may be included in a HE-SIG-A or HE-SIG-B of the HE MU PPDU) set to k and MembershipStatusInGroupID[k] set to 1, the number of space-time streams for the STA may be indicated by an MU NSTS field (specifically, MU[UserPositionInGroupID[k]] NSTS field) (e.g., the MU NSTS field may be included in the HE-SIG-A or HE-SIG-B of the HE MU PPDU). Space-time streams for different users may be arranged in an order based on the user position values of the users. That is, a space-time stream for a user corresponding to user position 0 may be first arranged, followed sequentially by a space-time stream for a user corresponding to user position 1, a space-time stream for a user corresponding to user position 2, and a space-time stream for a user corresponding to user position 3.

Some STA may identify a space-time stream intended for another STA, which acts as interference with the STA. HE-LTF symbols of the HE MU PPDU may be used not only for channel measurement for a space-time stream for an STA but also for channel measurement for an interfering space-time stream. To successfully demodulate the space-time stream intended for the STA, the STA may use channel state information about all space-time streams to thereby reduce the effect of the interfering space-time stream.

If the STA receiving the PPDU determines that it is not a member of a group, or it is a member of the group but the MU NSTS field indicates allocation of zero space-time stream to the STA, the STA may not process the remaining part of the PPDU.

Now, a description will be given of DLS and TDLS in a WLAN.

The DLS is a protocol that enables an STA to transmit a frame directly to another STA within the same infrastructure network. An infrastructure network may include one or more non-AP STAs, an AP that provides a distribution service, and a Distribution System (DS) that connects a plurality of APs. In the infrastructure network, an AP may manage non-AP STAs of a BSS.

Because an intended recipient may be placed in Power Save (PS) mode from which only an AP can wake the intended recipient, the DLS protocol may be needed. Also, the DLS is characterized by exchange of a rate set and other information between a transmitter and a receiver.

Characteristically, the TDLS uses a signaling frame that is encapsulated in a DATA frame and transmitted transparently through an AP. Therefore, the AP does not need to be aware of a direct link and support the same set as capabilities used on the direct link in the TDLS, compared to the DLS. To allow an STA to enter TDLS PS mode, the TDLS provides two PS mechanisms, that is, TDLS peer Unscheduled-Automatic Power Save Delivery (U-APSD) and TDLS peer Power Save Mode (PSM). The TDLS may allow STAs to authenticate a data confidentiality message by a TDLS peer key handshake. An STA that sets up a TDLS direct link may maintain associated with an AP and transmit a frame directly to another TDLS peer STA.

To establish a TDLS direct link, a TDLS initiator STA may transmit a TDLS Setup Request frame to an intended TDLS responder STA. A TDLS Setup Request frame, a TDLS Setup Response frame, and a TDLS Setup Confirm frame may be transmitted through an AP, not to a group address. The TDLS responder STA that receives the TDLS Setup Request frame (hereinafter, referred to as a first TDLS Setup Request frame) may operate according to the following options a) to e):

a) The TDLS responder STA may accept the first TDLS Setup Request frame. In this case, the TDLS responder STA may respond with a TDLS Setup Response frame with Status Code set to SUCCESS.

b) The TDLS responder STA may decline the first TDLS Setup Request frame. In this case, the TDLS responder STA may respond with a TDLS Setup Response frame with Status Code set to REQUEST DECLINED. If the BSSID of a received Link Identifier does not match a BSSID of the TDLS responder STA, the TDLS Setup Request may be declined.

c) If the TDLS responder STA receives the first TDSL Setup Request frame before receiving a TDLS Setup Response frame to a transmitted second TDLS Setup Request frame and a source address of the received first TDLS Setup Request frame is greater than a MAC address of the TDLS responder STA, the TDLS responder STA may discard the first TDLS Setup Request frame and may not transmit a TDLS Setup Response frame in response to the first TDLS Setup Request frame.

d) If the TDLS responder STA receives the first TDSL Setup Request frame before receiving the TDLS Setup Response frame to the transmitted second TDLS Setup Request frame and the source address of the received first TDLS Setup Request frame is smaller than the MAC address of the TDLS responder STA, the TDLS responder STA may terminate a TDLS setup initiated by the TDLS responder STA (i.e., a TDLS setup initiated by transmission of the second TDLS Setup Request frame). The TDLS responder STA may respond to the first TDLS Setup Request frame according to option a) or b).

e) Upon receipt of the first TDLS Setup Request frame from another TDLS responder STA having a current active TDLS session, the TDLS responder STA may tear down a current existing TDLS direct link as if it received a TDLS Teardown frame and respond with a TDLS Setup Response frame.

If the TDLS initiator STA fails to receive a TDLS Setup Response frame within a predetermined timeout interval (e.g., dot11TDLSResponseTimeout) or receives a TDLS Setup Response frame with Status Code set to a value other than SUCESS, the TDLS initiator STA may terminate the setup procedure and discard the TDLS Setup Response frame. Otherwise (i.e., if the TDLS initiator STA receives a TDLS Setup Response frame within the predetermined timeout interval or receives a TDLS Setup Response frame with Status Code set to SUCCESS), the TDLS initiator STA may confirm reception of the TDLS Setup Response frame by transmitting a TDLS Setup Confirm frame to the TDLS Responder STA.

Figure 17:
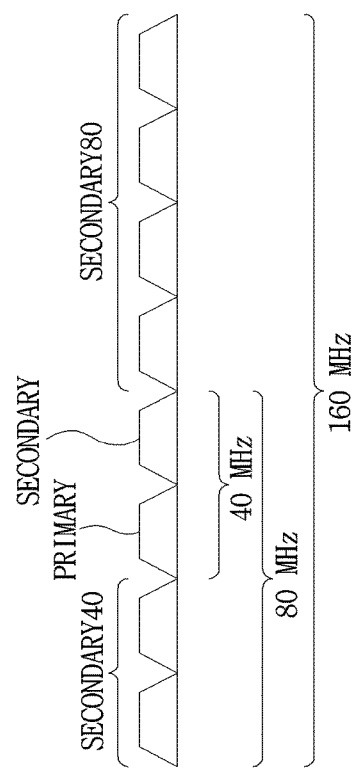
FIG. 17 depicts operating channels in a WLAN system.
Figure 18:
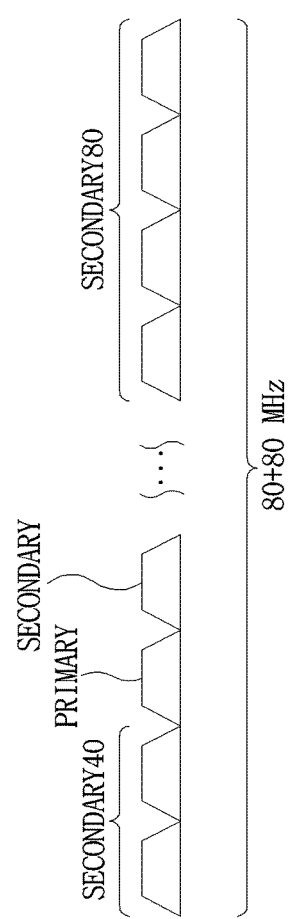
FIG. 18 depicts operating channels in a WLAN system.

FIGS. 17 and 18 depict operating channels in a WLAN system.

Basically, the WLAN system may support a single channel having a bandwidth of 20 MHz as a BSS operating channel. The WLAN system may also support a BSS operating channel having a bandwidth of 40 MHz, 80 MHz, or 160 MHz by bonding a plurality of contiguous 20-MHz channels (refer to FIG. 17). Further, the WLAN system may support a BSS operating channel having a bandwidth of 160 MHz including non-contiguous 80-MHz channels (called a bandwidth of 80+80 MHz) (refer to FIG. 18).

As illustrated in FIG. 17, one 40-MHz channel may include a primary 20-MHz channel and a secondary 20-MHz channel which are contiguous. One 80-MHz channel may include a primary 40-MHz channel and a secondary 40-MHz channel which are contiguous. One 160-MHz channel may include a primary 80-MHz channel and a secondary 80-MHz channel which are contiguous. As illustrated in FIG. 18, one 80+80-MHz channel may include a primary 80-MHz channel and a secondary 80-MHz channel which are non-contiguous.

A primary channel is defined as a common channel for all STAs within a BSS. The primary channel may be used for transmission of a basic signal such as a beacon. The primary channel may also be a basic channel used for transmission of a data unit (e.g., a PPDU). If an STA uses a channel width larger than the channel width of the primary channel, for data transmission, the STA may use another channel within a corresponding channel, in addition to the primary channel. This additional channel is referred to as a secondary channel.

Figure 19:
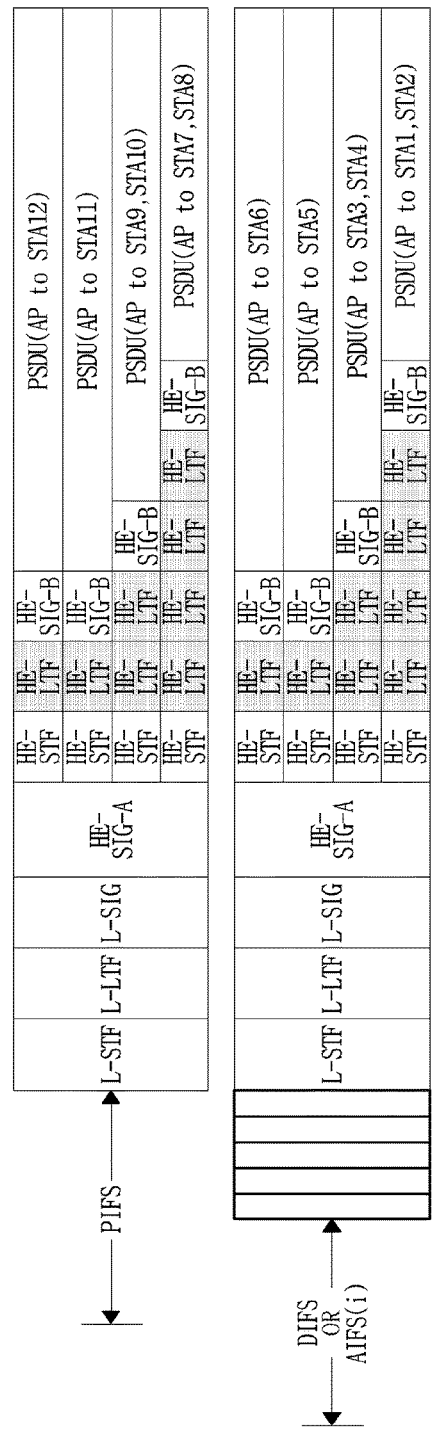
FIG. 19 depicts transmission of a HE PPDU frame on a plurality of channels according to one embodiment.

FIG. 19 depicts transmission of a HE PPDU frame on a plurality of channels according to one embodiment.

While FIG. 19 illustrates an exemplary case in which PSDUs are transmitted at different transmission timings on subchannels of each of a plurality of channels (i.e., the lengths of HE-LTF sections are different on the subchannels) in a DL HE PPDU format, a HE PPDU format in which PSDUs are transmitted at the same transmission timing on subchannels (i.e., the lengths of HE-LTF sections are the same on the subchannels), or a UL HE PPDU format may be applied as illustrated in FIGS. 11 to 15.

Further, FIG. 19 illustrates a channel access operation in Enhanced Distributed Channel Access (EDCA), when a DL or UL HE PPDU is transmitted on a plurality of channels.

The example of FIG. 19 is based on the assumption that a low-frequency channel is a primary channel and a high-frequency channel is a secondary channel among a plurality of channels.

An STA according to an Enhanced Distributed Channel Access (EDCA) scheme may determine a transmission bandwidth (or a transmission channel width) as follows.

Upon generation of a transmission frame, an STA (e.g., an AP or a non-AP STA) may perform a back-off procedure on a primary channel in order to acquire a Transmission Opportunity (TXOP). For this purpose, the STA may sense the primary channel during a DIFS or AIFS[i]. If the primary channel is idle, the STA may attempt to transmit the frame. The STA may select a random back-off count, wait for a slot time corresponding to the selected random back-off count, and then attempt to transmit the frame. The random back-off count may be determined to be a value ranging from 0 to CW (CW is a value of a contention window parameter).

When the random back-off procedure starts, the STA may activate a back-off timer according to the determined back-off count and decrement the back-off count by 1 each time. If the medium of the corresponding channel is monitored as busy, the STA discontinues the count-down and waits. If the medium is idle, the STA resumes the count-down. If the back-off timer reaches 0, the STA may determine a transmission bandwidth by checking whether the secondary channel is idle or busy at the corresponding time point.

For example, the STA may monitor a channel-idle state during a predetermined IFS (e.g., DIFS or AIFS[i]) on the primary channel and determine a transmission start timing on the primary channel by the random back-off procedure. If the secondary channel is idle during a PIFS shortly before the determined transmission start timing of the primary channel, the STA may transmit a frame on the primary channel and the secondary channel.

As described above, when the back-off timer reaches 0 for the primary channel, the STA may transmit an X-MHz mask PPDU (e.g., where X is 20, 40, 80, or 160) on channels including an idle secondary channel(s) according to the CCA result of the secondary channel(s).

The X-MHz mask PPDU is a PPDU for which a TXVECTOR parameter, CH_BANDWIDTH, is set to CBW X. That is, if the X-MHz mask PPDU can be transmitted, this means that a PPDU satisfying a spectrum mask for X-MHz transmission can be transmitted. The X-MHz mask PPDU may include a PPDU transmitted in a bandwidth equal to or smaller than X MHz.

For example, if an 80-MHz mask PPDU can be transmitted, this means that a PPDU having a channel width of 80 MHz or a PPDU having a channel width smaller than 80 MHz (e.g., 40 MHz, 20 MHz, etc.) can be transmitted within a Power Spectral Density (PSD) limit of a spectrum mask for 80-MHz transmission.

As described before, if an STA is allowed to start a TXOP and has at least one MAC Service Data Unit (MSDU) to be transmitted under the Access Category (AC) of the TXOP allowed for the STA, the STA may perform one of the following a), b), c), d), or e) (in the following description, FIGS. 17 and 18 may be referred to for a primary channel (i.e., a primary 20-MHz channel) a secondary channel (i.e., a secondary 20-MHz channel), a secondary 40-MHz channel, and a secondary 80-MHz channel):

a) If the secondary channel, the secondary 40-MHz channel, and the secondary 80-MHz channel are idle during a PIFS shortly before the start of the TXOP, a 160-MHz or 80+80-MHz mask PPDU may be transmitted.

b) If both the secondary channel and the secondary 40-MHz channel are idle during the PIFS shortly before the start of the TXOP, an 80-MHz mask PPDU may be transmitted on a primary 80-MHz channel.

c) If the secondary channel is idle during the PIFS shortly before the start of the TXOP, a 40-MHz mask PPDU may be transmitted on a primary 40-MHz channel.

d) A 20-MHz mask PPDU may be transmitted on the primary 20-MHz channel.

e) A channel access attempt may be resumed by performing a back-off procedure as in the case where the medium is indicated as busy on the primary channel by one of physical carrier sensing and virtual carrier sensing and a back-off timer has a value of 0.

Hereinbelow, exemplary HE CCA operations for increasing a spatial reuse gain according one embodiment will be described.

A description of basic operations of the PHY layer and MAC layer of an STA in relation to CCA will first be given, followed by a description of specific examples of HE CCA.

A PHY-CCA.indication primitive may be used for the PHY layer to indicate the current status of a medium to a local MAC entity and provide an Idle Power Indicator (WI) value observed when WI reporting is turned on.

The PHY-CCA.indication primitive may include parameters as listed in Table V.

TABLE V

PHY-CCA.indication(
STATE,
IPI-REPORT,
channel-list
)

In Table V, the STATE parameter may be set to BUSY or IDLE. If the PHY layer assesses a channel and determines that the channel is not available, the STATE parameter is set to BUSY. On the other hand, if the PHY layer determines that the channel is available, the STATE parameter is set to IDLE.

The IPI-REPORT parameter may be included in the PHY-CCA.indication primitive, when a radio measurement function is activated and IPI reporting is turned on by the IPI-STATE parameter. An IPI is an indication of the total channel power (noise and interference) as measured in a channel at a receiving antenna connector while the STA is neither transmitting nor receiving a frame. The IPI-REPORT parameter provides a set of IPI values for a time interval. The set of IPI values may be used by a MAC sublayer for radio measurement purposes. The set of IPI values may include recent values observed by a PHY entity since the generation of the most recent PHY-TXEND.confirm, PHY-RXEND.indication or PHY-CCA.indication primitive, whichever occurred latest.

When the STATE parameter is IDLE or when, for the type of PHY in operation, CCA is determined for a single channel, the channel-list parameter may not be included in the PHY-CCA.indication primitive. Otherwise, the channel-list parameter may carry a set indicating which channels are busy. The channel-list parameter in a PHY-CCA.indication primitive generated by a HE STA may contain a single element at most. Table VI lists channel-list elements.

TABLE VII

| channel-list element | Meaning |
| --- | --- |
| primary | Indicates that the primary 20 MHz channel is busy |
| secondary | Indicates that the secondary 20 MHz channel is busy |
| secondary40 | Indicates that the secondary 40 MHz channel is busy |
| secondary80 | Indicates that the secondary 80 MHz channel is busy |

The PHY-CCA.indication primitive may be generated during a CCA time (i.e., aCCATime) in which the state of the primary channel changes from channel idle to channel busy or from channel busy to channel idle, or when an element of the channel-list parameter is changed. Or the PHY-CCA.indication primitive may be generated when the state of a channel(s) changes from channel idle to channel busy or from channel busy to channel idle, or when an element of the channel-list parameter is changed. The CCA time may include a time period during which the PHY layer receives data. The timing of a PHY-CCA.indication primitive related to a change in the state of a secondary channel(s) may be determined according to the characteristics of the PHY layer.

If an STA is not a HE STA but a VHT STA and an operating channel width is 20 MHz, the PHY layer may keep indicating the channel busy state until expiration of a time period indicated by a LENGTH field. The LENGTH field may be included in a valid SIG field (a NON-HT PPDU format) or a VHT PPDU format) or a valid HT-SIG field (a HT-mixed or HT-greenfield PPDU format).

If an STA is not a HE STA but a VHT STA and an operating channel width is 40 MHz, the PHY layer may keep indicating the channel busy state until expiration of a time period indicated by a LENGTH field. The LENGTH field may be included in a valid SIG field (a NON-HT PPDU format) of a PPDU received on the primary channel, a valid HT-SIG field (a HT-mixed or HT-greenfield PPDU format) of a 20-MHz PPDU or 40-MHz PPDU received on the primary channel, or a SIG field (a VHT PPDU format) of a 20-MHz PPDU or 40-MHz PPDU received on the primary channel.

If an STA is not a HE STA but a VHT STA and an operating channel width is 80 MHz, the PHY layer may keep indicating the channel busy state until expiration of a time period indicated by a LENGTH field. The LENGTH field may be included in a valid SIG field (a NON-HT PPDU format) of a PPDU received on the primary channel, a valid HT-SIG field (a HT-mixed or HT-greenfield PPDU format) of a 20-MHz PPDU received on the primary channel or a 40-MHz PPDU received on the 40-MHz primary channel, or a SIG field (a VHT PPDU format) of a 20-MHz PPDU received on the primary channel, or a 40-MHz PPDU or 80-MHz PPDU received on the primary 40-MHz channel.

If an STA is not a HE STA but a VHT STA and an operating channel width is 160 MHz, the PHY layer may keep indicating the channel busy state until expiration of a time period indicated by a LENGTH field. The LENGTH field may be included in a valid SIG field (a NON-HT PPDU format) of a PPDU received on the primary channel, a valid HT-SIG field (a HT-mixed or HT-greenfield PPDU format) of a 20-MHz PPDU received on the primary channel or a 40-MHz PPDU received on the 40-MHz primary channel, or a SIG field (a VHT PPDU format) of a 20-MHz PPDU received on the primary channel, a 40-MHz PPDU received on the primary 40-MHz channel, or a 80-MHz PPDU or 160-MHz PPDU received on the primary 80-MHz channel.

If an STA is not a HE STA but a VHT STA and an operating channel width is 80+80 MHz, the PHY layer may keep indicating the channel busy state until expiration of a time period indicated by a LENGTH field. The LENGTH field may be included in a valid SIG field (a NON-HT PPDU format) of a PPDU received on the primary channel, a valid HT-SIG field (a HT-mixed or HT-greenfield PPDU format) of a 20-MHz PPDU received on the primary channel or a 40-MHz PPDU received on the 40-MHz primary channel, or a SIG field (a VHT PPDU format) of a 20-MHz PPDU received on the primary channel, a 40-MHz PPDU received on the primary 40-MHz channel, or a 80-MHz PPDU or 80+80-MHz PPDU received on the primary 80-MHz channel.

If a 20-MHz, 40-MHz, 80-MHz, 160-MHz, or 80+80-MHz operating channel satisfies one of the conditions listed in Table VII, the PHY layer may issue a PHY-CCA.indication(BUSY, {primary}) primitive, and otherwise, the PHY layer may determine that the operating channel is idle. The PHY layer may detect at least the start of a PPDU occupying the primary 20-MHz channel within a period of aCCATime and maintain CCA signal busy (i.e., PHY-CCA.indication (BUSY, channel-list)) during the duration of the PPDU, with a probability exceeding 90%.

old set includes a plurality of CCA thresholds that are applied according to an operating channel width. A second CCA threshold corresponding to an operating channel width in a second CCA threshold set may be defined as a value higher than a first CCA threshold corresponding to the same operating channel width in a first CCA threshold set. For example, the CCA threshold set defined in Table VII is

TABLE VIIII

| Operating Channel Width | Conditions |
|---|---|
| 20 MHz, 40 MHz, 80 MHz, 160 MHz, or 80 + 80 MHz | The start of a 20 MHz NON_HT or HT or VHT or HEW PPDU in the primary 20 MHz channel at or above −82 dBm. |
| 40 MHz, 80 MHz, 160 MHz, or 80 + 80 MHz | The start of a 40 MHz non-HT duplicate or HT or VHT or HEW PPDU in the primary 40 MHz channel at or above −79 dBm. |
| 80 MHz, 160 MHz, or 80 + 80 MHz | The start of an 80 MHz non-HT duplicate or HT or VHT or HEW PPDU in the primary 80 MHz channel at or above −76 dBm. |
| 160 MHz, or 80 + 80 MHz | The start of a 160 MHz or 80 + 80 MHz non-HT duplicate or HT or VHT or HEW PPDU at or above −73 dBm. |

The receiver issues a PHY-CCA.indication(BUSY, {primary}) primitive for any signal that exceeds a threshold equal to 20 dB above a minimum modulation and coding rate sensitivity (e.g., −82+20=−62 dBm) in the primary 20 MHz channel within a period of aCCATime after the signal arrives at the receiver's receiving antenna(s). Then the receiver does not issue a PHY-CCA.indication(BUSY,{secondary}), PHY-CCA.indication(BUSY, {secondary40}), PHY-CCA.indication(BUSY, {secondary80}), or PHY-CCA.indication(IDLE) primitive, while the threshold continues to be exceeded.

To increase a spatial reuse gain in a HE BSS, a CCA threshold may be increased. If the CCA threshold is increased, the PHY CCA.indicate(BUSY, channel-list) primitive is invoked at a higher signal strength. Therefore, a HE BSS may neglect an interference signal received from an adjacent HE BSS (or an Overlapping BSS (OBSS)) in an environment in which the coverage of a plurality of HE BSSs are overlapped. That is, the HE BSS may achieve the effect of reducing the coverage of the adjacent HE BSS, while keeping its coverage unchanged.

Two CCA threshold sets are defined in a HE CCA operation which will be described below. One CCA threshreferred to as the first CCA threshold set, and the CCA threshold set including thresholds higher than the thresholds of the first CCA threshold set by a predetermined positive value (Delta), defined in Table VIII, is referred to as the second CCA threshold set. Also, the first CCA thresholds (the first CCA threshold set) may be referred to as legacy CCA thresholds (a legacy CCA threshold set), and the second CCA thresholds (the second CCA threshold set) may be referred to as HE or OBSS CCA thresholds (a HE or OBSS CCA threshold set).

TABLE VIIIIII

| Operating Channel Width | Conditions |
|---|---|
| 20 MHz, 40 MHz, 80 MHz, 160 MHz, or 80 + 80 MHz | The start of a 20 MHz NON_HT or HT or VHT or HEW PPDU in the primary 20 MHz channel at or above −82 + Delta (positive number) dBm. |
| 40 MHz, 80 MHz, 160 MHz, or 80 + 80 MHz | The start of a 40 MHz non-HT duplicate or HT or VHT or HEW PPDU in the primary 40 MHz channel at or above −79 + Delta (positive number) dBm. |
| 80 MHz, 160 MHz, or 80 + 80 MHz | The start of an 80 MHz non-HT duplicate or HT or VHT or HEW PPDU in the primary 80 MHz channel at or above −76 + Delta (positive number) dBm. |
| 160 MHz, or 80 + 80 MHz | The start of a 160 MHz or 80 + 80 MHz non-HT duplicate or HT or VHT or HEW PPDU at or above −73 + Delta (positive number) dBm. |

Further, one or more HE STAs may transmit, for example, 5-MHz, 10-MHz, or 20-MHz signals on the primary 20-MHz channel. The receiver issues a PHY-CCA.indication(BUSY, {primary}) primitive for any 5-MHz signal that exceeds a threshold equal to 20 dB above a minimum modulation and coding rate sensitivity (e.g., −82+20−6=−68 dBm), any 10-MHz signal that exceeds the threshold equal to 20 dB above the minimum modulation and coding rate sensitivity (e.g., −82+20−3=−65 dBm), or any 20-MHz signal that exceeds the threshold equal to 20 dB above the minimum modulation and coding rate sensitivity (e.g., −82+

20=−62 dBm), in the primary 20 MHz channel within a period of aCCATime after the signal arrives at the receiver's receiving antenna(s). Then the receiver does not issue a PHY-CCA.indication(BUSY,{secondary}), PHY-CCA.indication(BUSY, {secondary40}), PHY-CCA.indication (BUSY, {secondary80}), or PHY-CCA.indication(IDLE) primitive, while the threshold continues to be exceeded.

For dynamic channel sensing of an STA operating in a WLAN as described above, BSS identification information may be used. The BSS identification information may be information that identifies a BSS originating a signal that the STA receives. For example, the BSS identification information may include a COLOR parameter.

If a BSS originating a signal received by an STA is identifiable using ae TXVECTOR parameter, COLOR, system performance may be increased. For example, as an STA terminates processing of a signal received from a BSS other than an associated BSS, space reuse may be increased and power consumption may be reduced. The COLOR parameter may be defined to be three bits in size. A HE AP transmitting a HE PPDU may set the TXVECTOR parameter, COLOR to its chosen value in a range from 0 to 7 and maintain the value during the duration of the existence of the BSS. The HE AP which is a member of a set of a plurality of BSSIDs (i.e., BSSID(i), i=0, 1, 2, . . . ) may set the TXVECTOR parameter, COLOR for each different BSSID (i) to the same value.

The HE AP may include the value of the TXVECTOR parameter, COLOR that it uses in a HE PPDU in every frame (e.g., management frame) including a HE Capabilities element. For example, the HE AP may include the value of the TXVECTOR parameter COLOR that it uses in the BSS COLOR field of the HE Capabilities Info field in the HE Capabilities element included in an Association Response frame, a Reassociation Response frame, a Beacon frame, a Probe Response frame, etc. that the HE AP transmits to an STA(s). The HE AP may also include the BSS COLOR field in the PHY header (e.g., HE-SIG-A) of the HE PPDU.

Now, a description will be given of a dynamic channel sensing method for a direct link in a WLAN. For example, a direct link may be a DLS or TDLS direct link, and dynamic channel sensing may include dynamically changing a CCA threshold.

Figure 20:
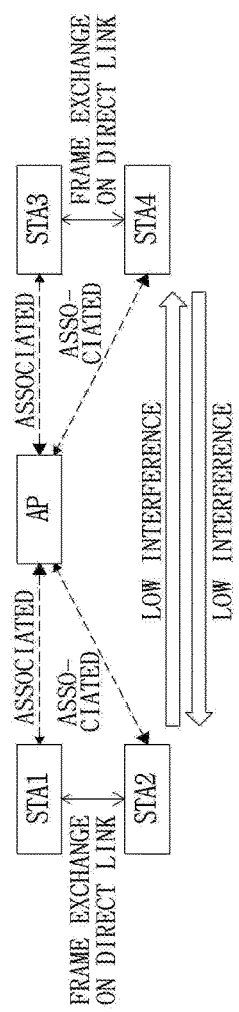
FIG. 20 depicts concurrent transmissions on direct links according to one embodiment.

FIG. 20 depicts concurrent transmissions on direct links according to one embodiment.

In the example of FIG. 20, each of STA1, STA2, STA3, and STA4 may be associated with an AP. That is, STA1, STA2, STA3, and STA4 may belong to the same BSS.

A direct link may be established between STA1 and STA2, and frames may be exchanged via the direct link between STA1 and STA2. Also, a direct link may be established between STA3 and STA4, and frames may be exchanged via the direct link between STA3 and STA4. Frame exchange via the direct link between STA1 and STA2 may cause low interference to STA3 and STA4. Likewise, frame exchange via the direct link between STA3 and STA4 may cause low interference to STA1 and STA2. However, if STA3 or STA4 determines that a channel is busy during transmission via the direct link between STA1 and STA2, or if STA1 or STA2 determines that a channel is busy during transmission via the direct link between STA3 and STA4, transmission via the direct link between STA1 and STA2 may be concurrent with frame exchange via the direction link between STA3 and STA4.

In one embodiment, STA1, STA2, STA3, and STA4 may be STAs (e.g., HE STAs) capable of performing a dynamic CCA operation for a direct link. The AP may be a RE AP (i.e., an AP operating in conformance to IEEE 802.11ax) or a legacy AP (i.e., an AP operating in conformance to IEEE 802.11a/b/g/n/ac).

If dynamic CCA for a direct link is applied, although STA1 and STA2 may determine a CCA state based on a first CCA threshold regarding general transmission within the same BSS, STA1 and STA2 may determine a CCA state based on a second CCA threshold (or a HE CCA threshold) regarding HE data frame exchange via the direct link between STA3 and STA4. Similarly, if dynamic CCA for a direct link is applied, although STA3 and STA4 may determine a CCA state based on a first CCA threshold regarding general transmission within the same BSS, STA3 and STA4 may determine a CCA state based on a second CCA threshold (or a HE CCA threshold) regarding HE data frame exchange via the direct link between STA1 and STA2.

Accordingly, if transmission via a direct link between other STAs causes interference below a second CCA threshold (i.e., a CCA threshold higher than a first CCA threshold), an STA from among a plurality of STAs within the same BBS may determine that a channel is idle and perform transmission, even during the transmission via the direct link between the other STAs. Therefore, because concurrent transmissions on direct links are supported, a spatial reuse gain may be increased.

Operations of STAs related to a direct link in dynamic channel sensing for a direct link in a WLAN will be described below.

In the following description, a first STA and a second STA are peer STAs of a direct link for each other. For example, it is assumed that the first STA is a (HE) STA requesting direct link setup (i.e., a direct link initiator (HE) STA) and the second STA is a (HE) STA responding to the direct link setup request (i.e., a direct link responder (HE) STA). That is, a direct link may exist between the first STA and the second STA, the first STA may be a first DLS (HE) STA or a first TDLS (HE) STA, and the second STA may be a second DLS (HE) STA or a second TDLS (HE) STA.

Figure 21:
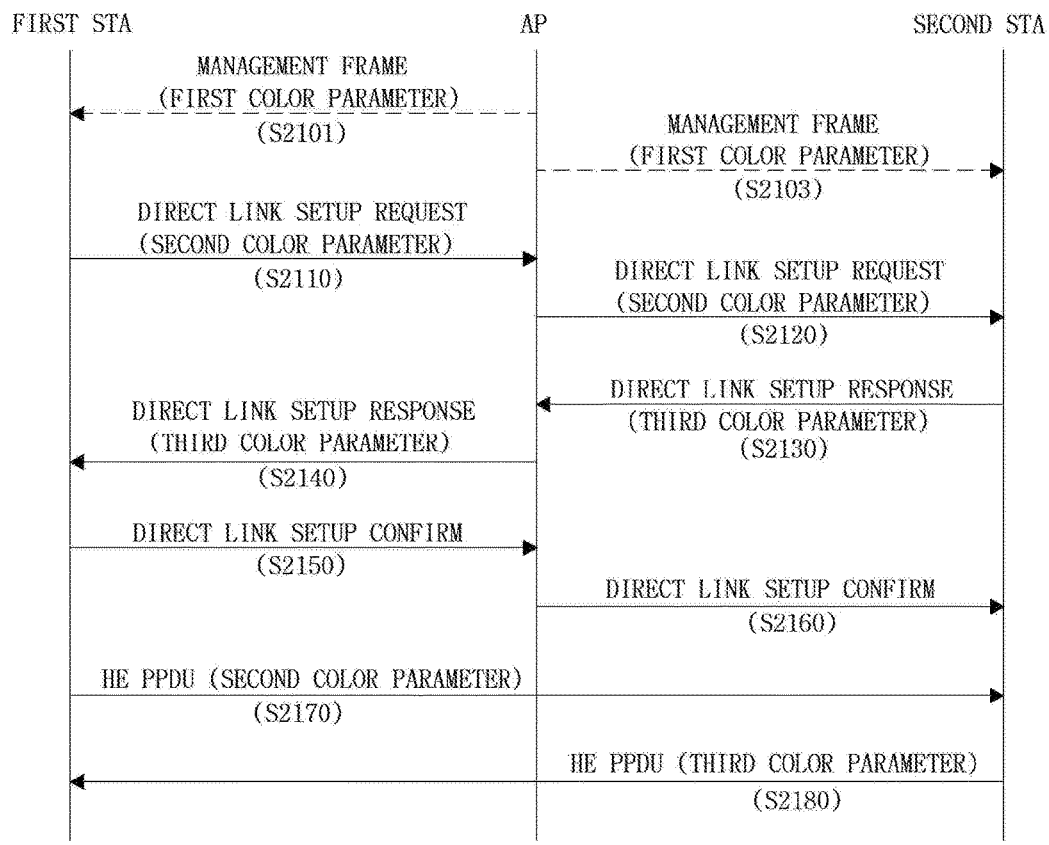
FIG. 21 depicts a direct link setup operation according to an example of one embodiment.

FIG. 21 depicts a direct link setup operation according to an example of the one embodiment.

Peer STAs of a direct link (for example, the first STA and the second STA) may be associated with the same AP. If the peer STAs of the direct link are associated with a HE AP, the peer STAs of the direct link may have information about a value of a COLOR parameter set by the HE AP. To distinguish the COLOR parameter set by the HE AP from other COLOR parameters, the COLOR parameter set by the HE AP may be referred to as a HE AP COLOR parameter or a first COLOR parameter. For example, the first COLOR parameter may be included in management frames transmitted by the HE AP as in steps S2101 and S2103.

Or the peer STAs of the direct link may be associated with a legacy AP that does not support HE capabilities. In this case, steps S2101 and S2103 in which the legacy AP provides the first COLOR parameter (i.e., the HE AP COLOR parameter) to the STAs may be omitted. Or although the legacy AP may transmit management frames to the STAs, the management frames may not include the first COLOR parameter.

In step S2110, the first STA may transmit a Direct Link Setup Request frame (e.g., a DLS Setup Request frame or a TDLS Setup Request frame) to the AP. The Direct Link Setup Request frame transmitted by the first STA may include a COLOR parameter for the direct link, determined by the first STA. To distinguish the COLOR parameter for the direct link, determined by the first STA from the HE AP COLOR parameter (or the first COLOR parameter), the direct-link COLOR parameter of the first STA may be referred to as a second COLOR parameter.

For this purpose, a COLOR element and a HE Capabilities element may be included in the format of the Direct Link Setup Request frame. If the dot11HEOptionImplemented parameter is set to TRUE, the COLOR element may exist in the Direct Link Setup Request frame, and include the COLOR value of the non-AP STA transmitting the Direct Link Setup Request frame. If the dot11HEOptionImplemented parameter is set to TRUE, the HE Capabilities element may exist in the Direct Link Setup Request frame.

In step S2120, the AP may forward the Direct Link Setup Request to the second STA based on the Direct Link Setup Request frame received from the first STA.

In step S2130, the second STA may transmit a Direct Link Setup Response frame (e.g., a DLS Setup Response frame or a TDLS Setup Response frame) to the AP in response to the Direct Link Setup Request. The Direct Link Setup Response frame transmitted by the second STA may include a value of a direct-link COLOR parameter determined by the second STA. To distinguish the direct-link COLOR parameter determined by the second STA from the HE AP COLOR parameter (i.e., the first COLOR parameter) provided by the HE AP and the direct-link COLOR parameter (i.e., the second COLOR parameter) determined by the first STA, the direct-link COLOR parameter determined by the second STA may be referred to as the direct-link COLOR parameter of the second STA or a third COLOR parameter.

For this purpose, a COLOR element and a HE Capabilities element may be included in the format of the Direct Link Setup Response frame. If the dot11HEOptionImplemented parameter is set to TRUE, the COLOR element may exist in the Direct Link Setup Response frame, and include the COLOR value of the non-AP STA transmitting the Direct Link Setup Response frame (i.e., the direct-link COLOR parameter). If the dot11HEOptionImplemented parameter is set to TRUE, the HE Capabilities element may exist in the Direct Link Setup Response frame.

In step S2140, the AP may forward the Direct Link Setup Response to the first STA based on the Direct Link Setup Response frame received from the second STA.

In step S2150, the first STA may transmit a Direct Link Setup Confirm frame (e.g., a DLS Setup Confirm frame or a TDLS Setup Confirm frame) to the AP.

In step S2160, the AP may forward the Direct Link Setup Confirm to the second STA based on the Direct Link Setup Confirm frame received from the first STA.

In step S2170, a HE PPDU that the first STA transmits to the second STA via the direct link may include the value of the direct-link COLOR parameter of the first STA (i.e., the second COLOR parameter).

In step S2180, a HE PPDU that the second STA transmits to the first STA via the direct link may include the value of the direct-link COLOR parameter of the second STA (i.e., the third COLOR parameter).

While it is described in various examples of the embodiments that the HE Capabilities element is used for encoding the COLOR field, the embodiments are not limited thereto, and any other element or field may be used for encoding the COLOR field.

Figure 22:
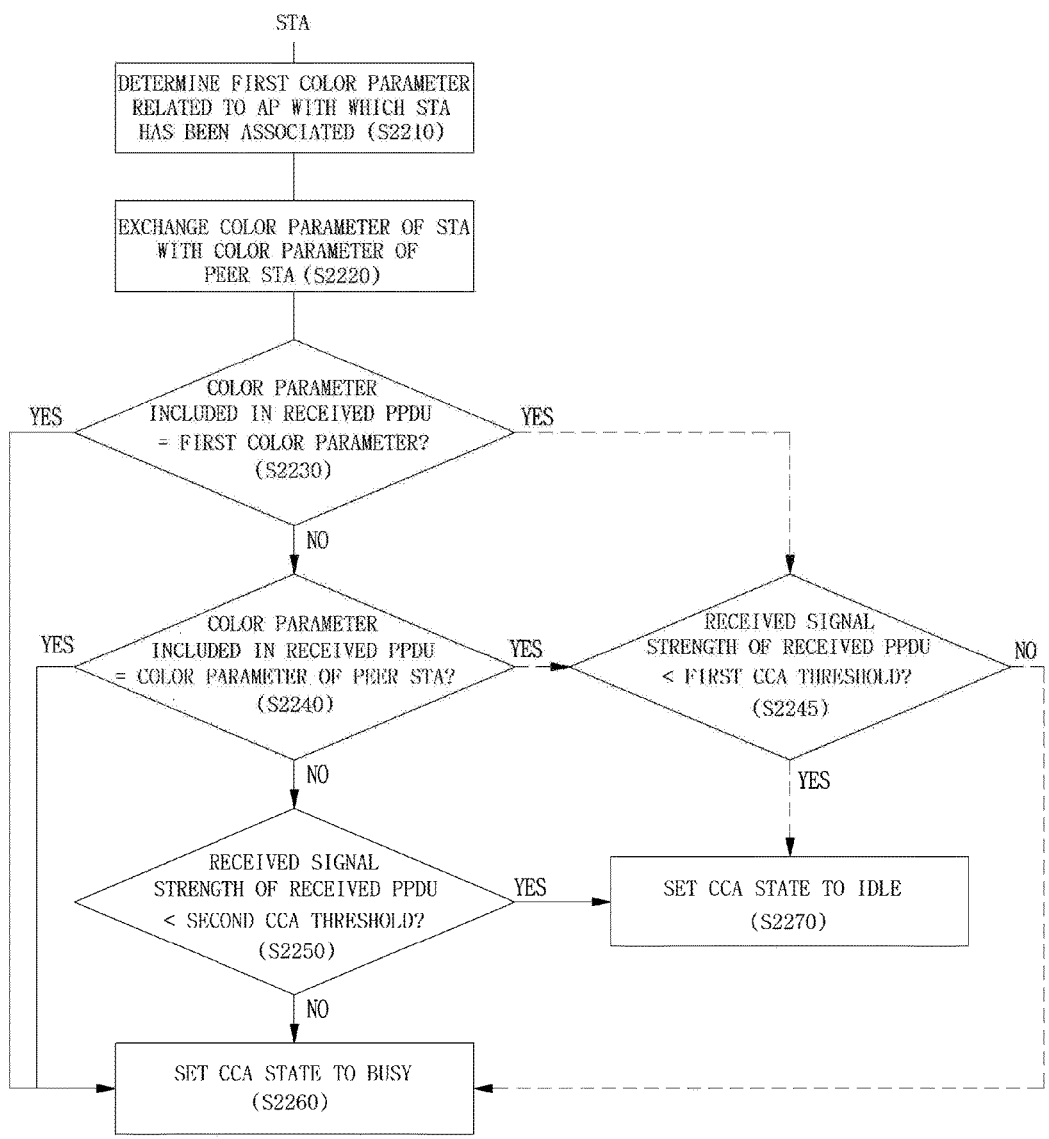
FIG. 22 depicts an operation of an STA that performs dynamic channel sensing for a direct link.

FIG. 22 depicts an operation of an STA that performs dynamic channel sensing for a direct link.

The STA illustrated in FIG. 22 may be a direct link initiator STA (i.e., a first STA) or a direct link responder STA (i.e., a second STA).

In step S2210, the STA may determine a first COLOR parameter related to an AP with which the STA has been associated. If the associated AP is a HE AP, a HE AP COLOR parameter included in a frame (e.g., a management frame) received from the AP may be determined to be the first COLOR parameter. On the other hand, if the associated AP is a legacy AP that does not support HE capabilities, the AP does not provide a COLOR parameter and thus a predetermined value (e.g., 0) may be determined to be the first COLOR parameter.

In step S2220, the STA and a peer STA of the direct link may exchange their COLOR parameters with each other.

If the STA is a direct link initiator STA (i.e., the first STA), the STA may determine its COLOR parameter (i.e., a second COLOR parameter) and transmit the determined COLOR parameter to the peer STA (i.e., the second STA). For example, the first STA may transmit the second COLOR parameter to the second STA by a Direct Link Setup Request frame. Also, the STA (i.e., the first STA) may receive, from the peer STA (i.e., the second STA), a COLOR parameter (i.e., a third COLOR parameter) determined by the peer STA. For example, the first STA may receive the third COLOR parameter from the second STA by a Direct Link Setup Response frame.

If the STA is a direct link responder STA (i.e., the second STA), the STA may receive a COLOR parameter (i.e., a second COLOR parameter) determined by the peer STA (i.e., the first STA). For example, the second STA may receive the second COLOR parameter from the first STA by a Direct Link Setup Request frame. Also, the STA (i.e., the second STA) may transmit its COLOR parameter (i.e., the third COLOR parameter) to the peer STA (i.e., the first STA). For example, the second STA may transmit the third COLOR parameter to the first STA by a Direct Link Setup Response frame.

Accordingly, the direct link setup procedure including exchange of the COLOR parameters between the peer STAs of the direct link may be completed and the direct link may exist between the peer STAs in step S2220.

In step S2230, the STA may determine whether a COLOR parameter included in a received PPDU has the same value as the first COLOR parameter (i.e., the COLOR parameter related to the AP). If the value of the COLOR parameter in the PPDU is equal to the value of the first COLOR parameter, the STA may determine that its CCA state is busy in step S2260. Specifically, the STA may not transmit on a channel receiving the PPDU, determining that the CCA state of the channel is busy. On the contrary, if the value of the COLOR parameter in the PPDU is not equal to the value of the first COLOR parameter, the STA may proceed to step S2240.

In step S2240, the STA may determine whether the COLOR parameter included in the received PPDU has the same value as the COLOR parameter of the peer STA (i.e., the second COLOR parameter or the third COLOR parameter). If the value of the COLOR parameter in the PPDU is equal to the value of the COLOR parameter of the peer STA, the STA may determine that its CCA state is busy in step S2260. Specifically, the STA may not transmit on the channel receiving the PPDU, determining that the CCA state of the channel is busy. On the contrary, if the value of the COLOR parameter in the PPDU is not equal to the value of the COLOR parameter of the peer STA, the STA may proceed to step S2250.

The sequence of steps S2230 and S2240 is not limited, and steps S2230 and S2240 may be performed simultaneously. That is, if the COLOR parameter of the received PPDU is equal to one of the first COLOR parameter or the COLOR parameter of the peer STA (i.e., the second COLOR parameter or the third COLOR parameter), the STA may proceed to step S2260 (or step S2245). Or if the COLOR parameter of the received PPDU is not equal to anyone of the first COLOR parameter or the COLOR parameter of the peer STA (i.e., the second COLOR parameter or the third COLOR parameter), the STA may proceed to step S2250.

In step S2250, the STA may determine whether the received signal strength of the received PPDU is lower than a second CCA threshold (i.e., a CCA threshold higher than a first CCA threshold). If the received signal strength of the received PPDU is equal to or higher than the second CCA threshold, the STA may set the CCA state to busy in step S2260. Specifically, the STA may not transmit on the channel receiving the PPDU, determining that the CCA state of the channel is busy. On the contrary, if the received signal strength of the received PPDU is lower than the second CCA threshold, the STA may set the CCA state to idle in step S2270. Specifically, the STA may transmit on the channel receiving the PPDU, determining that the CCA state of the channel is idle.

Meanwhile, if the COLOR parameter included in the received PPDU is equal to one of the first COLOR parameter and the COLOR parameter of the peer STA (i.e., the second COLOR parameter or the third COLOR parameter) in step S2230 or S2240, the STA may determine whether the received signal strength of the received PPDU is lower than the first CCA threshold in step S2245, instead of immediately setting the CCA state to busy (i.e., instead of proceeding to step S2260). If the received signal strength of the received PPDU is equal to or higher than the first CCA threshold, the STA may set the CCA state to busy in step S2260. Specifically, the STA may not transmit on the channel receiving the PPDU, determining that the CCA state of the channel is busy. On the contrary, if the received signal strength of the received PPDU is lower than the first CCA threshold, the STA may set the CCA state to idle in step S2270. Specifically, the STA may transmit on the channel receiving the PPDU, determining that the CCA state of the channel is idle.

In this manner, an STA related to a direct link may determine whether a current received PPDU is from an AP with which the STA has been associated or a peer STA of the direct link, based on a COLOR parameter of the associated AP (i.e., a first COLOR parameter) and a COLOR parameter of the peer STA of the direct link (i.e., a second COLOR parameter or a third COLOR parameter). Therefore, the STA may perform dynamic channel sensing in which various CCA thresholds are applied according to the origination of the received PPDU.

Now, a description will be given of specific examples of a dynamic channel sensing operation for a direct link.

Figure 23:
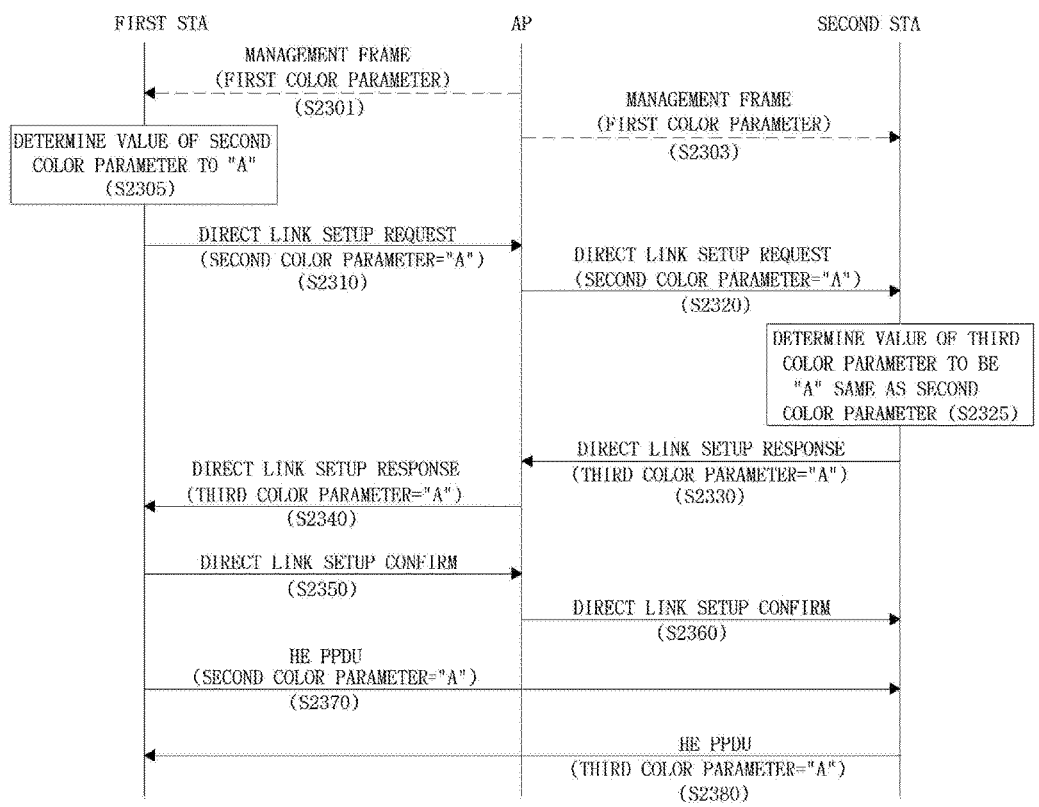
FIG. 23 depicts direct link setup operations according to a first example.

FIG. 23 depicts a direct link setup operation according to an example of one embodiment.

In the example of FIG. 23, to achieve a spatial reuse gain of a direct link, a first STA and a second STA may use the same value as their TXVECTOR parameters COLOR for dynamic channel sensing for the direct link. A direct link setup and dynamic channel sensing operation for this case will be described below.

Steps S2301 and S2303 of FIG. 23 correspond to steps S2101 and S2103 of FIG. 21 and will not be described herein to avoid redundancy.

In step S2305, the first STA may select a COLOR value (i.e., a value of a second COLOR parameter) for the direct link and maintain the selected COLOR value. For example, the first STA may set the value of the second COLOR parameter to A.

More specifically, the first STA that transmits a HE PPDU via a direct link to the second STA may set the TXVECTOR parameter COLOR (i.e., the second COLOR parameter) to a value of its choosing in a range from 0 to 7, A (=0, 1, . . . , or 7) and maintain the value during the duration of existence of a DLS or TDLS setup.

In step S2310, the first STA may include the value of the direct-link COLOR parameter (i.e., the second COLOR parameter) in a PPDU that the first STA transmits to the second STA via an AP. For example, the first STA may include the second COLOR parameter having A as its value in a Direct Link Setup Request frame and transmit the Direct Link Setup Request frame to the AP. In step S2320, the AP may forward the Direct Link Setup Request to the second STA.

More specifically, the first STA may include the value A of the TXVECTOR parameter COLOR (i.e., the second COLOR parameter) in the range of 0 to 7 used by the first STA in a COLOR field of a HE Capabilities Info field in a HE Capabilities element of the Direct Link Setup Request frame including a HE Capabilities element (e.g., a DLS Setup Request frame or a TDLS Setup Request frame).

In step S2325, the second STA may determine its direct-link COLOR parameter (i.e., a third COLOR parameter) to be the same value as the direct-link COLOR parameter selected by the first STA (i.e., the second COLOR parameter). For example, the second STA may set the value of the third COLOR parameter to A.

In step S2330, the second STA may include the selected direct-link COLOR parameter (i.e., the third COLOR parameter) in a PPDU that the second STA transmits to the first STA via the AP. For example, the second STA may include the third COLOR parameter having the value A in a Direct Link Setup Response frame and transmit the Direct Link Setup Response frame to the AP. In step S2340, the AP may forward the Direct Link Setup Response to the first STA.

More specifically, the second STA that transmits a HE PPDU to the first STA via the direct link may set the value of a COLOR field (i.e., the value of the third COLOR parameter) of a HE Capabilities Info field in a HE Capabilities element of the Direct Link Setup Response frame (e.g., a DLS Setup Response frame or a TDLS Setup Response frame) including the HE Capabilities element to the value A set in the COLOR field (i.e., the second COLOR parameter) of the HE Capabilities Info field in the HE Capabilities element of the Direct Link Setup Request frame (e.g., the DLS Setup Response frame or the TDLS Setup Response frame) including the HE Capabilities element, and may maintain the value during the duration of the existence of the DLS or TDLS setup.

Also, the second STA may set the value of the TXVECTOR parameter, COLOR (i.e., the third COLOR parameter) to the value A set in a COLOR field of a HE Capabilities Info field in a HE Capabilities element of a latest Direct Link Setup Response frame (e.g., DLS Setup Response frame or TDLS Setup Response frame) transmitted to the first STA.

In steps S2350 and S2360, the first STA may transmit a Direct Link Setup Confirm frame to the second STA via the AP.

The first STA may determine a COLOR parameter (e.g., a fourth COLOR parameter) based on the second COLOR parameter determined by the first STA or the third COLOR parameter received from the second STA, and include the determined COLOR parameter in the Direct Link Setup Confirm frame. For example, if both of the second COLOR parameter and the third COLOR parameter have the same value A in the example of FIG. 23, the first STA may determine the value of the fourth COLOR parameter to be A and include the COLOR parameter value A in the Direct Link Setup Confirm frame. The second STA may check the value A of the fourth COLOR parameter included in the Direct Link Setup Confirm frame received from the first STA.

After the direct link setup, a HE PPDU that the first STA transmits to the second STA via the direct link may include the second COLOR parameter set to A by the first STA in step S2370. Or the second COLOR parameter transmitted in the Direct Link Setup Request frame by the first STA or the fourth COLOR parameter transmitted in the Direct Link Setup Confirm frame by the first STA may be included as a COLOR parameter in the HE PPDU that the first STA transmits via the direct link. In the example of FIG. 23, both of the second COLOR parameter and the fourth COLOR parameter have the same value A, and the first STA may include the COLOR parameter value A in the HE PPDU transmitted via the direct link.

More specifically, the first STA may include the value A of the TXVECTOR parameter COLOR in the range of 1 to 7 used by the first STA in a COLOR field of a PHY header (e.g., a HE-SIG-A field) of a HE PPDU that the first STA transmits to the second STA via the direct link.

Also, the third COLOR parameter set to the value A by the second STA may be included in a HE PPDU that the second STA transmits to the first STA via the direct link in step S2380. Or the third COLOR parameter transmitted in the Direct Link Setup Response frame by the second STA or the fourth COLOR parameter received in the Direct Link Setup Confirm frame by the second STA may be included as a COLOR parameter in the HE PPDU that the second STA transmits via the direct link. In the example of FIG. 23, both of the third COLOR parameter and the fourth COLOR parameter have the same value A, and the second STA may include the COLOR parameter value A in the HE PPDU transmitted via the direct link.

More specifically, the second STA may include the value A of the third COLOR parameter determined to be equal to the value of the second COLOR parameter of the first STA in a COLOR field of a PHY header (e.g., HE-SIG-A field) of a HE PPDU that the second STA transmits to the first STA via the direct link.

After the direct link setup illustrated in FIG. 23, the first STA and the second STA may perform dynamic channel sensing for the direct link.

Specifically, each of the peer STAs of the direct link may compare a COLOR value included in a HE PPDU received after the direct link setup with the HE AP COLOR parameter (i.e., the first COLOR parameter) or the direct-link COLOR parameter (i.e., the second COLOR parameter (or the third COLOR parameter having the same value as the second COLOR parameter), as in steps S2230 and S2240 of FIG. 22.

As in the example in which the procedure goes from step S2230 or S2240 to step S2260 in FIG. 22, if the value of the COLOR field of the HE PPDU received by the direct link peer STA is equal to the value of the first COLOR parameter or the second COLOR parameter (or the third COLOR parameter) (e.g., A), a CCA state may be set to busy.

More specifically, if after the DLS or TDLS setup procedure, the first STA or the second STA receives a HE PPDU including a PHY header with a value of a COLOR field matching one of the COLOR parameter indicated by the HE AP (i.e., the first COLOR parameter) and its COLOR parameter (e.g., a COLOR parameter included in a COLOR field of a HE Capabilities Info field in a HE Capabilities element of the latest transmitted Direct Link Setup Request frame or Direct Link Setup Response frame) (i.e., the second COLOR parameter or the third COLOR parameter, such as A), the PHY of the STA may maintain a PHY-CCA.indication(BUSY, channel-list) primitive during a predicted duration of the received PPDU.

Meanwhile, in the case where the value of the COLOR field of the HE PPDU received by the direct link peer STA does not match either of the first COLOR parameter and the second COLOR parameter (or the third COLOR parameter) as in step S2250 of FIG. 22, if the received power strength of the received HE PPDU is equal to or higher than a second CCA threshold (or a HE CCA threshold), the CCA state may be set to busy as in step S2260 of FIG. 22. On the contrary, if the received power strength of the received HE PPDU is lower than the second CCA threshold, the CCA state may be set to idle as in step S2270 of FIG. 22.

More specifically, in the case where although the first STA or the second STA receives a HE PPDU and a valid SIG field is indicated, a value of a COLOR field included in the HE PPDU does not match either of the COLOR parameter indicated by the HE AP (i.e., the first COLOR parameter) and its COLOR parameter (e.g., a COLOR parameter included in a COLOR field of a HE Capabilities Info field in a HE Capabilities element of the latest transmitted Direct Link Setup Request frame or Direct Link Setup Response frame) (i.e., the second COLOR parameter or the third COLOR parameter, such as A), if reception of the HE PPDU satisfies a minimum CCA sensitivity level of the second CCA threshold, the PHY of the STA may maintain a PHY-CCA.indication(BUSY, channel-list) primitive during a predicted duration of the received PPDU as in step S2260 of FIG. 22. Or if reception of the HE PPDU does not satisfy the minimum CCA sensitivity level of the second CCA threshold, the PHY of the STA may maintain a PHY-CCA.indication(IDLE) primitive as in step S2270 of FIG. 22.

Also, in the case where the first STA receives the COLOR field (i.e., the first COLOR parameter) of the HE Capabilities Info field of the HE Capabilities element from the AP, the first STA may select the value of the COLOR parameter in the following manner.

The first STA, which transmits a HE PPDU to the second STA via the direct link, may include the same value as the value of the COLOR field (i.e., the first COLOR parameter) received from the AP with which the first STA has been associated in a COLOR field of a HE Capabilities Info field of every frame including the HE Capabilities element transmitted by the first STA. That is, the second COLOR parameter may be set to the same value as the first COLOR parameter.

Also, the first STA may include a different value from the value of the COLOR field (i.e., the first COLOR parameter) received from the AP with which the first STA has been associated in the COLOR field of the HE Capabilities Info field of every frame including the HE Capabilities element transmitted by the first STA. That is, the second COLOR parameter may be set to a different value from the first COLOR parameter. In this case, the first STA may indicate to the AP that the first STA will change its operation mode from active mode to PS mode before transmitting the HE PPDU to the second STA via the direct link. Accordingly, while the HE AP is transmitting and receiving a signal to and from another STA, concurrent transmission from the first STA to the second STA via the direct link may be supported. That is, as the first STA is set to the PS mode, the AP may perform transmission to another STA without transmission to the first STA, and transmission may be performed between the first STA and the second STA via the direct link during the transmission of the AP to another STA.

According to this example, the first STA and the second STA may set their TXVECTOR parameters, COLOR to the same value, for HE PPDU transmission between the first STA and the second STA. That is, the second COLOR parameter for the direct link of the first STA may be set to the same value as the third COLOR parameter for the direct link of the second STA.

Figure 24:
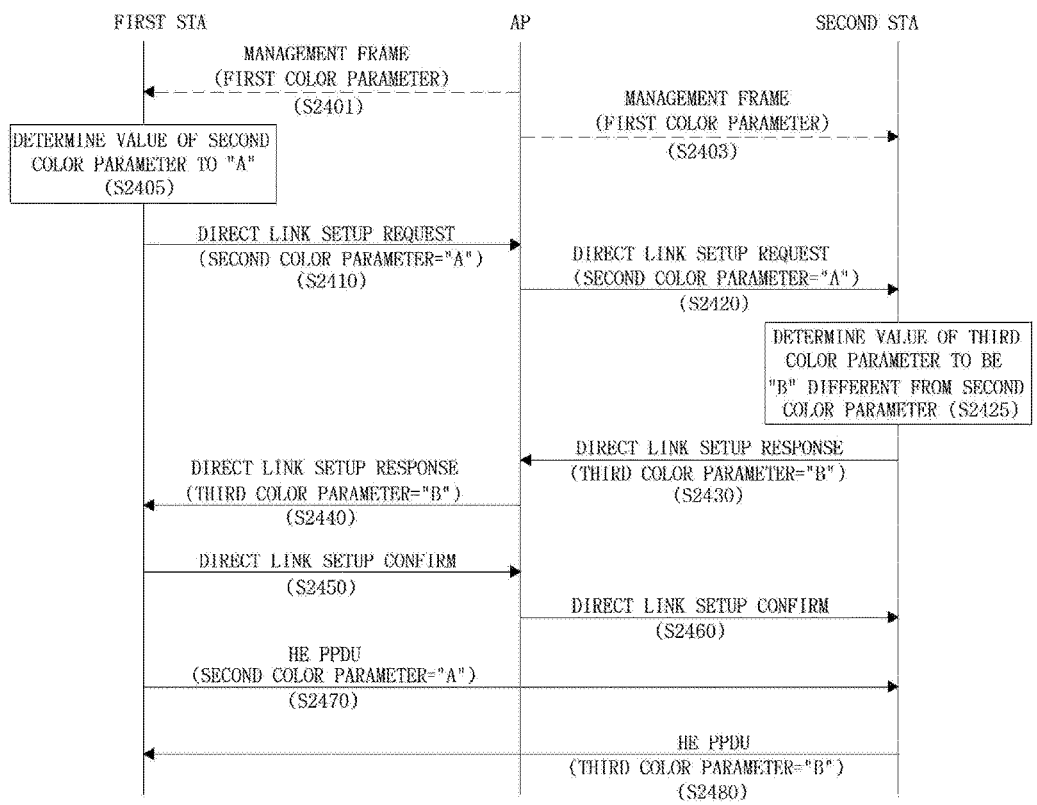
FIG. 24 depicts direct link setup operations according to a second example.

FIG. 24 depicts a direct link setup operation according to an additional example of one embodiment.

In the example of FIG. 24, a first STA and a second STA may use different values as their TXVECTOR parameters, COLOR, for dynamic channel sensing of a direct link in order to achieve a spatial reuse gain in a more general direct link scenario. A direct link setup and dynamic channel sensing operation for this case will be described below.

Steps S2401 and S2403 of FIG. 24 correspond to steps S2101 and S2103 of FIG. 21 and thus will not be described herein to avoid redundancy.

In step S2405, the first STA may select a COLOR value (i.e., a value of a second COLOR parameter) for a direct link and maintain the selected COLOR value. For example, the first STA may set the value of the second COLOR parameter to A.

More specifically, the first STA, which transmits a HE PPDU to the second STA via the direct link, sets the value of the TXVECTOR parameter, COLOR (i.e., the value of the second COLOR parameter) to a value of its choosing in a range of 0 to 7 (A=0, 1, . . . , or 7), and maintain the value during the duration of existence of a DLS or TDLS setup.

In step S2410, the first STA may include the selected value of the direct-link COLOR parameter (i.e., the second COLOR parameter) in a PPDU that the first STA transmits to the second STA via the AP. For example, the first STA may include the second COLOR parameter having the value A in a Direct Link Setup Request frame and transmit the Direct Link Setup Request frame to the AP. In step S2420, the AP may forward the Direct Link Setup Request to the second STA.

More specifically, the first STA may include the value A of the TXVECTOR parameter, COLOR (i.e., the second COLOR parameter) in the range of 0 to 7 used by the first STA in a COLOR field of a HE capabilities Info field of a HE Capabilities element of a Direct Link Setup Request frame with the HE Capabilities element (for example, a DLS Setup Request frame or a TDLS Setup Request frame).

In step S2425, the second STA may determine a value of its direct link COLOR parameter (i.e., a value of a third COLOR parameter), which is different from the value of the direct-link COLOR parameter selected by the first STA (i.e., the second COLOR parameter). For example, the second STA may set the value of the third COLOR parameter to B (=0, 1, . . . , or 7, B≠A).

In step S2430, the second STA may include the selected direct-link COLOR parameter (i.e., the third COLOR parameter) in a PPDU that the second STA transmits to the first STA via the AP. For example, the second STA include the second COLOR parameter having the value B in a Direct Link Setup Response frame and transmit the Direct Link Setup Response frame to the AP. In step S2440, the AP may forward the Direct Link Setup Response to the first STA.

More specifically, the second STA may include the value B of the TXVECTOR parameter, COLOR (i.e., the third COLOR parameter) in the range of 0 to 7 used by the second STA in a COLOR field of a HE capabilities Info field of a HE Capabilities element of a Direct Link Setup Response frame with the HE Capabilities element (for example, a DLS Setup Response frame or a TDLS Setup Response frame), and maintain the value during the duration of existence of the DLS or TDLS setup.

Also, the second STA may set the value of the TXVECTOR parameter, COLOR (i.e., the third COLOR parameter) to the value B set in a COLOR field of a HE Capabilities Info field in a HE Capabilities element of the latest Direct Link Setup Response frame transmitted to the first STA.

In steps S2450 and S2460, the first STA may transmit a Direct Link Setup Confirm frame to the second STA via the AP.

After the direct link setup, a HE PPDU that the first STA transmits to the second STA via the direct link may include the second COLOR parameter set to A by the first STA in step S2470.

More specifically, the first STA may include the value A of the TXVECTOR parameter COLOR in the range of 1 to 7 used by the first STA in a COLOR field of a PHY header (e.g., a HE-SIG-A field) of a HE PPDU that the first STA transmits to the second STA via the direct link.

Also, the third COLOR parameter set to the value B may be included in a HE PPDU that the second STA transmits to the first STA via the direct link in step S2480.

More specifically, the second STA may include the value B of the third COLOR parameter set to be different from the value of the second COLOR parameter of the first STA in a COLOR field of a PHY header (e.g., HE-SIG-A field) of a HE PPDU that the second STA transmits to the first STA via the direct link.

After the direct link setup illustrated in FIG. 24, the first STA and the second STA may perform dynamic channel sensing for the direct link.

Specifically, in the case where a STA (the first STA or the second STA) performing transmission/reception to/from a peer STA via the direct link receives a HE PPDU with a valid SIG field, if an uplink indication bit of the SIG field is 0 and the value of an ID field matches a partial AID of the peer STA, or if the uplink indication bit of the SIG field is 0 and the value of a COLOR field matches a COLOR value indicated by the peer STA, the PHY of the STA may maintain a PHY-CCA.indication(BUSY, channel-list) primitive during a predicted duration of the received PPDU, as in steps S2240 and S2260 of FIG. 22.

In the case where an STA (the first STA or the second STA) performing transmission/reception to/from a peer STA via a direct link receives a HE PPDU with a valid SIG field as in step S2250 of FIG. 22, if an uplink indication bit of the SIG field is 0 and the value of an ID field does not match a partial AID of the peer STA, or if the uplink indication bit of the SIG field is 0 and the value of a COLOR field does not match a COLOR value indicated by the peer STA, the PHY of the STA may maintain a PHY-CCA.indication (BUSY, channel-list) primitive during a predicted duration of a received PPDU, when reception of the HE PPDU satisfies a minimum CCA sensitivity level of a second CCA threshold as in step S2260 of FIG. 22. Or when the reception of the HE PPDU does not satisfy the minimum CCA sensitivity level of the second CCA threshold, the PHY of the STA may maintain a PHY-CCA.indication(IDLE) primitive as in step S2270 of FIG. 22.

Also, in the case where the first STA or the second STA receives a COLOR field (i.e., the first COLOR parameter) of a HE Capabilities Info field of a HE Capabilities element from the AP, the first STA or the second STA may select a value of a COLOR parameter in the following manner.

An STA (i.e., the first STA or the second STA), which transmits a HE PPDU to a peer STA (i.e., the first STA or the second STA) via the direct link, may include the same value as the value of the COLOR field (i.e., the first COLOR parameter) received from the AP with which the STA has been associated in a COLOR field of a HE Capabilities Info field of every frame including a HE Capabilities element transmitted by the STA. That is, the first STA may set the second COLOR parameter to the same value as the first COLOR parameter, and the second STA may set the third COLOR parameter to the same value as the first COLOR parameter.

Also, the first STA or the second STA may include a different value from the value of the COLOR field (i.e., the first COLOR parameter) received from the AP with which the STA has been associated in the COLOR field of the HE Capabilities Info field of every frame including the HE Capabilities element transmitted by the first STA or the second STA. That is, the second COLOR parameter may be set to a different value from the first COLOR parameter. In this case, the first STA or the second STA may indicate to the AP that the first STA or the second STA will change its operation mode from the active mode to the PS mode before transmitting the HE PPDU to the peer STA via the direct link. Accordingly, while the HE AP is transmitting and receiving a signal to and from another STA, concurrent transmission between the first STA and the second STA via the direct link may be supported. That is, as the first STA or the second STA is set to the PS mode, the AP may perform transmission to another STA without transmission to the first STA or the second STA, and transmission may be performed between the first STA and the second STA via the direct link during the transmission of the AP to another STA.

According to this example, the first STA and the second STA may set their TXVECTOR parameters, COLOR to different values, for HE PPDU transmission between the first STA and the second STA. That is, the second COLOR parameter for the direct link of the first STA may be set to a different value from the third COLOR parameter for the direct link of the second STA.

Figure 25:
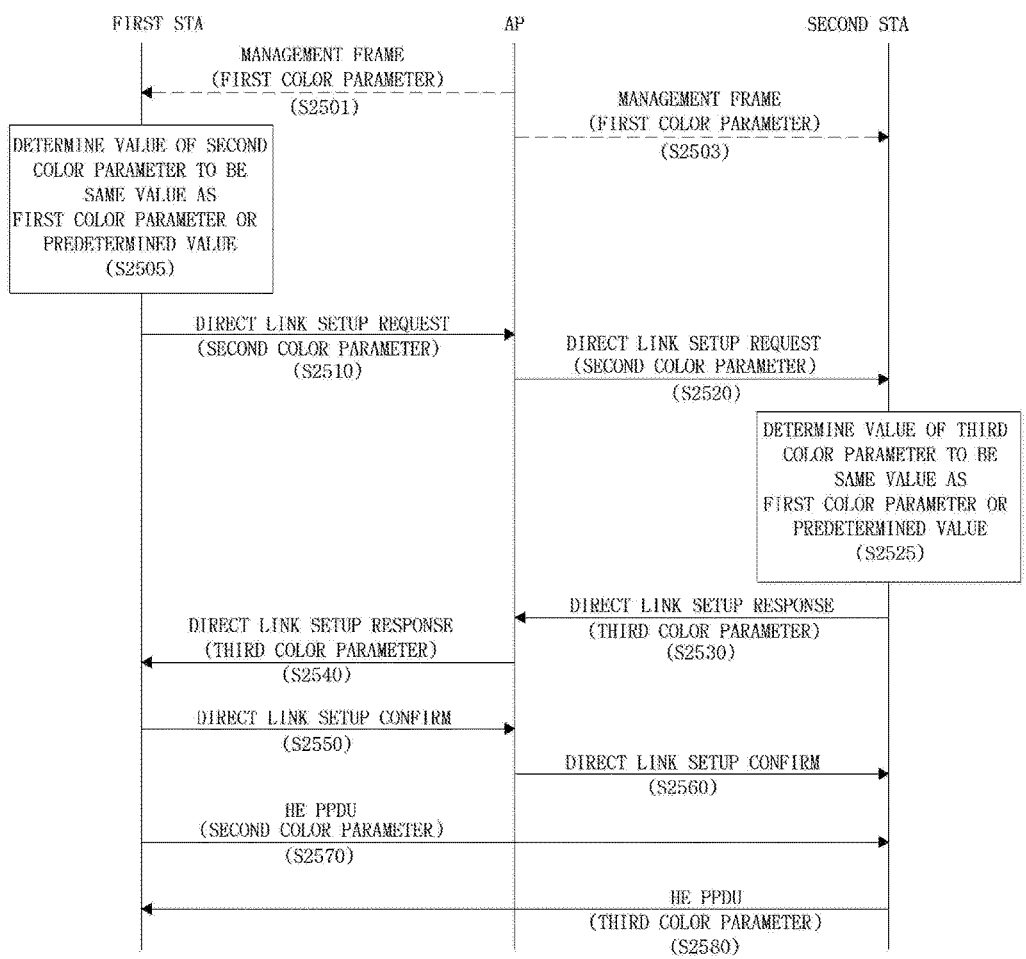
FIG. 25 depicts direct link setup operations according to a third example.

FIG. 25 depicts a direct link setup operation according to an additional example of one embodiment.

In the example of FIG. 25, dynamic channel sensing for a direct link may be applied restrictively in order to reduce protocol complexity. For example, while if peer STAs of a direct link are associated with a HE AP, dynamic channel sensing for a direct link may be supported fully, if the peer STAs of the direct link are associated with a legacy AP, dynamic channel sensing for a direct link may be supported in a non-optimized manner. A direct link setup and dynamic channel sensing operation for this case will be described below.

It is noted from step S2501 and S2503 of FIG. 25 that if peer STAs of a direct link (i.e., a first STA and a second STA) are associated with a HE AP, the peer STAs may receive a first COLOR parameter in management frames from the HE AP.

On the other hand, the peer STAs of the direct link (i.e., the first STA and the second STA) may be associated with a legacy AP. In this case, steps S2501 and S2503 may be omitted. Or although the legacy AP may transmit management frames to the STAs, the management frame may not include the first COLOR parameter.

In step S2505, the first STA may select a COLOR value for a direct link (i.e., a value of the second COLOR parameter) according to the type of the associated AP and maintain the selected COLOR value.

More specifically, if the first STA is associated with a HE AP and receives the first COLOR parameter from the HE AP, the first STA, which transmits a HE PPDU to the second STA via the direct link, sets the TXVECTOR parameter, COLOR (i.e., a second COLOR parameter) to the same value as a COLOR field (i.e., the first COLOR parameter) received from the HE AP, and maintain the value during the duration of existence of a DLS or TDLS setup.

On the other hand, if the first STA is associated with a legacy AP, the legacy AP does not provide a COLOR parameter. Therefore, the first STA may determine the first COLOR parameter to be a predetermined value (e.g., 0). The first STA, which transmits a HE PPDU to the second STA via the direct link, sets the TXVECTOR parameter, COLOR (i.e., the second COLOR parameter) to the predetermined value determined to be the first COLOR parameter, and maintain the value during the duration of existence of the DLS or TDLS setup.

In operation S2510, the first STA may include the value of the direct-link COLOR parameter (i.e., the value of the second COLOR parameter) in a PPDU that the first STA transmits to the second STA via the AP. For example, the first STA may include the second COLOR parameter having the same value as the first COLOR parameter or the predetermined value in a Direct Link Setup Request frame and transmit the Direct Link Setup Request frame to the AP. In step S2520, the AP may forward the Direct Link Setup Request to the second STA.

More specifically, the first STA may include the TXVECTOR parameter, COLOR (i.e., the second COLOR parameter) having the same value as the first COLOR parameter or the predetermined value in a COLOR field of a HE capabilities Info field of a HE Capabilities element of a Direct Link Setup Request frame with the HE Capabilities element (for example, a DLS Setup Request frame or a TDLS Setup Request frame).

In step S2525, the second STA may select a COLOR value for the direct link (i.e., a value of the third COLOR parameter) according to the type of the associated AP and maintain the selected COLOR value.

More specifically, if the second STA is associated with a HE AP and receives the first COLOR parameter from the HE AP, the second STA, which transmits a HE PPDU to the first STA via a direct link, sets the TXVECTOR parameter, COLOR (i.e., the third COLOR parameter) to the same value as a COLOR field (i.e., the first COLOR parameter) received from the HE AP, and maintain the value during the duration of existence of the DLS or TDLS setup.

On the other hand, if the second STA is associated with a legacy AP, the legacy AP does not provide a COLOR parameter. Therefore, the second STA may determine the first COLOR parameter to be a predetermined value (e.g., 0). The second STA, which transmits a HE PPDU to the first STA via the direct link, sets the TXVECTOR parameter, COLOR (i.e., the third COLOR parameter) to the predetermined value determined to be the first COLOR parameter, and maintain the value during the duration of existence of the DLS or TDLS setup.

In operation S2530, the second STA may include the value of the direct-link COLOR parameter (i.e., the value of the third COLOR parameter) in a PPDU that the second STA transmits to the first STA via the AP. For example, the second STA may include the third COLOR parameter having the same value as the first COLOR parameter or the predetermined value in a Direct Link Setup Response frame and transmit the Direct Link Setup Response frame to the AP. In step S2540, the AP may forward the Direct Link Setup Response to the first STA.

More specifically, the second STA may include the TXVECTOR parameter, COLOR (i.e., the third COLOR parameter) having the same value as the first COLOR parameter or the predetermined value in a COLOR field of a HE capabilities Info field of a HE Capabilities element of a Direct Link Setup Response frame with the HE Capabilities element (for example, a DLS Setup Response frame or a TDLS Setup Response frame) and maintain the value during the duration of existence of the DLS or TDLS setup.

Also, the second STA may set the value of the TXVECTOR parameter, COLOR (i.e., the third COLOR parameter) to a value of a COLOR field of a HE Capabilities Info field in a HE Capabilities element of the latest Direct Link Setup Response frame (e.g., DLS Setup Response frame or TDLS Setup Response frame) transmitted to the first STA, that is, the same value as the first COLOR parameter or the predetermined value.

In steps S2550 and S2560, the first STA may transmit a Direct Link Setup Confirm frame to the second STA via the AP.

The first STA may determine a COLOR parameter (e.g., a fourth COLOR parameter) based on the second COLOR parameter determined by the first STA or the third COLOR parameter received from the second STA, and include the determined COLOR parameter in the Direct Link Setup Confirm frame. For example, if both of the second COLOR parameter and the third COLOR parameter have the same value as the first COLOR parameter (or the predetermined value) in the example of FIG. 23, the first STA may determine the value of the fourth COLOR parameter to be equal to the value of the first COLOR parameter (or the predetermined value) and include the value of the fourth COLOR parameter in the Direct Link Setup Confirm frame. The second STA may check the value of the fourth COLOR parameter included in the Direct Link Setup Confirm frame received from the first STA.

After the direct link setup, a HE PPDU that the first STA transmits to the second STA via the direct link may include the second COLOR parameter set to the same value as the first COLOR parameter set by the first STA or the predetermined value in step S2570. Or the second COLOR parameter transmitted in the Direct Link Setup Request frame by the first STA or the fourth COLOR parameter transmitted in the Direct Link Setup Confirm frame by the first STA may be included as a COLOR parameter in the HE PPDU that the first STA transmits via the direct link. In the example of FIG. 25, both of the second COLOR parameter and the fourth COLOR parameter have the same value as the first COLOR parameter (or the predetermined value), and the first STA may include the value of the first COLOR parameter (or the predetermined value) as the value of the COLOR parameter in the HE PPDU transmitted via the direct link.

More specifically, the first STA may include the value of the TXVECTOR parameter COLOR (i.e., the second COLOR parameter) set to the same value as the first COLOR parameter or the predetermined value in a COLOR field of a PHY header (e.g., a HE-SIG-A field) of a HE PPDU that the first STA transmits to the second STA via the direct link.

Also, the third COLOR parameter set to the same value as the first COLOR parameter or the predetermined value may be included in a HE PPDU that the second STA transmits to the first STA via the direct link in step S2580. Or the third COLOR parameter transmitted in the Direct Link Setup Response frame by the second STA or the fourth COLOR parameter received in the Direct Link Setup Confirm frame by the second STA may be included as a COLOR parameter in the HE PPDU that the second STA transmits via the direct link. In the example of FIG. 25, both of the third COLOR parameter and the fourth COLOR parameter have the same value as the first COLOR parameter (or the predetermined value), and the second STA may include the value of the first COLOR parameter (or the predetermined value) as the value of the COLOR parameter in the HE PPDU transmitted via the direct link.

More specifically, the second STA may include the value of the third COLOR parameter having the same value as the first COLOR parameter or the predetermined value in a COLOR field of a PHY header (e.g., HE-SIG-A field) of a HE PPDU that the second STA transmits to the first STA via the direct link.

After the direct link setup illustrated in FIG. 25, the first STA and the second STA may perform dynamic channel sensing for the direct link.

Specifically, after the DLS or TDLS setup procedure, if the first STA or the second STA is associated with a HE AP and receives a HE PPDU with a PHY header including a value of COLOR field matching a value of a COLOR parameter indicated by the HE AP (i.e., the first COLOR parameter provided by the HE AP) or if the first STA or the second STA is associated with a legacy AP and receives a HE PPDU with a PHY header including a value of a COLOR field matching a predetermined value (e.g., 0), the PHY of the STA may maintain a PHY-CCA.indication(BUSY, channel-list) primitive during a predicted duration of the received PPDU, as in steps S2240 and S2260 of FIG. 22.

In the case where an STA (the first STA or the second STA) performing transmission/reception to/from a peer STA via the direct link receives a HE PPDU with a valid SIG field as in step S2250 of FIG. 22, if the first STA or the second STA is associated with a HE AP and the value of a COLOR field included in a PHY header of the HE PPDU does not match the value of a COLOR parameter indicated by the HE AP (i.e., the first COLOR parameter provided by the HE AP) or if the first STA or the second STA is associated with a legacy AP and the value of a COLOR field included in a PHY header of the HE PPDU does not match a predetermined value (e.g., 0), the PHY of the STA may maintain a PHY-CCA.indication(BUSY, channel-list) primitive during a predicted duration of the received PPDU, when reception of the HE PPDU satisfies a minimum CCA sensitivity level of a second CCA threshold as in step S2260 of FIG. 22. Or when the reception of the HE PPDU does not satisfy the minimum CCA sensitivity level of the second CCA threshold, the PHY of the STA may maintain a PHY-CCA.indication(IDLE) primitive as in step S2270 of FIG. 22.

As described above, values of COLOR fields for HE PPDU transmission via a direct link may be exchanged between peer STAs (e.g., a first STA and a second STA) of the direct link in order to support dynamic channel sensing for the direct link. Accordingly, the first STA or the second STA may perform dynamic channel sensing using different CCA thresholds by distinguishing origination of a received PPDU from a BSS of an AP with which the STA has been associated or the peer STA from origination of a received PPDU from any other BSS or STA.

While the afore-described exemplary methods of the one embodiment have been described as a series of operations for simplicity of description, this does not limit the sequence of steps. In some embodiments, steps may be performed at the same time or in a different sequence. All of the exemplary steps are not always necessary to implement the method proposed by the embodiments.

The foregoing embodiments of the invention may be implemented separately or combinations of two or more of the embodiments may be implemented simultaneously, for the afore-described exemplary methods of the embodiments.

The embodiments include an apparatus for processing or performing the method of the embodiments (e.g., the wireless device and its components described with reference to FIGS. 1, 2, and 3).

The embodiments include software or machine-executable instructions (e.g., an operating system (OS), an application, firmware, a program, etc.) for executing the method of the embodiments in a device or a computer, and a non-transitory computer-readable medium storing the software or instructions that can be executed in a device or a computer.

While various embodiments have been described in the context of an IEEE 802.11 system, they are applicable to various mobile communication systems.

What is claimed is:

1. A method for dynamic channel sensing for a direct link by a first station (STA) in a wireless local area network, the method comprising:
   determining a first COLOR parameter of an access point (AP) to which the first STA is associated;
   exchanging with a second STA a COLOR parameter related to the direct link, the second STA being a peer STA of the first STA and connected to the first STA in the direct link; and
   determining a channel state of the direct link based on a first clear channel assessment (CCA) threshold higher than a second CCA threshold, when a value of a COLOR field included in a received physical layer protocol data unit (PPDU) having a valid SIGNAL (SIG) field does not match any of the first COLOR parameter and the COLOR parameter related to the direct link.

2. The method according to claim 1, wherein the exchanging with the second STA the COLOR parameter related to the direct link includes:
   transmitting to the second STA a direct link setup request including a second COLOR parameter determined by the first STA; and
   receiving from the second STA a direct link setup response including a third COLOR parameter determined by the second STA.

3. The method according to claim 2, wherein the determining the channel state is performed after a setup of the direct link.

4. The method according to claim 3, wherein, when a value of the COLOR field included in the received PPDU having the valid SIG field does not match any of the first COLOR parameter, the second COLOR parameter, and the third COLOR parameter,
   the first STA determines that the channel state is busy when a received signal strength of the received PPDU is higher than or equal to the first CCA threshold,
   the first STA determines that the channel state is idle when the received signal strength of the received PPDU is lower than the first CCA threshold.

5. The method according to claim 4, wherein, when a value of the COLOR field included in the received PPDU having the valid SIG field does not match any of the first COLOR parameter, the second COLOR parameter, and the third COLOR parameter, and when an uplink indication bit included in the received PPDU has a value of 0,
   the first STA determines that the channel state is busy when a received signal strength of the received PPDU is higher than or equal to the first CCA threshold,
   the first STA determines that the channel state is idle when the received signal strength of the received PPDU is lower than the first CCA threshold.

6. The method according to claim 4, wherein the first STA determines that the channel state is busy, when the value of the COLOR field included in the received PPDU having the valid SIG field matches at least one of the first COLOR parameter, the second COLOR parameter, or the third COLOR parameter.

7. The method according to claim 6, wherein the first STA determines that the channel state is busy, when the value of the COLOR field included in the received PPDU having the valid SIG field matches at least one of the first COLOR parameter, the second COLOR parameter, or the third COLOR parameter, and when an uplink indication bit included in the received PPDU has a value of 0.

8. The method according to claim 4, wherein, when the value of the COLOR field included in the received PPDU having the valid SIG field matches at least one of the first COLOR parameter, the second COLOR parameter, or the third COLOR parameter,
   the first STA determines that the channel state is busy when a received signal strength of the received PPDU is higher than or equal to the second CCA threshold,
   the first STA determines that the channel state is idle when the received signal strength of the received PPDU is lower than the second CCA threshold.

9. The method according to claim 8, wherein, when the value of the COLOR field included in the received PPDU having the valid SIG field matches at least one of the first COLOR parameter, the second COLOR parameter, or the third COLOR parameter, and when an uplink indication bit included in the received PPDU has a value of 0,
   the first STA determines that the channel state is busy when a received signal strength of the received PPDU is higher than or equal to the second CCA threshold,
   the first STA determines that the channel state is idle when the received signal strength of the received PPDU is lower than the second CCA threshold.

10. The method according to claim 2, wherein the second COLOR parameter and the third COLOR parameter have a same value.

11. The method according to claim 2, wherein the second COLOR parameter and the third COLOR parameter have different values.

12. The method according to claim 1, wherein the first COLOR parameter is determined based on a value of a basic service set (BSS) COLOR field provided by the AP supporting High Efficiency (HE) capabilities.

13. The method according to claim 12, wherein the first COLOR parameter is determined to be equal to the value of the BSS COLOR field provided by the AP supporting HE capabilities.

14. The method according to claim 1, wherein the first COLOR parameter is determined to a predetermined value when no BSS COLOR field is provided by the AP.

15. The method according to claim 14, wherein the AP does not support HE capabilities.

16. The method according to claim 2, wherein the first COLOR parameter and the second COLOR parameter have a same value.

17. The method according to claim 2, wherein the first COLOR parameter and the second COLOR parameter have different values.

18. The method according to claim 17, wherein the first STA changes an operating mode from an active mode to a power save mode before transmitting a PPDU to the second STA on the direct link.

19. The method according to claim 1, wherein the second STA is associated to the AP to which the first STA is associated.

20. The method according to claim 1, wherein the COLOR field of the received PPDU is included in a physical (PHY) header of the received PPDU.

* * * * *